US012456747B2

(12) United States Patent
Gianetti et al.

(10) Patent No.: US 12,456,747 B2
(45) Date of Patent: Oct. 28, 2025

(54) CARBENIUM BASED ORGANIC REDOX FLOW BATTERIES

(71) Applicant: ARIZONA BOARD OF REGENTS ON BEHALF OF THE UNIVERSITY OF ARIZONA, Tuscon, AZ (US)

(72) Inventors: Thomas Gianetti, Tucson, AZ (US); Jules Moutet, Tucson, AZ (US)

(73) Assignee: ARIZONA BOARD OF REGENT'S ON BEHALF OF THE UNIVERSITY OF ARIZONA, Tuscon (AZ)

( * ) Notice: Subject to any disclaimer, the term of this patent is extended or adjusted under 35 U.S.C. 154(b) by 438 days.

(21) Appl. No.: 17/919,957

(22) PCT Filed: Apr. 23, 2021

(86) PCT No.: PCT/US2021/028981
§ 371 (c)(1),
(2) Date: Oct. 19, 2022

(87) PCT Pub. No.: WO2021/217092
PCT Pub. Date: Oct. 28, 2021

(65) Prior Publication Data
US 2024/0194920 A1 Jun. 13, 2024

Related U.S. Application Data

(60) Provisional application No. 63/014,810, filed on Apr. 24, 2020.

(51) Int. Cl.
*H01M 8/18* (2006.01)
*H01M 8/023* (2016.01)

(52) U.S. Cl.
CPC ........... *H01M 8/188* (2013.01); *H01M 8/023* (2013.01); *H01M 2300/0025* (2013.01)

(58) Field of Classification Search
CPC ................ H01M 8/188; H01M 8/023; H01M 2300/0025
See application file for complete search history.

(56) References Cited

U.S. PATENT DOCUMENTS

2012/0171541 A1 7/2012 Park et al.
2017/0187059 A1* 6/2017 Potash .............. H01M 8/04276
(Continued)

FOREIGN PATENT DOCUMENTS

JP 2017117752 A * 6/2017
WO WO-2015148357 A1 * 10/2015 ........ H01M 8/04276
WO WO-2020/072406 A2 4/2020

OTHER PUBLICATIONS

JP-2017117752MT (Year: 2017).*
(Continued)

*Primary Examiner* — Alexander Usyatinsky
(74) *Attorney, Agent, or Firm* — Foley & Lardner LLP

(57) ABSTRACT

A redox flow battery including: a catholyte including a radical dication of a conjugated heterocyclic carbenium compound; and an anolyte including a neutral radical of a conjugated heterocyclic carbenium compound; wherein the conjugated heterocyclic carbenium compounds present in the catholyte and anolyte are the same compound; and the redox flow battery has an open circuit potential of greater than about 2 V. A redox flow battery including: a catholyte including a conjugated heterocyclic cationic compound in a first oxidation state; and an anolyte including a conjugated heterocyclic cationic compound in a second oxidation state; wherein the first oxidation state is a higher oxidation state than the second oxidation state.

16 Claims, 27 Drawing Sheets

(56) References Cited

U.S. PATENT DOCUMENTS

2018/0138539 A1\* 5/2018 Sanford ............ H01M 10/0569
2018/0254478 A1   9/2018 Jones et al.
2019/0051921 A1\* 2/2019 Zhang .................... H01M 8/02

OTHER PUBLICATIONS

Mei et al., Dalton Trans.,2020. 16095-1605 (Year: 2020).\*
International Search Report and Written Opinion issued for PCT/US2021/028981 dated Jun. 25, 2021.
Mei et al., "Tunable carbocation-based redox active ambiphilic ligands: synthesis, coordination and characterization" Dalton Transactions, Mar. 16, 2020 (Mar. 16, 2020) vol. 49, p. 16095-16105; p. 16096, Scheme 1, p. 16097, Fig. 4a.
Moutet et al., "Symmetric, Robust, and High-Voltage Organic Redox Flow Batery Model Based on a Helical Carbenium Ion Electrolyte" ACS Applied Energy Materials, Dec. 30, 2020 (Dec. 30, 2020) vol. 4, p. 9-14; entire document.

\* cited by examiner

CARBENIUM BASED ORGANIC REDOX FLOW BATTERIES

CROSS-REFERENCE TO RELATED APPLICATIONS

The present application is the U.S. National Stage of International Application No. PCT/US2021/028981, filed Apr. 23, 2021, which claims the benefit of and priority to U.S. Provisional Application No. 63/014,810, filed Apr. 24, 2020, both of which are incorporated herein by reference in their entireties.

FIELD

This technology relates to redox flow batteries. More particularly, this technology relates to organic redox flow batteries utilizing conjugated heterocyclic carbenium compounds as the catholyte and anolyte.

BACKGROUND

In the context of economically and ecologically dynamics, energy production and storage deserve particular attention. After many years of intensive use of coal and oil combustion as main energy sources, humanity is increasingly oriented towards the use of electricity. Efficient storage of electricity-compatible with various applications-remains a challenge. Lithium ion-based battery, long dedicated to smartphones and small devices, has been a potential short-term solution. Their use in bigger applications, such as in the car industry, could lead to a scarcity of their raw materials (Li, Co, rare-earth), and result in a very significant increase of cost.

To overcome this problem and prepare for the future, several sustainable approaches have been considered in the Energy Storage Systems (ESSs) field. One of them is the development of redox flow batteries (RFBs). The energy is stored in liquid electrolyte solutions which flow through a battery of electrochemical cells during charge and discharge. The "redox" term refers to chemical reduction and oxidation reactions involved.

These redox flow batteries have several advantages over previously presented systems. Power conversion is separated from energy storage, thus allowing for independent power and energy sizing. This separation from energy storage allows for virtually unlimited ESS capacity and are only limited by the tanker size and the electrolyte concentration. In redox flow battery systems, the redox reactions are totally reversible, meaning that the same cell is used to operate as converter of electricity into chemical energy and vice-versa. From an infrastructure point of view, the redox flow battery system is relatively easy to develop. The setup requires only two tanks each provided with a pump and a cell provided with an ion exchange membrane between two electrodes. Therefore, redox flow battery systems have very few wear parts, and the equipment maintenance costs are extremely reduced. Lastly, there is a clear separation between the two electrolyte storage, which prevents self-discharge and the battery lifetime is mainly chemically dependent.

However, there are several points concerning redox flow battery systems that remain to be improved. Currently the energy density provided by the RFBs is insufficient for mobile applications. Parameters such as solubility and temperature of electrolytes remain crucial. Also, the cost of these EESs remains high due to their poor presence in the energy market.

Historically, the RFB systems was first used in France in 1933 with a Vanadium-based electrolyte. Today, vanadium RFBs still are the most marketed flow batteries, due to a number of advantages they present on other chemistries (V at both electrodes, no cross-contamination issues, and water-based solution). However, vanadium is costly, and these vanadium-based RFBs have a relatively low energy density. Furthermore, the capital cost of a vanadium-based RFB is attributed to the cost of the membrane materials, which are used to prepare the exchange membrane that separates the two poles of the battery. Such membranes are developed to be permeable only to anions, and are based on cationic functionalized polymers. This type of material is subjected to significant electrical charge stress over time, which impacts the longevity of the RFB. While metal coordination complexes appeared to be the most stable electrolyte, the critical technical and economic limitations associated with these complexes, such as low solubility, inferior electrochemical activity, and high costs, have motivated researchers to explore cheaper and easier to synthesize compounds.

Redox-active organic materials (ROMs) are a promising alternative option for improving current RFB systems as ROMs have: I) the molecular diversity, II) structural tailorability, and III) natural abundance that make them electrolytes of choice. Thus, there have been several RFB systems developed with redox-active organic materials. An important feature of these RFB systems is a one nitrogen-containing aromatic scaffold that is very soluble and highly tunable. However, the most known redox-active organic based RFB system still lacks high efficiency, robustness, and a large open circuit potential (OCV). This disclosure addresses the need for improved redox-active organic material based RFB systems.

SUMMARY

The present technology provides redox flow battery systems comprising conjugated heterocyclic carbenium compounds as both the anolyte and catholyte. The potential, stability, and solubility of the conjugated heterocyclic carbenium compounds presented herein can be easily tuned and allows for improved electronic density storage and open circuit potential (OVC) for any specific solvent. The redox flow battery systems disclosed herein are a rare example of a highly functionable system in which the same compound is used as both anolyte and catholyte with OCV higher than 2.0V The use of the conjugated heterocyclic carbenium compounds as both the anolyte and catholyte also allows for the development of a symmetric organic redox flow battery (SORFB). This also provides for an opportunity to improve the properties of the exchange membrane (EM) that separates the two poles of the battery and overcome the limitations associated with vanadium-based RFBs as mentioned above. In particular a simple porous exchange membrane (EM), where the pore size of the EM provides selectivity based on size exclusion, may be used instead of an anion-selective membrane. As such, provided in another aspect is a symmetric organic redox flow battery (SORFB) comprising a porous exchange membrane as the separator.

Provided in one aspect is a redox flow battery comprising:
a catholyte comprising a radical dication of a conjugated heterocyclic carbenium compound; and
an anolyte comprising a neutral radical of a conjugated heterocyclic carbenium compound;
wherein the conjugated heterocyclic compounds present in the catholyte and anolyte are the same compound. In some embodiments, the redox flow battery has an open circuit potential of greater than about 1V, 1.5 V, or 2 V. In some embodiments, the redox flow battery has an open circuit potential of greater than about 2 V. In some embodiments, the redox flow battery has an open circuit potential of from about 1 V to about 5V, about 1.5 V to about 5 V, about 1.5 V to about 3 V, about 2 V to about 5V, about 2 V to about 4 V, or about 2V to about 3V.

Provided in another aspect is a redox flow battery comprising:
a catholyte comprising a radical dication of a compound of Formula I; and
an anolyte comprising a neutral radical of a compound of Formula I;
wherein the compound of Formula (I) is represented by the following structure:

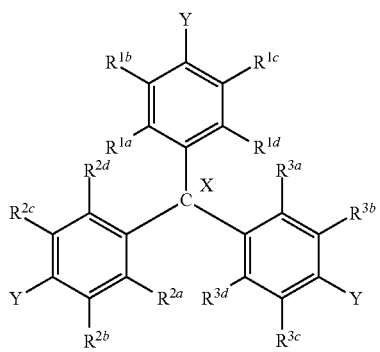

(I)

wherein:
X is from −4 to +4;
each of $R^{1a}, R^{1b}, R^{1c}, R^{1d}, R^{2a}, R^{2b}, R^{2c}, R^{2d}, R^{3a}, R^{3b}, R^{3c}$, and $R^{3d}$ is independently H, halide, $CF_3$, $NH_2$, $C_1$-$C_{12}$ alkyl, $C_1$-$C_4$ alkoxy, $C_1$-$C_4$ alkylamino, $C_1$-$C_4$ dialkyl amino, $NO_2$, CN, $CO_2R$, or $Ar^1$;
or $R^{2a}$ and $R^{3d}$ together form —$X^1$—;
or $R^{1a}$ and $R^{2d}$ together form —$X^2$—;
or $R^{1d}$ and $R^{3a}$ together form —$X^3$—;
or $R^{1a}$ and $R^{1b}$ together with atoms to which they are attached to form a phenyl;
or $R^{2c}$ and $R^{2d}$ together with atoms to which they are attached to form a phenyl;
each of $X^1$, $X^2$ and $X^3$ is independently O, $NR^{4a}$, $PR^{4a}$, $CR^{4a}R^{4b}$, or $SiR^{4a}R^{4b}$;
each of $R^{4a}$ and $R^{4b}$ is independently H, halide, $CF_3$, $C_1$-$C_{12}$ alkyl, $C_1$-$C_4$ alkoxy, $C_1$-$C_4$ alkylamino, $C_1$-$C_4$ dialkyl amino, $Ar^3$, -L-$Ar^3$, -L-Z, or -$L^2$-$Z^2$;
each of Y is independently H, halide, $OR^{5a}$, $NR^{5a}R^{5b}$, $PR^{5a}R^{5b}$, $NO_2$, CN, $CF_3$, $CO_2R$, $N_3$, or $Ar^2$;
each of $R^{5a}$, and $R^{5b}$ is independently H, $CF_3$, $C_1$-$C_{12}$ alkyl, $C_1$-$C_4$ alkoxy, $C_1$-$C_4$ alkylamino, $C_1$-$C_4$ dialkyl amino, $Ar^4$, -$L^1$-$Ar^4$, or -$L^1$-$Z^1$;
each of L and $L^1$ is independently $C_1$-$C_{12}$ alkylene, $C_1$-$C_{12}$ heteroalkylene, or arylene;
each of $L^2$ is independently $C_1$-$C_{12}$ alkylene;
Z and $Z^1$ are each independently a moiety comprising conjugated heterocyclic carbenium;
$Z^2$ is each independently —$(OCH_2CH_2O)_nCH_3$;
n is each independently 1 to 20;
each of R is independently $C_1$-$C_{12}$ alkyl or aryl;
$Ar^1$, $Ar^2$, $Ar^3$, and $Ar^4$ are each independently unsubstituted or substituted phenyl or unsubstituted or substituted heteroaryl; each of $Ar^1$, $Ar^2$, $Ar^3$, and $Ar^4$ is independently substituted with 0 to 5 substituents; the substituents are each independently selected from the group consisting of halide, $CF_3$, $NH_2$, $C_1$-$C_4$ alkyl, $C_1$-$C_4$ alkoxy, $C_1$-$C_4$ alkylamino, $C_1$-$C_4$ dialkyl amino, $NO_2$, CN, or aryl.

In some embodiments, the compound of Formula I is a compound of Formula Ia, Formula Ib, or Formula Ic:

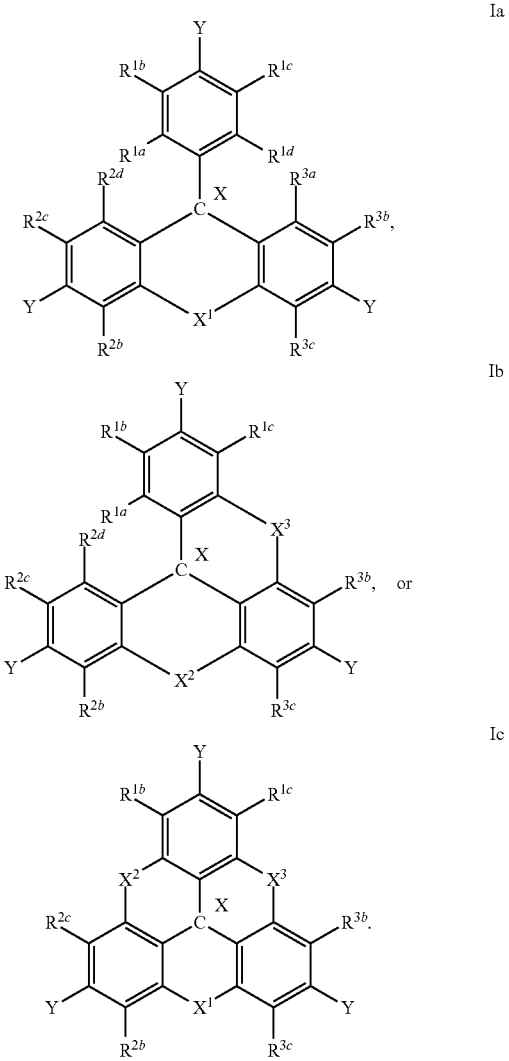

In some embodiments, X is −4, −3, −2, −1, 0, 1, 2, 3, or 4. In some embodiments, each of $X^1$, $X^2$, and $X^3$ is independently O or $NR^{4a}$. In some embodiments, each $R^{4a}$ is independently $C_1$-$C_{12}$ alkyl, $C_1$-$C_4$ alkoxy, $C_1$-$C_4$ alkylamino, $C_1$-$C_4$ dialkyl amino, $Ar^3$, -L-$Ar^3$, -L-Z, or -$L^2$-$Z^2$. In some embodiments, each $R^{4a}$ is independently $C_1$-$C_{12}$ alkyl, $C_1$-$C_4$ alkoxy, $C_1$-$C_4$ alkylamino, $C_1$-$C_4$ dialkyl amino, $Ar^3$, -L-$Ar^3$, or -L-Z. In some embodiments, each $R^{4a}$ is independently methyl, ethyl, propyl, butyl, pentyl, hexyl, —$(CH_2)$—$N(Me)_2$, —$(CH_2)_2$—$N(Me)_2$, —$(CH_2)_3$—$N(Me)_2$, —$(CH_2)_3$—$N(Me)_2$, —$(CH_2)_4$—$N(Me)_2$, —$(CH_2)_2$—$Ar^3$, —$(CH_2)_3$—$Ar^3$, —$(CH_2)_3$—$Ar^3$, or —$(CH_2)_4$—$Ar^3$; and $Ar^3$ is 2-pyridinyl. In some embodiments, each $R^{4a}$ is —$(CH_2)$—$(OCH_2CH_2O)_nCH_3$, —$(CH_2)_2$—$(OCH_2CH_2O)_nCH_3$, —$(CH_2)_3$—$(OCH_2CH_2O)_nCH_3$, or —$(CH_2)_4$—$(OCH_2CH_2O)_nCH_3$; and n is 0, 1, 2, 3, 4, 5, 6, 7, 8, 9, 10, 11, 12, 13, 14, 15, 16, 17, 18, 19, or 20. In some embodiments, each $R^{4a}$ is —($CH_2$)—($OCH_2CH_2O)_nCH_3$, —($CH_2)_2$—($OCH_2CH_2O)_nCH_3$, —($CH_2)_3$—($OCH_2CH_2O)_nCH_3$, or —($CH_2)_4$—($OCH_2CH_2O)_nCH_3$; and n is 1. In some embodiments, each of Y is independently H or $NO_2$. In some embodiments, $R^{1a}$ and $R^{2d}$ are each $C_1$-$C_4$ alkoxy.

In some embodiments, the compound of Formula Ib is a compound, wherein:

$X^2$ and $X^3$ are each $NR^{4a}$;

each $R^{4a}$ is independently $C_1$-$C_{12}$ alkyl, $C_1$-$C_4$ dialkyl amino, or -L-$Ar^3$;

$R^{1a}$ and $R^{2d}$ are each $C_1$-$C_4$ alkoxy;

each of $R^{1b}$, $R^{1c}$, $R^{2b}$, $R^{2c}$, $R^{3b}$, and $R^{3c}$ is independently H; and each of Y is independently H or $NO_2$.

In some embodiments, the compound of Formula Ib is a compound, wherein:

$X^2$ and $X^3$ are each $NR^{4a}$;

each $R^{4a}$ is independently $C_1$-$C_{12}$ alkyl, $C_1$-$C_4$ dialkyl amino, -L-$Ar^3$, or -$L^2$-$Z^2$;

$R^{1a}$ and $R^{2d}$ are each $C_1$-$C_4$ alkoxy;

each of $R^{1b}$, $R^{1c}$, $R^{2b}$, $R^{2c}$, $R^{3b}$, and $R^{3c}$ is independently H, $C_1$-$C_4$ alkylamino, or $NO_2$;

each of Y is independently H, $NO_2$, or $NR^{1a}R^{1b}$; and each of $R^{5a}$ and $R^{5b}$ is independently H, $CF_3$, or $C_1$-$C_{12}$ alkyl.

In some embodiments, the compound of Formula I is a compound of any one of the following:

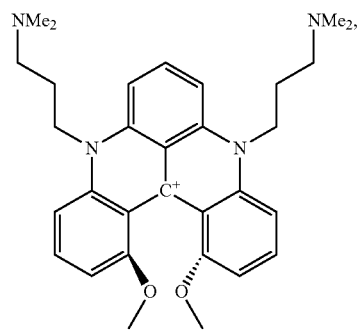

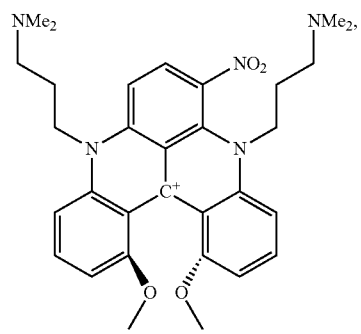

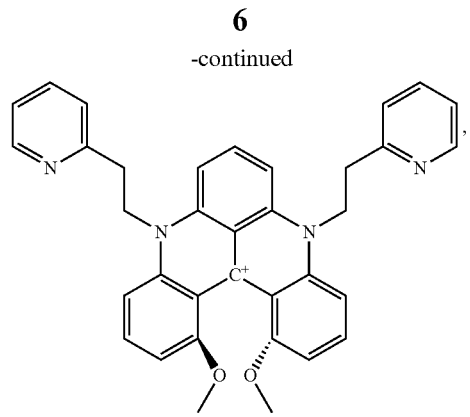

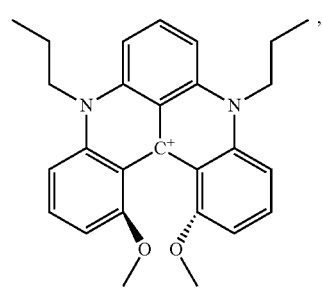

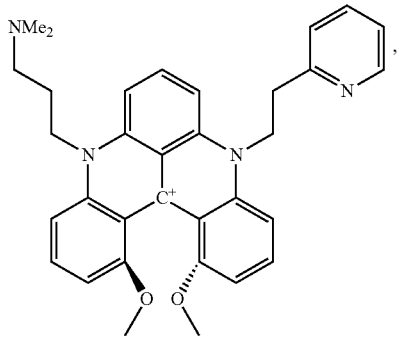

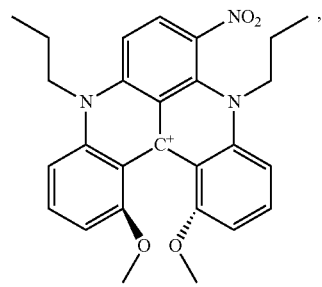

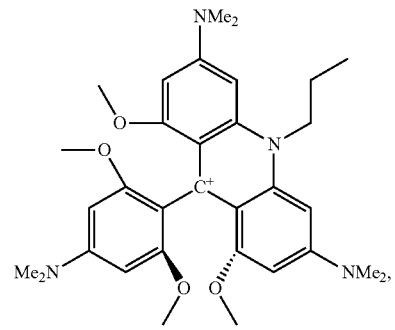

-continued

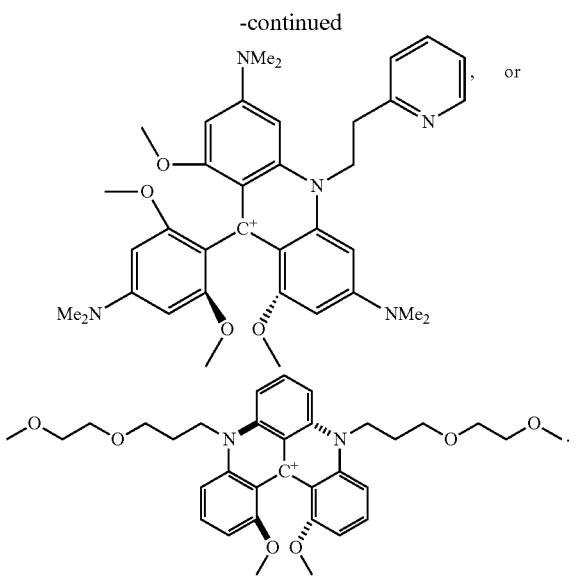

In some embodiments, the compound of formula I further comprises an anion selected from tetrafluoroborate, hexafluorophosphate, perchlorate, tetrarylborate, trifluoromethanesulfonate, oxalatoborate, oxalate, phosphate, bis-trifluoromethanesulfonimide, halide, anion of an ionic liquid, hydroxide, carbonate, bicarbonate, sulfate, hydrogen sulfate, sulfite; or a mixture of any two or more thereof. In some embodiments, the compound of formula I further comprises an anion selected from tetrafluoroborate, hexafluorophosphate, or a mixture of any two or more thereof.

In some embodiments, the redox flow battery further comprises a separator positioned between the anolyte and the catholyte. In some embodiments, the separator is a porous membrane. In some embodiments, the redox flow battery further comprises a solvent and an electrolyte salt.

In some embodiments, the electrolyte salt is a lithium, sodium, potassium, ammonium, or alkylammonium salt of tetrafluoroborate, hexafluorophosphate, perchlorate, tetrarylborate, trifluoromethanesulfonate, oxalatoborate, oxalate, phosphate, bis-trifluoromethanesulfonimide, halide; or a mixture of any two or more thereof. In some embodiments, the electrolyte is an alkylammonium salt of tetrafluoroborate, hexafluorophosphate, perchlorate, a tetrarylborate, trifluoromethanesulfonate, oxalatoborate, oxalate, phosphate, bis-trifluoromethanesulfonimide, halide; or a mixture of any two or more thereof. In some embodiments, the alkylammonium salt is a tetrabutylammonium salt, tetraethylammonium salt, or a mixture thereof. In some embodiments, the electrolyte salt is tetrabutylammonium hexafluorophosphate, tetrabutylammonium tetrafluoroborate, tetraethylammonium tetrafluoroborate, or a mixture of any two or more thereof.

In some embodiments, the solvent comprises a nitrile solvent, such as acetonitrile; an ether solvent, such as tetrahydrofuran; dimethylformamide; water; a halogenated solvent, such as dichloromethane, or an ionic liquid.

In some embodiments, the compound of Formula I is photoactive.

Provided in another aspect is a redox flow battery including:
a catholyte including a conjugated heterocyclic cationic compound in a first oxidation state; and
an anolyte including a conjugated heterocyclic cationic compound in a second oxidation state;
wherein the first oxidation state is a higher oxidation state than the second oxidation state.

In some embodiments, the conjugated heterocyclic cationic compound in the catholyte and anolyte are each independently a compound of Formula I, wherein the compound of Formula (I) is represented by the following structure:

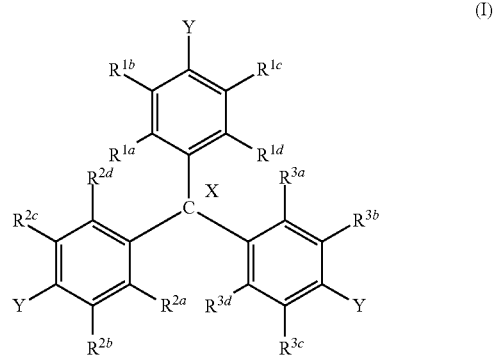

wherein:
X is from −4 to +4;
each of $R^{1a}$, $R^{1b}$, $R^{1c}$, $R^{1d}$, $R^{2a}$, $R^{2b}$, $R^{2c}$, $R^{2d}$, $R^{3a}$, $R^{3b}$, $R^{3c}$, and $R^{3d}$ is independently H, halide, $CF_3$, $NH_2$, $C_1$-$C_{12}$ alkyl, $C_1$-$C_4$ alkoxy, $C_1$-$C_4$ alkylamino, $C_1$-$C_4$ dialkyl amino, $NO_2$, CN, $CO_2R$, or $Ar^1$;
or $R^{2a}$ and $R^{3d}$ together form —$X^1$—;
or $R^{1a}$ and $R^{2d}$ together form —$X^2$—;
or $R^{1d}$ and $R^{3a}$ together form —$X^3$—;
or $R^{1a}$ and $R^{1b}$ together with atoms to which they are attached to form a phenyl;
or $R^{2c}$ and $R^{2d}$ together with atoms to which they are attached to form a phenyl;
each of $X^1$, $X^2$ and $X^3$ is independently O, $NR^{4a}$, $PR^{4a}$, $CR^{4a}R^{4b}$, or $SiR^{4a}R^{4b}$;
each of $R^{4a}$ and $R^{4b}$ is independently H, halide, $CF_3$, $C_1$-$C_{12}$ alkyl, $C_1$-$C_4$ alkoxy, $C_1$-$C_4$ alkylamino, $C_1$-$C_4$ dialkyl amino, $Ar^3$, -L-$Ar^3$, -L-Z, or -$L^2$-$Z^2$;
each of Y is independently H, halide, $OR^{5a}$, $NR^{5a}R^{5b}$, $PR^{5a}R^{5b}$, $NO_2$, CN, $CF_3$, $CO_2R$, $N_3$, or $Ar^2$;
each of $R^{5a}$, and $R^{5b}$ is independently H, $CF_3$, $C_1$-$C_{12}$ alkyl, $C_1$-$C_4$ alkoxy, $C_1$-$C_4$ alkylamino, $C_1$-$C_4$ dialkyl amino, $Ar^4$, -$L^1$-$Ar^4$, or -$L^1$-$Z^1$;
each of L and $L^1$ is independently $C_1$-$C_{12}$ alkylene, $C_1$-$C_{12}$ heteroalkylene, or arylene;
each of $L^2$ is independently $C_1$-$C_{12}$ alkylene;
Z and $Z^1$ are each independently a moiety comprising conjugated heterocyclic carbenium;
$Z^2$ is each independently —$(OCH_2CH_2O)_n CH_3$;
n is each independently 1 to 20;
each of R is independently $C_1$-$C_{12}$ alkyl or aryl;
$Ar^1$, $Ar^2$, $Ar^3$, and $Ar^4$ are each independently unsubstituted or substituted phenyl or unsubstituted or substituted heteroaryl; each of $Ar^1$, $Ar^2$, $Ar^3$ and $Ar^4$ is independently substituted with 0 to 5 substituents; the substituents are each independently selected from the group consisting of halide, $CF_3$, $NH_2$, $C_1$-$C_4$ alkyl, $C_1$-$C_4$ alkoxy, $C_1$-$C_4$ alkylamino, $C_1$-$C_4$ dialkyl amino, $NO_2$, CN, or aryl.

In some embodiments, each compound of Formula I is independently a compound of Formula Ia, Formula Ib, or Formula Ic:

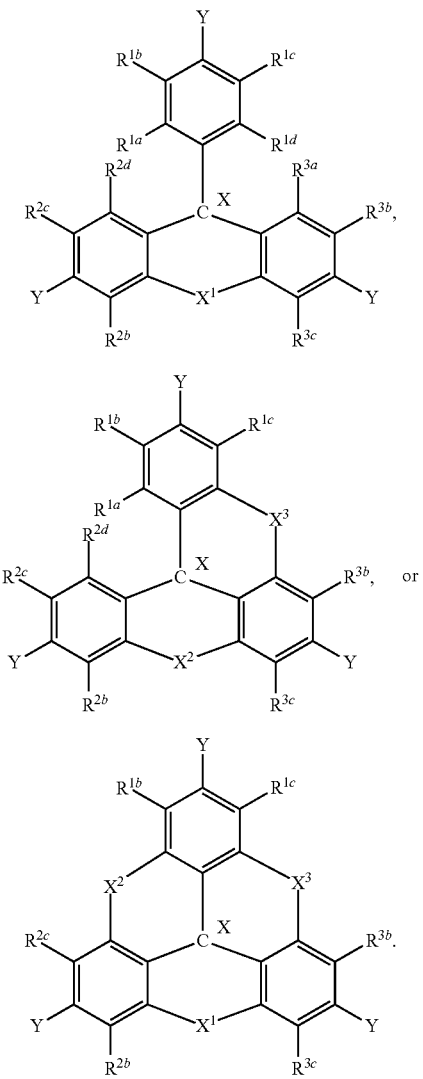

In some embodiments, X is -4, -3, -2, -1, 0, 1, 2, 3, or 4. In some embodiments, each of $X^1$, $X^2$, and $X^3$ is independently O or $NR^{4a}$. In some embodiments, each $R^{4a}$ is independently $C_1$-$C_{12}$ alkyl, $C_1$-$C_4$ alkoxy, $C_1$-$C_4$ alkylamino, $C_1$-$C_4$ dialkyl amino, $Ar^3$, -L-$Ar^3$, -L-Z, or -$L^2$-$Z^2$. In some embodiments, each $R^{4a}$ is independently $C_1$-$C_{12}$ alkyl, $C_1$-$C_4$ alkoxy, $C_1$-$C_4$ alkylamino, $C_1$-$C_4$ dialkyl amino, $Ar^3$, -L-$Ar^3$, or -L-Z. In some embodiments, each $R^{4a}$ is independently methyl, ethyl, propyl, butyl, pentyl, hexyl, —(CH$_2$)—N(Me)$_2$, —(CH$_2$)$_2$—N(Me)$_2$, —(CH$_2$)$_3$—N(Me)$_2$, —(CH$_2$)$_3$—N(Me)$_2$, —(CH$_2$)$_4$—N(Me)$_2$, —(CH$_2$)$_2$—$Ar^3$, —(CH$_2$)$_3$—$Ar^3$, —(CH$_2$)$_3$—$Ar^3$, or —(CH$_2$)$_4$—$Ar^3$; and $Ar^3$ is 2-pyridinyl. In some embodiments, each $R^{4a}$ is —(CH$_2$)—(OCH$_2$CH$_2$O)$_n$CH$_3$, —(CH$_2$)$_2$—(OCH$_2$CH$_2$O)$_n$CH$_3$, —(CH$_2$)$_3$—(OCH$_2$CH$_2$O)$_n$CH$_3$, —(CH$_2$)$_3$—(OCH$_2$CH$_2$O)$_n$CH$_3$, or —(CH$_2$)$_4$—(OCH$_2$CH$_2$O)$_n$CH$_3$; and n is 0, 1, 2, 3, 4, 5, 6, 7, 8, 9, 10, 11, 12, 13, 14, 15, 16, 17, 18, 19, or 20. In some embodiments, each $R^{4a}$ is —(CH$_2$)—(OCH$_2$CH$_2$O)$_n$CH$_3$, —(CH$_2$)$_2$—(OCH$_2$CH$_2$O)$_n$CH$_3$, —(CH$_2$)$_3$—(OCH$_2$CH$_2$O)$_n$CH$_3$, —(CH$_2$)$_3$—(OCH$_2$CH$_2$O)$_n$CH$_3$, or —(CH$_2$)$_4$—(OCH$_2$CH$_2$O)$_n$CH$_3$; and n is 1. In some embodiments, each of Y is independently H or NO$_2$. In some embodiments, $R^{1a}$ and $R^{2d}$ are each $C_1$-$C_4$ alkoxy.

In some embodiments, the each compound is independently a compound of Formula Ib, wherein:
$X^2$ and $X^3$ are each $NR^{4a}$;
each $R^{4a}$ is independently $C_1$-$C_{12}$ alkyl, $C_1$-$C_4$ dialkyl amino, or -L-$Ar^3$;
$R^{1a}$ and $R^{2d}$ are each $C_1$-$C_4$ alkoxy;
each of $R^{1b}$, $R^{1c}$, $R^{2b}$, $R^{2c}$, $R^{3b}$, and $R^{3c}$ is independently H; and
each of Y is independently H or NO$_2$.

In some embodiments, the compound of Formula Ib is a compound, wherein:
$X^2$ and $X^3$ are each $NR^{4a}$;
each $R^{4a}$ is independently $C_1$-$C_{12}$ alkyl, $C_1$-$C_4$ dialkyl amino, -L-$Ar^3$, or -$L^2$-$Z^2$;
$R^{1a}$ and $R^{2d}$ are each $C_1$-$C_4$ alkoxy;
each of $R^{1b}$, $R^{1c}$, $R^{2b}$, $R^{2c}$, $R^{3b}$, and $R^{3R}$ is independently H, $C_1$-$C_4$ alkylamino, or NO$_2$;
each of Y is independently H, NO$_2$, or $NR^{1a}R^{1b}$; and
each of $R^{5a}$ and $R^{5b}$ is independently H, CF$_3$, or $C_1$-$C_{12}$ alkyl.

In some embodiments, the each compound of Formula I is independently a compound of any one of the following:

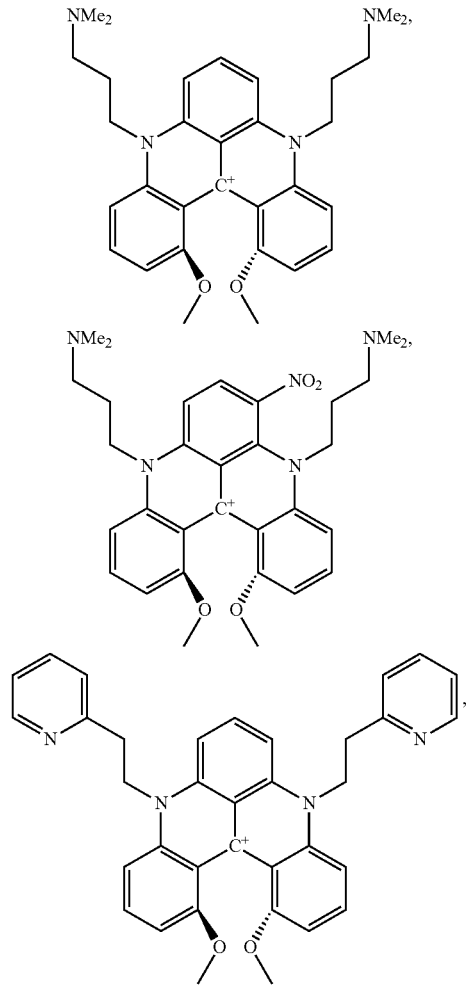

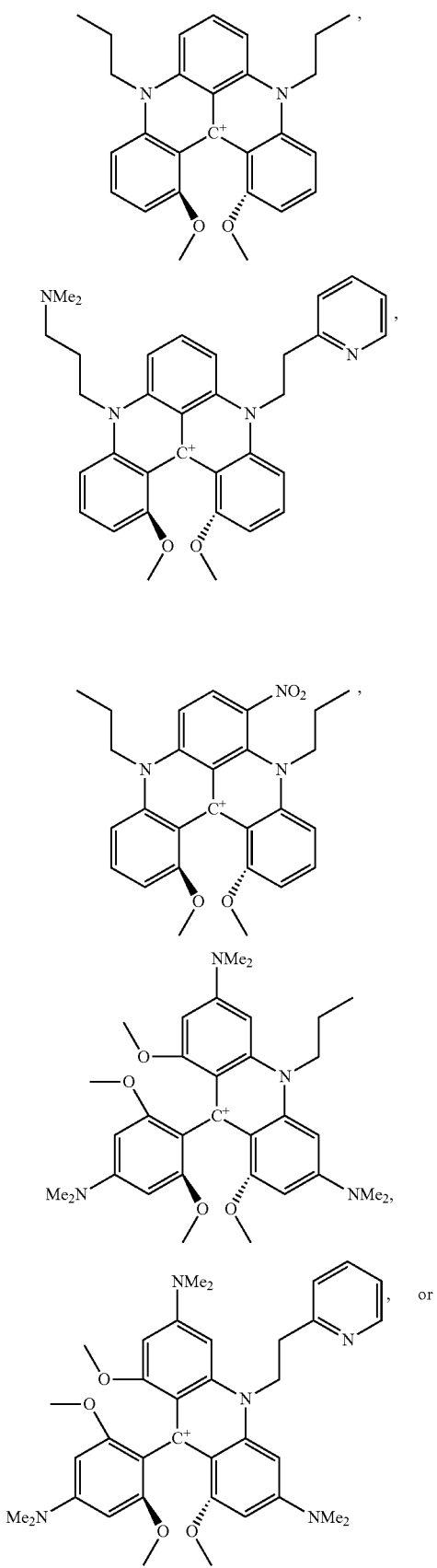

In some embodiments, the each conjugated heterocyclic compound independently further comprises an anion selected from tetrafluoroborate, hexafluorophosphate, perchlorate, tetrarylborate, trifluoromethanesulfonate, oxalatoborate, oxalate, phosphate, bis-trifluoromethanesulfonimide, halide, anion of an ionic liquid, hydroxide, carbonate, bicarbonate, sulfate, hydrogen sulfate, sulfite; or a mixture of any two or more thereof. In some embodiments, the compound of formula I further comprises an anion selected from tetrafluoroborate, hexafluorophosphate, or a mixture of any two or more thereof.

In some embodiments, the redox flow battery further includes a separator positioned between the anolyte and the catholyte.

In some embodiments, the redox flow battery further includes a solvent and an electrolyte salt.

In some embodiments, the electrolyte salt is a lithium, sodium, potassium, ammonium, or alkylammonium salt of tetrafluoroborate, hexafluorophosphate, perchlorate, a tetrarylborate, trifluoromethanesulfonate, oxalatoborate, oxalate, phosphate, bis-trifluoromethanesulfonimide, halide; or a mixture of any two or more thereof. In some embodiments, the electrolyte is an alkylammonium salt of tetrafluoroborate, hexafluorophosphate, perchlorate, a tetrarylborate, trifluoromethanesulfonate, oxalatoborate, oxalate, phosphate, bis-trifluoromethanesulfonimide, halide; or a mixture of any two or more thereof. In some embodiments, the alkylammonium salt is a tetrabutylammonium salt, tetraethylammonium salt, or a mixture thereof. In some embodiments, the electrolyte salt is tetrabutylammonium hexafluorophosphate, tetrabutylammonium tetrafluoroborate, tetraethylammonium tetrafluoroborate, or a mixture of any two or more thereof.

In some embodiments, the solvent comprises nitrile solvent, an ether solvent, dimethylformamide, water, a halogenated solvent, or an ionic liquid.

In some embodiments, wherein each conjugated heterocyclic compound is independently photoactive. In some embodiments, the redox flow battery has an open circuit potential of greater than about 1V, 1.5 V, or 2 V. In some embodiments, the redox flow battery has an open circuit potential of greater than about 2 V. In some embodiments, the redox flow battery has an open circuit potential of from about 1 V to about 5V, about 1.5 V to about 5 V, about 1.5 V to about 3 V, about 2 V to about 5V, about 2 V to about 4 V, or about 2V to about 3V.

Provided in another aspect is a method of operating any one of the redox flow battery systems described herein comprising flowing the catholyte through a catholyte compartment and flowing the anolyte through an anolyte compartment, wherein the catholyte and anolyte compartments are separated by a porous separator and electron transfer from the anolyte to the catholyte is supported. In some embodiments, the porous separator is a porous membrane.

In some embodiments, after electron transfer, the method comprises regenerating the catholyte and/or the anolyte by an external power source. In some embodiments, the regenerating the catholyte comprises regenerating the catholyte via photo-assisted oxidation. In some embodiments, the regenerating the anolyte comprises regenerating the anolyte via photo-assisted reduction.

DETAILED DESCRIPTION

Figure 1:
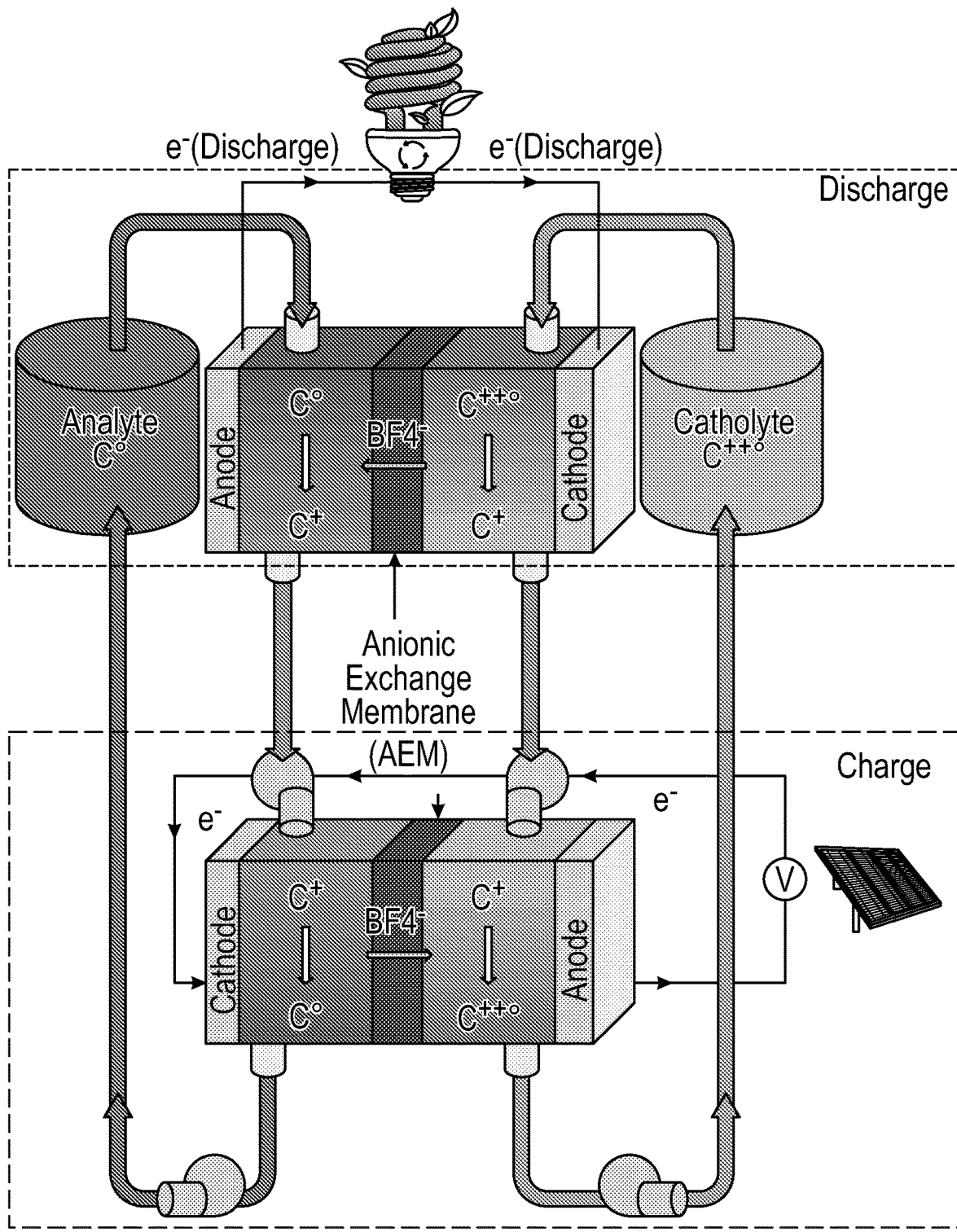
FIG. 1 is an illustration of a redox flow battery—Type 1 RFB, according to some embodiments.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, "substituted" refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a perhaloalkyl group.

The term "alkylene" refers to a saturated linear divalent hydrocarbon moiety or a branched saturated divalent hydrocarbon moiety. Exemplary alkylene groups include, but are not limited to, methylene, ethylene, propylene, butylene, pentylene, 2-methylpropylene, and the like.

The term "heteroalkylene" refers to an alkylene group as defined herein in which one or more chain atoms or hydrogen atoms are replaced with a heteroatom such as O, N, P, or S. Exemplary heteroalkylenes include, but are not limited to, polyethylene glycol derived heteroalkylenes such as PEG2 (i.e., 2 molecules of ethylene glycols are linked), PEG3, 2-methoxyethylene, 2-hydroxyethyl, 2,3-dihydroxypropyl, etc.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups may be substituted or unsubstituted. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, CH—CH=CH$_2$, C=CH$_2$, or C=CHCH$_3$.

As used herein, "aryl" or "aromatic," groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

As used herein, "arylene" refers to a bivalent group derived from an arene where a hydrogen atom has been removed from two ring carbon atoms.

Heteroalkyl group include straight and branched chain alkyl groups as defined above and further include 1, 2, 3, 4, 5, or 6 heteroatoms independently selected from oxygen, sulfur, and nitrogen. Thus, heteroalkyl groups include 1 to 12 carbon atoms, 1 to 10 carbons or, in some embodiments, from 1 to 8, or 1, 2, 3, 4, 5, or 6 carbon atoms, or any range therein (e.g., 1-4). Examples of heteroalkyl groups include, but are not limited to, —(CH$_2$CH$_2$O)$_{1-5}$CH$_3$, —(CH$_2$)$_{1-6}$O(CH$_2$)$_{1-6}$ CH$_3$, —(CH$_2$)$_{1-6}$NR$_a$(CH$_2$)$_{1-6}$ CH$_3$, —(CH$_2$)$_{1-6}$S(CH$_2$)$_{1-6}$ CH$_3$, —(CH$_2$)$_{1-6}$O(CH$_2$)$_{1-6}$O(CH$_2$)$_{1-6}$ CH$_3$, —(CH$_2$)$_{1-6}$NR$_a$(CH$_2$)$_{1-6}$NR$_a$(CH$_2$)$_{1-6}$CH$_3$, —(CH$_2$)$_{1-6}$O(CH$_2$)$_{1-6}$O(CH$_2$)$_{1-6}$O(CH$_2$)$_{1-6}$CH$_3$, —(CH$_2$)$_{1-6}$NR$_a$(CH$_2$)$_{1-6}$NR$_a$(CH$_2$)$_{1-6}$NR$_a$(CH$_2$)$_{1-6}$CH$_3$, with the total number of carbon atoms in the heteroalkyl group being 1 to 12 and R$^a$ is a hydrogen or a substituted or unsubstituted alkyl, alkenyl, aryl or aralkyl group. Other examples of heteroalkyl groups include, but are not limited to, groups having different heteroatoms in a single group. Such examples of heteroalkyl groups include, but are not limited to, —(CH$_2$)$_{1-6}$S(CH$_2$)$_{1-6}$O(CH$_2$)$_{1-6}$—, —(CH$_2$)$_{1-6}$ NR$_a$(CH$_2$)$_{1-6}$) O(CH$_2$)$_{1-6}$, —(CH$_2$)$_{1-6}$O(CH$_2$)$_{1-6}$NR$_a$(CH$_2$)$_{1-6}$S(CH$_2$)$_{1-6}$, —(CH$_2$)$_{1-6}$NR$_a$(CH$_2$)$_{1-6}$O(CH$_2$)$_{1-6}$S(CH$_2$)$_{1-6}$, with the total number of carbon atoms in the heteroalkyl group being 1 to 12. In some embodiments, heteroalkyl groups include, but are not limited to, polyoxyethylene groups, such as —(OCH$_2$CH$_2$—)$_{1-5}$CH$_3$, for example, —O(CH$_2$)$_2$O(CH$_2$)$_2$OCH$_3$, —O(CH$_2$)$_2$O(CH$_2$)$_2$O(CH$_2$)$_2$OCH$_3$, —O(CH$_2$)$_2$O(CH$_2$)$_2$O(CH$_2$)$_2$O(CH$_2$)$_2$OCH$_3$.

Aralkyl groups are substituted aryl groups in which an alkyl group as defined above has a hydrogen or carbon bond of the alkyl group replaced with a bond to an aryl group as defined above. In some embodiments, aralkyl groups contain 7 to 14 carbon atoms, 7 to 10 carbon atoms, e.g., 7, 8, 9, or 10 carbon atoms or any range therein (e.g., 7-8). Aralkyl groups may be substituted or unsubstituted. Substituted aralkyl groups may be substituted at the alkyl, the aryl or both the alkyl and aryl portions of the group. Representative substituted and unsubstituted alkaryl groups include but are not limited to alkylphenyl such as methylphenyl, (chloromethyl)phenyl, chloro(chloromethyl)phenyl, or fused alkaryl groups such as 5-ethylnaphthalenyl.

Heterocyclyl groups are non-aromatic ring compounds containing 3 or more ring members, of which one or more is a heteroatom such as, but not limited to, N, O, and S. In some embodiments, the heterocyclyl group contains 1, 2, 3 or 4 heteroatoms. In some embodiments, heterocyclyl groups include mono-, bi- and tricyclic rings having 3 to 16 ring members, whereas other such groups have 3 to 6, 3 to 10, 3 to 12, or 3 to 14 ring members. Heterocyclyl groups encompass partially unsaturated and saturated ring systems, such as, for example, imidazolinyl and imidazolidinyl groups. The phrase also includes bridged polycyclic ring systems containing a heteroatom such as, but not limited to, quinuclidyl. The phrase also includes heterocyclyl groups that have other groups, such as alkyl, oxo or halo groups, bonded to one of the ring members, referred to as "substituted heterocyclyl groups". Heterocyclyl groups include, but are not limited to, aziridinyl, azetidinyl, pyrrolidinyl, imidazolidinyl, pyrazolidinyl, thiazolidinyl, tetrahydrothiophenyl, tetrahydrofuranyl, dioxolyl, pyrrolinyl, piperidyl, piperazinyl, morpholinyl, thiomorpholinyl, tetrahydropyranyl, and tetrahydrothiopyranyl groups. Representative substituted heterocyclyl groups may be mono-substituted or substituted more than once, such as, but not limited to, morpholinyl groups, which are 2-, 3-, 4-, 5-, or 6-substituted, or disubstituted with various substituents such as those listed above. The heteroatom(s) may also be in oxidized form, if chemically possible.

Heteroaryl groups are aromatic ring compounds containing 5 or more ring members, of which, one or more is a heteroatom such as, but not limited to, N, O, and S. Heteroaryl groups include, but are not limited to, groups such as pyrrolyl, pyrazolyl, triazolyl, tetrazolyl, oxazolyl, isoxazolyl, thiazolyl, pyridinyl, pyridazinyl, pyrimidinyl, pyrazinyl, thiophenyl, benzothiophenyl, furanyl, imidazolyl, benzofuranyl, indolyl, azaindolyl (pyrrolopyridinyl), indazolyl, benzimidazolyl, imidazopyridinyl (azabenzimidazolyl), pyrazolopyridinyl, triazolopyridinyl, benzotriazolyl, benzoxazolyl, benzothiazolyl, benzothiadiazolyl, imidazopyridinyl, isoxazolopyridinyl, thianaphthyl, purinyl, xanthinyl, adeninyl, guaninyl, quinolinyl, isoquinolinyl, tetrahydroquinolinyl, quinoxalinyl, and quinazolinyl groups. Heteroaryl groups include fused ring compounds in which all rings are aromatic such as indolyl groups and include fused ring compounds in which only one of the rings is aromatic, such as 2,3-dihydro indolyl groups. The phrase "heteroaryl groups" includes fused ring compounds and also includes heteroaryl groups that have other groups bonded to one of the ring members, such as alkyl groups, referred to as "substituted heteroaryl groups." Representative substituted heteroaryl groups may be substituted one or more times with various substituents such as those listed above. The heteroatom(s) may also be in oxidized form, if chemically possible.

The term "halogen" or "halo" as used herein refers to bromine, chlorine, fluorine, or iodine. In some embodiments, the halogen is fluorine. In other embodiments, the halogen is chlorine or bromine. The term "halide" as used herein refers to the anion of a halogen, such as bromide, chloride, fluoride, and iodide. In some embodiments, the halide is chloride or iodide.

The terms "alkoxy" refers to a substituted or unsubstituted alkyl group bonded to an oxygen atom, such as a moiety of the formula —$OR^a$, wherein $R^a$ is alkyl as defined herein. Examples include but are not limited to methoxy and ethoxy. Representative substituted alkoxy groups may be substituted one or more times with substituents such as those listed above, such as methoxymethyl and fluoromethoxy.

The term "alkylamino" refers to a moiety of the formula —$NHR^a$, where $R^a$ is alkyl as defined herein.

The term "dialkyl amino" refers to a moiety of the formula —$NR^aR^b$, wherein $R^a$ and $R^b$ are independently alkyl as defined herein.

Disclosed herein are redox flow battery systems comprising conjugated heterocyclic carbenium compounds as both the anolyte and catholyte. These conjugated heterocyclic carbenium compounds are redox active compounds that can reversibly be reduced and oxidized to provide an open circuit potential higher than 2V (potential difference between the oxidation and reduction). Also, using the same compound as both catholyte and analyte avoids cross over contamination and reduced battery life associated with current redox flow battery systems. Also, the conjugated heterocyclic carbenium compounds disclosed herein are also photoactive, which also allows for the preparation of redox flow battery systems that photo catalytically charged.

These conjugated heterocyclic carbenium ions are easily prepared from successive double $S_NAr$ reactions between tris(2,6-dimethoxyphenyl)carbenium ion and primary amines at moderate-to-high temperatures with methanol elimination. These stable carbenium salts are of particular interest because: 1) they are among the most stable carbocation in the literature, including under mild acidic or basic aqueous conditions; 2) the stepwise and temperature dependence of the synthesis allows versatility by using aliphatic or aromatic amines, and forming unsymmetrical ions; 3) they can be functionalized via C—H borylation, and/or metal-catalyzed cross-coupling; and 4) the negative counterions can be exchanged to affect the physical and chemical properties of the salts. Not only are these conjugated heterocyclic carbenium compounds also highly fluorescent with large extinction coefficients and long fluorescence life times, these conjugated heterocyclic carbenium compounds are redox active species with three stable redox states: carbodication, carbocation, and neutral carboradical.

The redox states of the heterocyclic carbenium compounds are illustrated in the below Scheme. Neutral radical (C.) and radical dication ($C^{++}$.) can lose and gain an electron respectively to form the carbocation ($C^+$), resulting in the battery discharge and generation of electricity (Scheme 1; steps with red dashed arrows). Alternately, the carbocation ($C^+$) can gain or lose an electron to convert to the neutral radical (C.) or radical dication ($C^{++}$.) respectively, resulting in battery charge (Scheme A; steps with blue solid arrows).

Scheme A

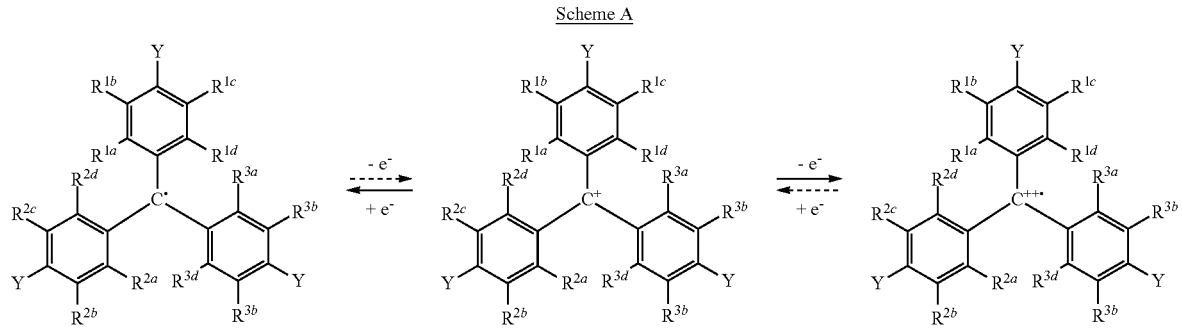

Their stability, reduction and oxidation potential, solubility in organic solvent, and tunability via simple organic transformation make these compounds ideal candidates to be tested as the anolyte and catholyte for RFBs.

Additionally, the heterocyclic carbenium compounds are photoactive, thus allowing for the development of a system where the battery is photo catalytically charged. The carbocation can be excited by visible light (>500 nm). It's excited state ($C^+$.) can get oxidized to $C^{++}$. or reduced to C. at an electrode.

Furthermore, the use of the conjugated heterocyclic carbenium compounds as both the anolyte and catholyte also allows for the development of a symmetric organic redox flow battery (SORFB). This provides an opportunity to improve the properties of the exchange membrane (EM) that separates the two poles of the battery and overcome the limitations associated with vanadium-based RFBs as mentioned above. In particular, the anion-selective membrane typically used in vanadium-based RFBs is replaced with a simple porous exchanged membrane (EM), where the pore Scheme B

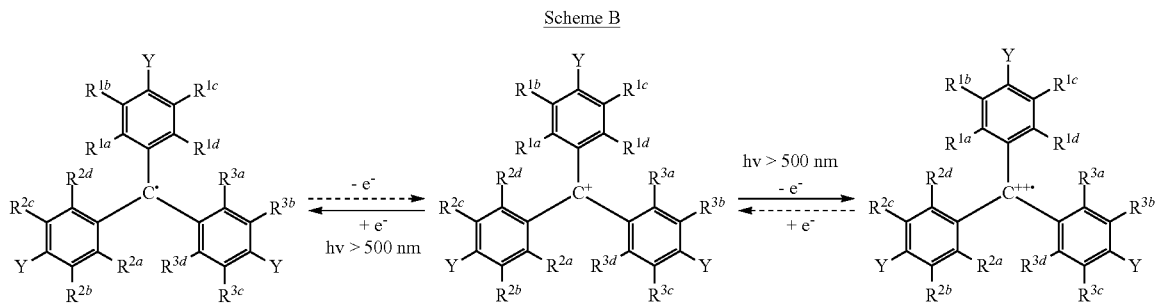

Figure 2:
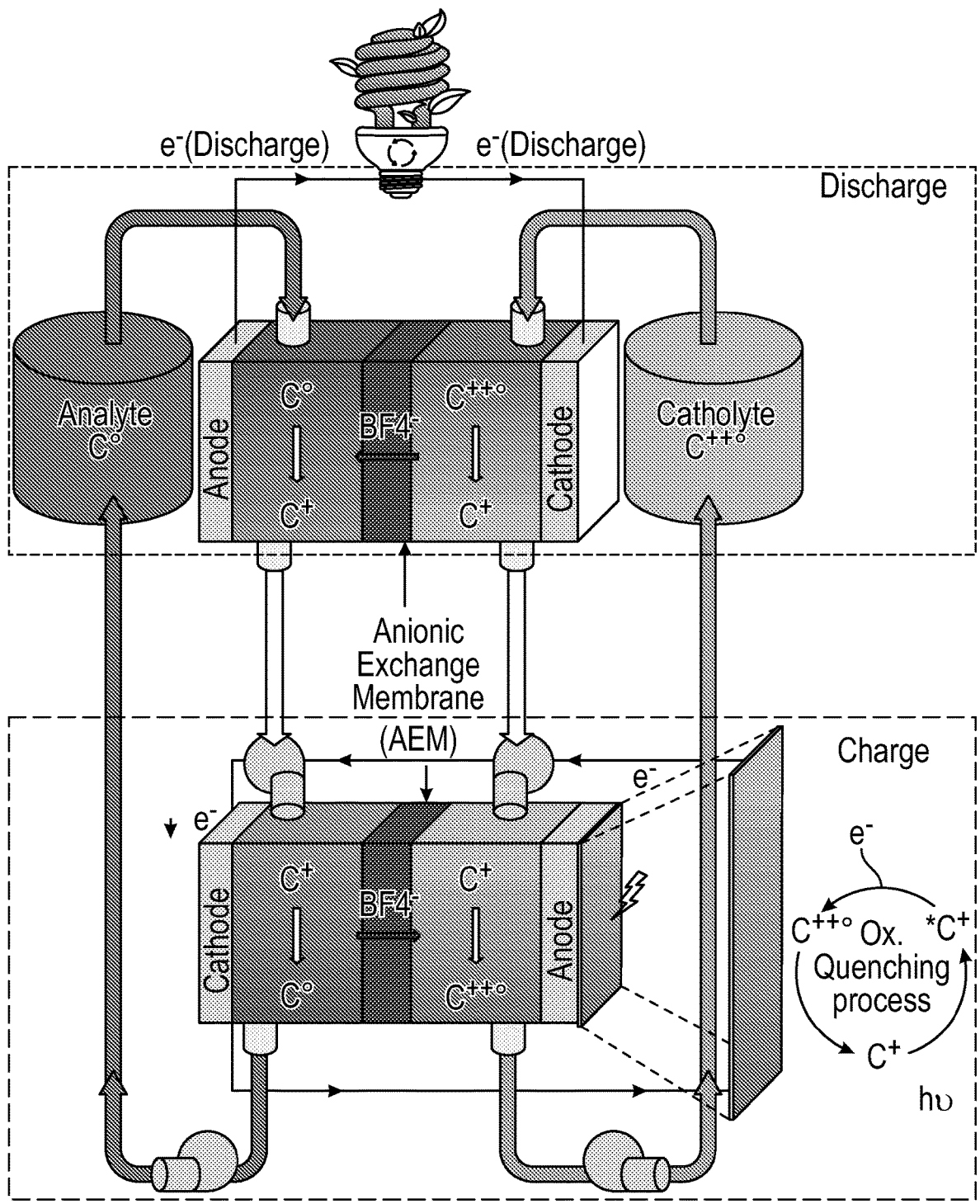
FIG. 2 is an illustration of a redox flow battery—Type 2 RFB, according to some embodiments.

Due to both the electrochemical and photochemical properties of heterocyclic carbenium compounds, redox flow battery systems may be developed using these compounds as both the anolyte and catholyte. The redox flow batteries described herein may include a catholyte compartment that contains the catholyte, a anolyte compartment that contains the anolyte, and a porous separator (e.g., a membrane or other cation-permeable material) partitioning the catholyte and anolyte compartments. Two illustrative examples are shown in FIGS. 1 and 2. In both cases the generation of current from the battery come from the discharge of C. and $C^{++}$. forming $C^+$ upon losing and gaining an electron respectively.

FIG. 1 shows an embodiment of the redox flow battery—Type I RFB. For this embodiment, the charge occurs via an electric current provided by an external source of energy, such an ideal renewable energy that need to be stored (e.g., wind, solar, and the like). In the preliminary experiments disclosed herein, the current is provided by a potentiostat.

FIG. 2 shows an embodiment of the redox flow battery—Type II RFB. The Type II RFB uses the photovoltaic properties of $C^+$, in which after absorption of visible light, the excited state can be oxidized back to the catholyte $C^{++}$. upon loss of an electron. That electron can travel to the cathode to reduce $C^+$ to the anolyte C..

size of the EM provides selectivity based on size exclusion. Compared to VRFBs and other RFBs, the threat of leakage of electroactive materials from one pole of the battery to the other is minimized for a SORFBs, since the use of conjugated heterocyclic carbenium compounds as both the anolyte and catholyte reduces the chemical gradient of electroactive species and decreases crossover. Even if transmembrane crossover occurs, SRFBs may undergo self-discharge, thus restoring the ROM to its initial redox state instead of permanent contamination and electrolyte degradation. As such, the symmetric RFBs can potentially be stored indefinitely without irreversible side reactions. [29] Exemplary porous exchanged membranes (EM), where the pore size of the EM provides selectivity based on size exclusion, are further discussed herein.

First Embodiment of Redox Flow Battery

Provided in one aspect is a redox flow battery including: a catholyte including a radical dication of a conjugated heterocyclic carbenium compound; and an anolyte including a neutral radical of a conjugated heterocyclic carbenium compound; wherein the conjugated heterocyclic compounds present in the catholyte and anolyte are the same compound. "Same compound" as used herein refers to two different species, such as the radical dication and neutral radical, while having different oxidation states/charges, have the same atomic components and structure of the cathodic and anodic species.

In some embodiments, the redox flow battery has an open circuit potential of greater than about 1 V. In some embodiments, the redox flow battery has an open circuit potential of greater than about 2 V. In some embodiments, the redox flow battery has an open circuit potential of from about 1 V to about 5V, about 1.5 V to about 5 V, about 1.5 V to about 3 V, about 0.2 V to about 5V, about 2 V to about 4 V, or about 2V to about 3V.

Provided in another aspect is a redox flow battery including: a catholyte including a radical dication of a compound of Formula I; and an anolyte including a neutral radical of a compound of Formula I; wherein the compound of Formula (I) is represented by the following structure disclosed herein.

The conjugated heterocyclic carbenium compounds disclosed herein are compounds of Formula I. The compound of Formula (I) is represented by the following structure:

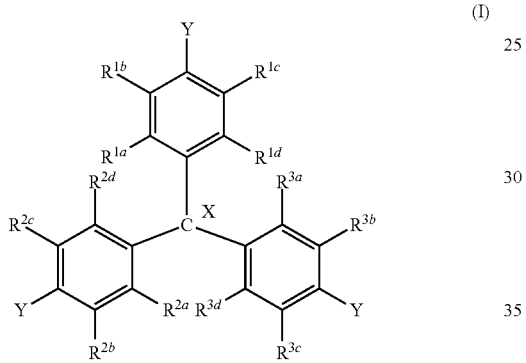

(I)

wherein:
X is from −4 to +4;
each of $R^{1a}$, $R^{1b}$, $R^{1c}$, $R^{1d}$, $R^{2a}$, $R^{2b}$, $R^{2c}$, $R^{2d}$, $R^{3a}$, $R^{3b}$, $R^{3c}$, and $R^{3d}$ is independently H, halide, $CF_3$, $NH_2$, $C_1$-$C_{12}$ alkyl, $C_1$-$C_4$ alkoxy, $C_1$-$C_4$ alkylamino, $C_1$-$C_4$ dialkyl amino, $NO_2$, CN, $CO_2R$, or $Ar^1$;
or $R^{2a}$ and $R^{3d}$ together form —$X^1$—;
or $R^{1a}$ and $R^{2d}$ together form —$X^2$—;
or $R^{1d}$ and $R^{3a}$ together form —$X^3$—;
or $R^{1a}$ and $R^{1b}$ together with atoms to which they are attached to form a phenyl;
or $R^{2c}$ and $R^{2d}$ together with atoms to which they are attached to form a phenyl;
each of $X^1$, $X^2$ and $X^3$ is independently O, $NR^{4a}$, $PR^{4a}$, $CR^{4a}R^{4b}$, or $SiR^{4a}R^{4b}$;
each of $R^{4a}$ and $R^{4b}$ is independently H, halide, $CF_3$, $C_1$-$C_{12}$ alkyl, $C_1$-$C_4$ alkoxy, $C_1$-$C_4$ alkylamino, $C_1$-$C_4$ dialkyl amino, $Ar^3$, -L-$Ar^3$, -L-Z, or -$L^2$-$Z^2$;
each of Y is independently H, halide, $OR^{5a}$, $NR^{5a}R^{5b}$, $PR^{5a}R^{5b}$, $NO_2$, CN, $CF_3$, $CO_2R$, $N_3$, or $Ar^2$;
each of $R^{5a}$, and $R^{5b}$ is independently H, $CF_3$, $C_1$-$C_{12}$ alkyl, $C_1$-$C_4$ alkoxy, $C_1$-$C_4$ alkylamino, $C_1$-$C_4$ dialkyl amino, $Ar^4$, -$L^1$-$Ar^4$, or -$L^1$-$Z^1$;
each of L and $L^1$ is independently $C_1$-$C_{12}$ alkylene, $C_1$-$C_{12}$ heteroalkylene, or arylene;
each of $L^2$ is independently $C_1$-$C_{12}$ alkylene;
Z and $Z^1$ are each independently a moiety comprising conjugated heterocyclic carbenium;
$Z^2$ is each independently —$(OCH_2CH_2O)_nCH_3$;
n is each independently 1 to 20;
each of R is independently $C_1$-$C_{12}$ alkyl or aryl;
$Ar^1$, $Ar^2$, $Ar^3$ and $Ar^4$ are each independently unsubstituted or substituted phenyl or unsubstituted or substituted heteroaryl; each of $Ar^1$, $Ar^2$, $Ar^3$ and $Ar^4$ is independently substituted with 0 to 5 substituents; the substituents are each independently selected from the group consisting of halide, $CF_3$, $NH_2$, $C_1$-$C_4$ alkyl, $C_1$-$C_4$ alkoxy, $C_1$-$C_4$ alkylamino, $C_1$-$C_4$ dialkyl amino, $NO_2$, CN, or aryl.

In some embodiments, the compound of Formula I is a compound of Formula Ia, Formula Ib, or Formula Ic:

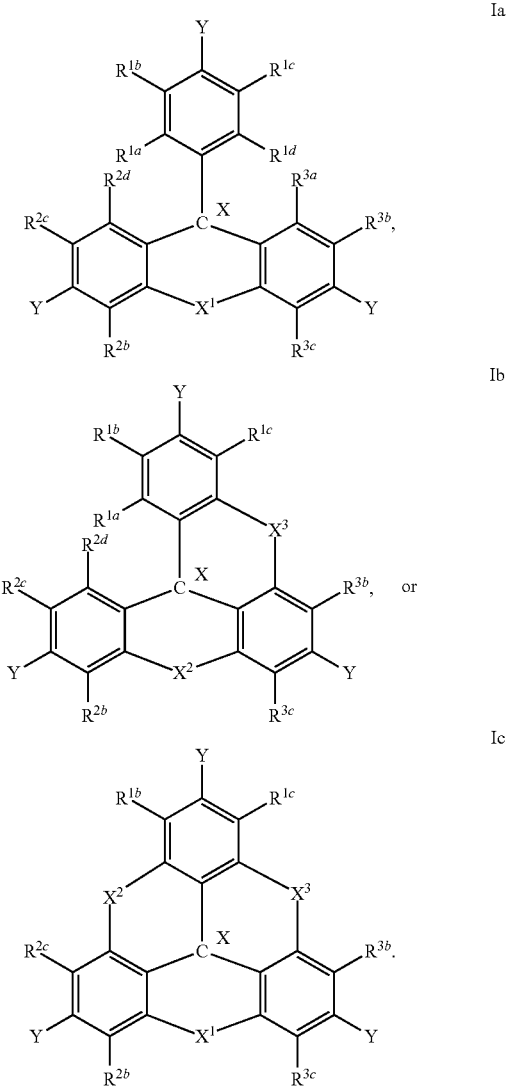

In some embodiments, X is -4, -3, -2, -1, 0, 1, 2, 3, or 4. In some embodiments, each of $X^1$, $X^2$, and $X^3$ is independently O or $NR^{4a}$. In some embodiments, $X^1$ is O or $NR^{4a}$. In some embodiments, $X^2$ is O or $NR^{4a}$. In some embodiments, $X^3$ is O or $NR^{4a}$.

In some embodiments, each $R^{4a}$ is independently $C_1$-$C_{12}$ alkyl, $C_1$-$C_4$ alkoxy, $C_1$-$C_4$ alkylamino, $C_1$-$C_4$ dialkyl amino, $Ar^3$, -L-$Ar^3$, -L-Z, or -$L^2$-$Z^2$. In some embodiments, each $R^{4a}$ is independently $C_1$-$C_{12}$ alkyl, $C_1$-$C_4$ alkoxy, $C_1$-$C_4$ alkylamino, $C_1$-$C_4$ dialkyl amino, $Ar^3$, -L-$Ar^3$, or -L-Z. In some embodiments, $R^{4a}$ is $C_1$-$C_{12}$ alkyl. In some embodiments, $R^{4a}$ is $C_1$-$C_4$ alkoxy. In some embodiments, $R^{4a}$ is $C_1$-$C_4$ dialkyl amino. In some embodiments, $R^{4a}$ is $Ar^3$. In some embodiments, $R^{4a}$ is -L-$Ar^3$. In some embodiments, $R^{4a}$ is -L-Z. In some embodiments, $R^{4a}$ is -$L^2$-$Z^2$.

In some embodiments, each $R^{4a}$ is independently methyl, ethyl, propyl, butyl, pentyl, hexyl, —(CH$_2$)—N(Me)$_2$, —(CH$_2$)$_2$—N(Me)$_2$, —(CH$_2$)$_3$—N(Me)$_2$, —(CH$_2$)$_3$—N(Me)$_2$, —(CH$_2$)$_4$—N(Me)$_2$, —(CH$_2$)$_2$—$Ar^3$, —(CH$_2$)$_3$—$Ar^3$, —(CH$_2$)$_3$—$Ar^3$, or —(CH$_2$)$_4$—$Ar^3$; and $Ar^3$ is 2-pyridinyl. In some embodiments, $R^{4a}$ is methyl, ethyl, propyl, butyl, pentyl, or hexyl. In some embodiments, $R^{4a}$ is —(CH$_2$)—N(Me)$_2$, —(CH$_2$)$_2$—N(Me)$_2$, —(CH$_2$)$_3$—N(Me)$_2$, —(CH$_2$)$_3$—N(Me)$_2$, or —(CH$_2$)$_4$—N(Me)$_2$. In some embodiments, $R^{4a}$ is —(CH$_2$)$_2$—$Ar^3$, —(CH$_2$)$_3$—$Ar^3$, —(CH$_2$)$_3$—$Ar^3$, or —(CH$_2$)$_4$—$Ar^3$. In some embodiments, $Ar^3$ is pyridinyl, such as 2-pyridinyl. In some embodiments, $R^{4a}$ is —(CH$_2$)—(OCH$_2$CH$_2$O)$_n$CH$_3$; wherein n is 0, 1, 2, 3, 4, 5, 6, 7, 8, 9, 10, 11, 12, 13, 14, 15, 16, 17, 18, 19, or 20. In some embodiments, $R^{4a}$ is —(CH$_2$)$_2$—(OCH$_2$CH$_2$O)$_n$CH$_3$; wherein n is 0, 1, 2, 3, 4, 5, 6, 7, 8, 9, 10, 11, 12, 13, 14, 15, 16, 17, 18, 19, or 20. In some embodiments, $R^{4a}$ is —(CH$_2$)$_3$—(OCH$_2$CH$_2$O)$_n$CH$_3$; wherein n is 0, 1, 2, 3, 4, 5, 6, 7, 8, 9, 10, 11, 12, 13, 14, 15, 16, 17, 18, 19, or 20. In some embodiments, $R^{4a}$ is —(CH$_2$)$_4$—(OCH$_2$CH$_2$O)$_n$CH$_3$; wherein n is 0, 1, 2, 3, 4, 5, 6, 7, 8, 9, 10, 11, 12, 13, 14, 15, 16, 17, 18, 19, or 20. In some embodiments, $R^{4a}$ is —(CH$_2$)$_3$—(OCH$_2$CH$_2$O)$_n$CH$_3$; wherein n is 1.

In some embodiments, Y is an electron-withdrawing substituent. In some instances, the additional of an electron withdrawing, such as NO$_2$, improves the stability to oxygen and also adds a reduction potential, allowing the storage of more than one electron per molecule. In some embodiments, the compound of Formula I has one, two, or three Y groups, where Y is NO$_2$. In some embodiments, Y is an electron donating substituent. In some embodiments, each of Y is independently H or NO$_2$. In some embodiments, each of Y is H. In some embodiments, Y is NO$_2$. In some embodiments, Y is NR$^{5a}$R$^{5b}$ with each of $R^{5a}$, and $R^{5b}$ is independently $C_1$-$C_{12}$ alkyl. In some embodiments, Y is N(Me)$_2$.

In some embodiments, $R^{1a}$ and $R^{2d}$ are each $C_1$-$C_4$ alkoxy. In some embodiments, $R^{1a}$ is $C_1$-$C_4$ alkoxy, such as methoxy or ethoxy. In some embodiments, $R^{2d}$ is $C_1$-$C_4$ alkoxy, such as methoxy or ethoxy.

In some embodiments, $R^{1d}$ and $R^{3a}$ are each $C_1$-$C_4$ alkoxy. In some embodiments, $R^{1d}$ is $C_1$-$C_4$ alkoxy, such as methoxy or ethoxy. In some embodiments, $R^{3a}$ is $C_1$-$C_4$ alkoxy, such as methoxy or ethoxy.

In some embodiments, each of $R^{1a}$, $R^{1b}$, $R^{1c}$, $R^{1d}$, $R^{2a}$, $R^{2b}$, $R^{2c}$, $R^{2d}$, $R^{3a}$, $R^{3b}$, $R^{3c}$, and $R^{3d}$ is independently H. In some embodiments, each of $R^{1b}$, $R^{1c}$, $R^{2b}$, $R^{2c}$, $R^{3b}$, and $R^{3c}$ is independently H. In some embodiments, $R^{1b}$ is H. In some embodiments, $R^{1c}$ is H. In some embodiments, $R^{2b}$ is H. In some embodiments, $R^{2c}$ is H. In some embodiments, $R^{3b}$ is H.

In some embodiments, the compound of Formula Ia is a compound, wherein: $X^1$ is each NR$^{4a}$; each $R^{4a}$ is independently $C_1$-$C_{12}$ alkyl, $C_1$-$C_4$ dialkyl amino, -L-$Ar^3$, or -$L^2$-$Z^2$; $R^{1a}$, $R^{1d}$, $R^{3a}$, and $R^{2d}$ are each $C_1$-$C_4$ alkoxy; each of $R^{1b}$, $R^{1c}$, $R^{2b}$, $R^{2c}$, $R^{3b}$, and $R^{3c}$ is independently H, $C_1$-$C_4$ alkylamino, or NO$_2$; each of Y is independently H, NO$_2$, or NR$^{5a}$R$^{5b}$; and each of $R^{5a}$ and $R^{5b}$ is independently H, CF$_3$, or $C_1$-$C_{12}$ alkyl..

In some embodiments, $X^1$ is each NR$^{4a}$. In some embodiments, each $R^{4a}$ is $C_1$-$C_{12}$ alkyl. In some embodiments, each $R^{4a}$ is $C_1$-$C_4$ dialkyl amino. In some embodiments, each $R^{4a}$ is -L-$Ar^3$. In some embodiments, each $R^{4a}$ is -$L^2$-$Z^2$. In some embodiments, $R^{1a}$, $R^{1d}$, $R^{3a}$, and $R^{2d}$ are each $C_1$-$C_4$ alkoxy. In some embodiments, each of $R^{1b}$, $R^{1c}$, $R^{2b}$, $R^{2c}$, $R^{3b}$, and $R^{3c}$ is independently H or $C_1$-$C_4$ alkylamino. In some embodiments, each of $R^{1b}$, $R^{1c}$, $R^{2b}$, $R^{2c}$, $R^{3b}$, and $R^{3R}$ is independently H or NO$_2$. In some embodiments, each of Y is independently H or NO$_2$. In some embodiments, each of Y is independently H, or NR$^{5a}$R$^{5b}$. In some embodiments, each of $R^{5a}$ and $R^{5b}$ is independently H or $C_1$-$C_{12}$ alkyl.

In some embodiments, the compound of Formula Ib is a compound, wherein:

$X^2$ and $X^3$ are each NR$^{4a}$;

each $R^{4a}$ is independently $C_1$-$C_{12}$ alkyl, $C_1$-$C_4$ dialkyl amino, -L-$Ar^3$, or -$L^2$-$Z^2$;

$R^{1a}$ and $R^{2d}$ are each $C_1$-$C_4$ alkoxy;

each of $R^{1b}$, $R^{1c}$, $R^{2b}$, $R^{2c}$, $R^{3b}$, and $R^{3c}$ is independently H, $C_1$-$C_4$ alkylamino, or NO$_2$;

each of Y is independently H, NO$_2$, or NR$^{5a}$R$^{5b}$; and each of $R^{5a}$ and $R^{5b}$ is independently H, CF$_3$, or $C_1$-$C_{12}$ alkyl.

In some embodiments, $X^2$ and $X^3$ are each NR$^{4a}$. In some embodiments, each $R^{4a}$ is $C_1$-$C_{12}$ alkyl. In some embodiments, each $R^{4a}$ is $C_1$-$C_4$ dialkyl amino. In some embodiments, each $R^{4a}$ is -L-$Ar^3$. In some embodiments, each $R^{4a}$ is -$L^2$-$Z^2$. In some embodiments, $R^{1a}$ and $R^{2d}$ are each $C_1$-$C_4$ alkoxy. In some embodiments, each of $R^{1b}$, $R^{1c}$, $R^{2b}$, $R^{2c}$, $R^{3b}$, and $R^{3c}$ is independently H or $C_1$-$C_4$ alkylamino. In some embodiments, each of $R^{1b}$, $R^{1c}$, $R^{2b}$, $R^{2c}$, $R^{3b}$, and $R^{3c}$ is independently H or NO$_2$. In some embodiments, each of Y is independently H or NO$_2$. In some embodiments, each of Y is independently H, or NR$^{5a}$R$^{5b}$. In some embodiments, each of $R^{5a}$ and $R^{5b}$ is independently H or $C_1$-$C_{12}$ alkyl.

In some embodiments, the compound of Formula Ib is a compound, wherein:

$X^2$ and $X^3$ are each NR$^{4a}$;

each $R^{4a}$ is independently $C_1$-$C_{12}$ alkyl, $C_1$-$C_4$ dialkyl amino, or -L-$Ar^3$;

$R^{1a}$ and $R^{2d}$ are each $C_1$-$C_4$ alkoxy;

each of $R^{1b}$, $R^{1c}$, $R^{2b}$, $R^{2c}$, $R^{3b}$, and $R^{3c}$ is independently H; and each of Y is independently H or NO$_2$.

In any of the embodiment described herein, the compound of Formula I may include functional groups that improves the solubility of the compound or the compound in its redox states in an organic solvent, such as CH$_3$CN. These functional groups include oligomeric functionality that can increase solubility, such as PEGyl chains (—(OCH$_2$CH$_2$O)$_n$CH$_3$) as shown in the below compound. This type of molecular engineering has already been proven in recent literature to drastically increase solubility [30, 31], and the relevance of this approach was confirmed by a recent community review. [32]

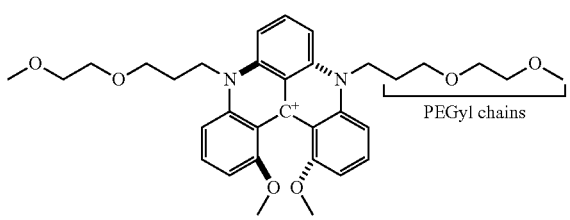

In some embodiments, the compound of Formula I is a compound of any one of the following:

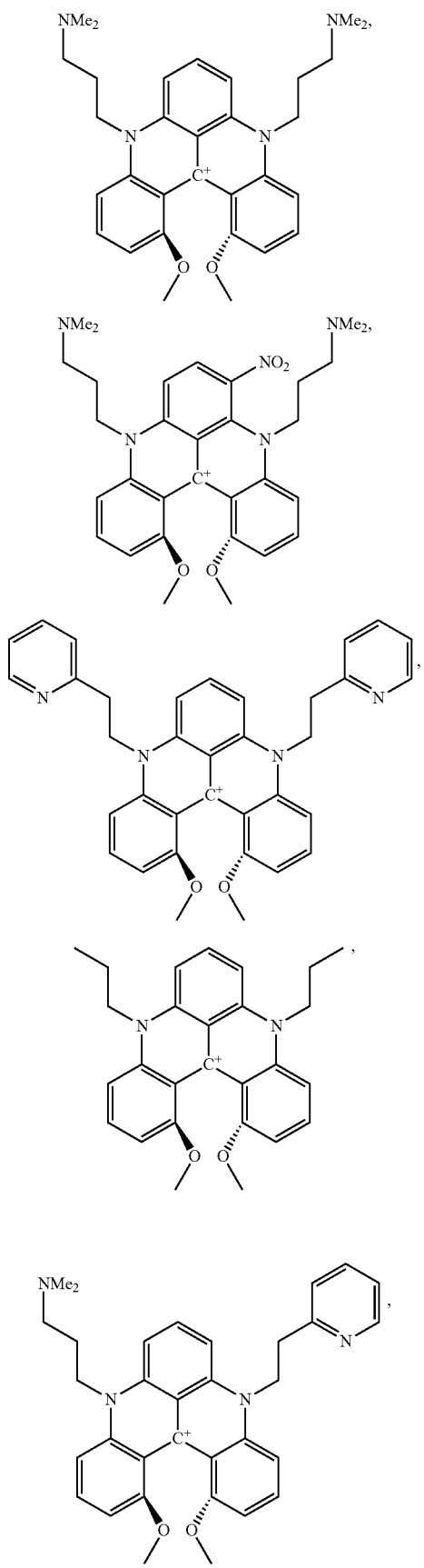

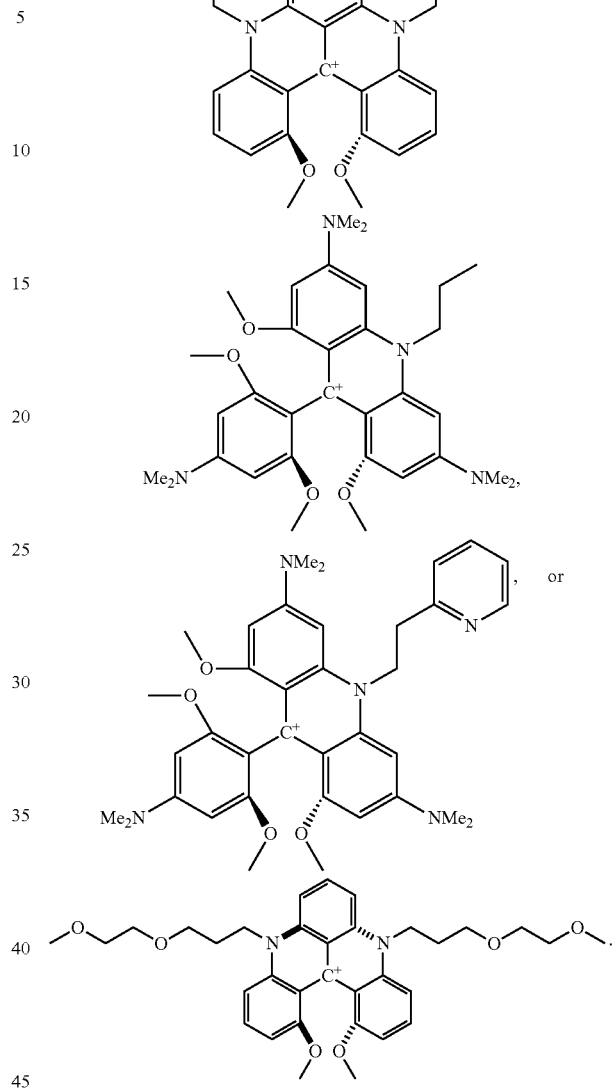

The compounds of Formula I described herein further include a counter anion. Exemplary counter anions of carbocation of Formula I include, but are not limited to, any anion including, but not limited to, halides (e.g., Cl, F, I, and Br), an anion derived from organic compounds such as carboxylates, phosphates, sulfates, etc. In some embodiments, the compound of formula I further includes an anion selected from tetrafluoroborate, hexafluorophosphate, perchlorate, tetrarylborate, trifluoromethanesulfonate, oxalatoborate, oxalate, phosphate, bis-trifluoromethanesulfonimide, halide, anion of an ionic liquid, hydroxide, carbonate, bicarbonate, sulfate, hydrogen sulfate, sulfite; or a mixture of any two or more thereof. In some embodiments, the compound of formula I further comprises an anion selected from tetrafluoroborate, hexafluorophosphate, or a mixture of any two or more thereof.

In some embodiments, the compound of Formula I is photoactive. In some embodiments, the compound of Formula I is excited by visible light. In some embodiments, the compound of Formula I is excited by a wavelength of greater than about 500 nm.

In some embodiments, Z and $Z^1$ are each independently a moiety including a conjugated heterocyclic carbenium. The moiety including the conjugated heterocyclic carbenium may be a compound of Formula I, including compounds of Formula Ia, Ib, and Ic as described herein. In some instances, when Z and $Z^1$ are each independently a moiety including a conjugated heterocyclic carbenium, the resulting compound is a compound that includes two or more conjugated heterocyclic carbeniums. For instance, a compound of Formula Ib may be covalently linked by a arylene, alkylene, or heteroalkylene linker to another compound of Formula Ib, or a compound of Formula Ic covalently linked by a arylene, alkylene, or heteroalkylene linker to another compound of Formula Ic.

Second Embodiment of Redox Flow Battery

Provided in another aspect is a redox flow battery including:
- a catholyte including a conjugated heterocyclic cationic compound in a first oxidation state; and
- an anolyte including a conjugated heterocyclic cationic compound in a second oxidation state;
- wherein the first oxidation state is a higher oxidation state than the second oxidation state.

In some embodiments, the conjugated heterocyclic compound in catholyte and the conjugated heterocyclic compound in the anolyte are the same compounds, wherein same compound refers to two different species, that have different oxidation states but have the same atomic components and structure of the cathodic and anodic species.

In some embodiments, the conjugated heterocyclic compound in the catholyte and the conjugated heterocyclic compound in the anolyte are different compounds. For instance, the anolyte includes a carbenium with an electron donating substituent and the catholyte includes a carbenium with electron donating substituent.

The redox flow battery system may involve multi-electron processes, including two, three, four, or more electrons. In some embodiments, the redox flow battery involves a two electron process, such as the oxidation of a carbenium compound to the radical dication and the reduction of the carbenium compound to the neutral radical. In some embodiments, the redox flow battery involves a four electron or more electron process, where adding electron-donating or electron-withdrawing substituents to the conjugated heterocyclic carbenium compounds is used to achieve different oxidation states/charges.

The conjugated heterocyclic compound in the catholyte or anolyte may be any one of the carbenium compounds described herein. In some embodiments, the conjugated heterocyclic compound in the catholyte and anolyte are each independently a compound of Formula I, wherein the compound of Formula (I) is represented by the following structure:

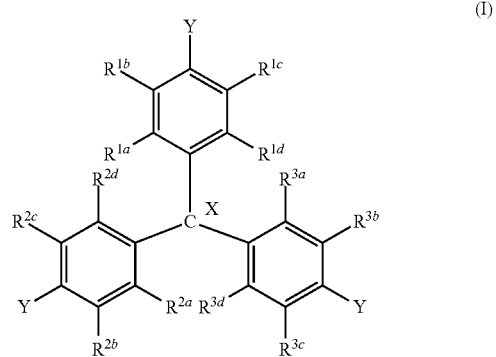

wherein:
X is from −4 to +4;
each of $R^{1a}$, $R^{1b}$, $R^{1c}$, $R^{1d}$, $R^{2a}$, $R^{2b}$, $R^{2c}$, $R^{2d}$, $R^{3a}$, $R^{3b}$, $R^{3c}$, and $R^{3d}$ is independently H, halide, $CF_3$, $NH_2$, $C_1$-$C_{12}$ alkyl, $C_1$-$C_4$ alkoxy, $C_1$-$C_4$ alkylamino, $C_1$-$C_4$ dialkyl amino, $NO_2$, CN, $CO_2R$, or $Ar^1$;
or $R^{2a}$ and $R^{3d}$ together form —$X^1$—;
or $R^{1a}$ and $R^{2d}$ together form —$X^2$—;
or $R^{1d}$ and $R^{3a}$ together form —$X^3$—;
or $R^{1a}$ and $R^{1b}$ together with atoms to which they are attached to form a phenyl;
or $R^{2c}$ and $R^{2d}$ together with atoms to which they are attached to form a phenyl;
each of $X^1$, $X^2$ and $X^3$ is independently O, $NR^{4a}$, $PR^{4a}$, $CR^{4a}R^{4b}$, or $SiR^{4a}R^{4b}$;
each of $R^{4a}$ and $R^{4b}$ is independently H, halide, $CF_3$, $C_1$-$C_{12}$ alkyl, $C_1$-$C_4$ alkoxy, $C_1$-$C_4$ alkylamino, $C_1$-$C_4$ dialkyl amino, $Ar^3$, -L-$Ar^3$, -L-Z, or -$L^2$-$Z^2$;
each of Y is independently H, halide, $OR^{5a}$, $NR^{5a}R^{5b}$, $PR^{5a}R^{5b}$, $NO_2$, CN, $CF_3$, $CO_2R$, $N_3$, or $Ar^2$;
each of $R^{5a}$, and $R^{5b}$ is independently H, $CF_3$, $C_1$-$C_{12}$ alkyl, $C_1$-$C_4$ alkoxy, $C_1$-$C_4$ alkylamino, $C_1$-$C_4$ dialkyl amino, $Ar^4$, -$L^1$-$Ar^4$, or -$L^1$-$Z^1$;
each of L and $L^1$ is independently $C_1$-$C_{12}$ alkylene, $C_1$-$C_{12}$ heteroalkylene, or arylene;
each of $L^2$ is independently $C_1$-$C_{12}$ alkylene;
Z and $Z^1$ are each independently a moiety comprising conjugated heterocyclic carbenium;
$Z^2$ is each independently —$(OCH_2CH_2O)_nCH_3$;
n is each independently 1 to 20;
each of R is independently $C_1$-$C_{12}$ alkyl or aryl;
$Ar^1$, $Ar^2$, $Ar^3$ and $Ar^4$ are each independently unsubstituted or substituted phenyl or unsubstituted or substituted heteroaryl; each of $Ar^1$, $Ar^2$, $Ar^3$, and $Ar^4$ is independently substituted with 0 to 5 substituents; the substituents are each independently selected from the group consisting of halide, $CF_3$, $NH_2$, $C_1$-$C_4$ alkyl, $C_1$-$C_4$ alkoxy, $C_1$-$C_4$ alkylamino, $C_1$-$C_4$ dialkyl amino, $NO_2$, CN, or aryl.

In some embodiments, each compound of Formula I is independently a compound of Formula Ia, Formula Ib, or Formula Ic:

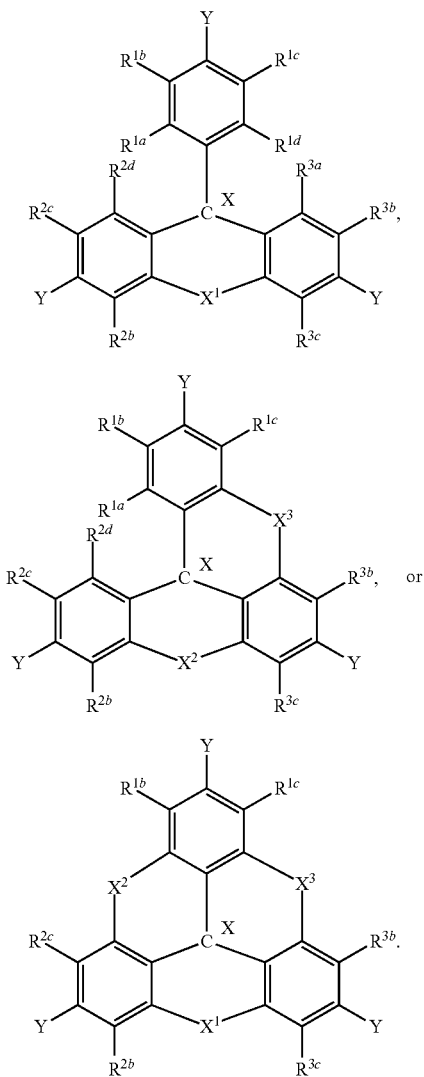

In some embodiments, X is -4, -3, -2, -1, 0, 1, 2, 3, or 4. In some embodiments, each of $X^1$, $X^2$, and $X^3$ is independently O or $NR^{4a}$. In some embodiments, each $R^{4a}$ is independently $C_1$-$C_{12}$ alkyl, $C_1$-$C_4$ alkoxy, $C_1$-$C_4$ alkylamino, $C_1$-$C_4$ dialkyl amino, $Ar^3$, -L-$Ar^3$, or -L-Z. In some embodiments, each $R^{4a}$ is independently methyl, ethyl, propyl, butyl, pentyl, hexyl, —$(CH_2)$—$N(Me)_2$, —$(CH_2)_2$—$N(Me)_2$, —$(CH_2)_3$—$N(Me)_2$, —$(CH_2)_3$—$N(Me)_2$, —$(CH_2)_4$—$N(Me)_2$, —$(CH_2)_2$—$Ar^3$, —$(CH_2)_3$—$Ar^3$, —$(CH_2)_3$—$Ar^3$, or —$(CH_2)_4$—$Ar^3$; and $Ar^3$ is 2-pyridinyl. In some embodiments, each of Y is independently H or $NO_2$. In some embodiments, each $R^{4a}$ is —$(CH_2)$—$(OCH_2CH_2O)_nCH_3$, —$(CH_2)_2$—$(OCH_2CH_2O)_nCH_3$, —$(CH_2)_3$—$(OCH_2CH_2O)_nCH_3$, or —$(CH_2)_4$—$(OCH_2CH_2O)_nCH_3$; and n is 0, 1, 2, 3, 4, 5, 6, 7, 8, 9, 10, 11, 12, 13, 14, 15, 16, 17, 18, 19, or 20. In some embodiments, each $R^{4a}$ is —$(CH_2)$—$(OCH_2CH_2O)_nCH_3$, —$(CH_2)_2$—$(OCH_2CH_2O)_nCH_3$, —$(CH_2)_3$—$(OCH_2CH_2O)_nCH_3$, or —$(CH_2)_4$—$(OCH_2CH_2O)_nCH_3$; and n is 1. In some embodiments, $R^{1a}$ and $R^{2d}$ are each $C_1$-$C_4$ alkoxy.

In some embodiments, the compound of Formula Ia is a compound, wherein:

$X^1$ is each $NR^{4a}$;
each $R^{4a}$ is independently $C_1$-$C_{12}$ alkyl, $C_1$-$C_4$ dialkyl amino, -L-$Ar^3$, or -$L^2$-$Z^2$;
$R^{1a}$, $R^{1d}$, $R^{3a}$, and $R^{2d}$ are each $C_1$-$C_4$ alkoxy;
each of $R^{1b}$, $R^{1c}$, $R^{2b}$, $R^{2c}$, $R^{3b}$, and $R^{3c}$ is independently H, $C_1$-$C_4$ alkylamino, or $NO_2$;
each of Y is independently H, $NO_2$, or $NR^{5a}R^{5b}$; and
each of $R^{5a}$ and $R^{5b}$ is independently H, $CF_3$, or $C_1$-$C_{12}$ alkyl..

In some embodiments, $X^1$ is each $NR^{4a}$. In some embodiments, each $R^{4a}$ is $C_1$-$C_{12}$ alkyl. In some embodiments, each $R^{4a}$ is $C_1$-$C_4$ dialkyl amino. In some embodiments, each $R^{4a}$ is -L-$Ar^3$. In some embodiments, each $R^{4a}$ is -$L^2$-$Z^2$. In some embodiments, $R^{1a}$, $R^{1d}$, $R^{3a}$, and $R^{2d}$ are each $C_1$-$C_4$ alkoxy. In some embodiments, each of $R^{1b}$, $R^{1c}$, $R^{2b}$, $R^{2c}$, $R^{3b}$, and $R^{3c}$ is independently H or $C_1$-$C_4$ alkylamino. In some embodiments, each of $R^{1b}$, $R^{1c}$, $R^{2b}$, $R^{2c}$, $R^{3b}$, and $R^{3c}$ is independently H or $NO_2$. In some embodiments, each of Y is independently H or $NO_2$. In some embodiments, each of Y is independently H, or $NR^{5a}R^{5b}$. In some embodiments, each of $R^{5a}$ and $R^{5b}$ is independently H or $C_1$-$C_{12}$ alkyl.

In some embodiments, the compound of Formula Ib is a compound, wherein:

$X^2$ and $X^3$ are each $NR^{4a}$;
each $R^{4a}$ is independently $C_1$-$C_{12}$ alkyl, $C_1$-$C_4$ dialkyl amino, -L-$Ar^3$, or -$L^2$-$Z^2$;
$R^{1a}$ and $R^{2d}$ are each $C_1$-$C_4$ alkoxy;
each of $R^{1b}$, $R^{1c}$, $R^{2b}$, $R^{2c}$, $R^{3b}$, and $R^{3c}$ is independently H, $C_1$-$C_4$ alkylamino, or $NO_2$;
each of Y is independently H, $NO_2$, or $NR^{5a}R^{5b}$; and
each of $R^{5a}$ and $R^{5b}$ is independently H, $CF_3$, or $C_1$-$C_{12}$ alkyl.

In some embodiments, $X^2$ and $X^3$ are each $NR^{4a}$. In some embodiments, each $R^{4a}$ is $C_1$-$C_{12}$ alkyl. In some embodiments, each $R^{4a}$ is $C_1$-$C_4$ dialkyl amino. In some embodiments, each $R^{4a}$ is -L-$Ar^3$. In some embodiments, each $R^{4a}$ is -$L^2$-$Z^2$. In some embodiments, $R^{1a}$ and $R^{2d}$ are each $C_1$-$C_4$ alkoxy. In some embodiments, each of $R^{1b}$, $R^{1c}$, $R^{2b}$, $R^{2c}$, $R^{3b}$, and $R^{3c}$ is independently H or $C_1$-$C_4$ alkylamino. In some embodiments, each of $R^{1b}$, $R^{1c}$, $R^{2b}$, $R^{2c}$, $R^{3b}$, and $R^{3R}$ is independently H or $NO_2$. In some embodiments, each of Y is independently H or $NO_2$. In some embodiments, each of Y is independently H, or $NR^{5a}R^{5b}$. In some embodiments, each of $R^{5a}$ and $R^{5b}$ is independently H or $C_1$-$C_{12}$ alkyl.

In some embodiments, the each compound is independently a compound of Formula Ib, wherein:

$X^2$ and $X^3$ are each $NR^{4a}$;
each $R^{4a}$ is independently $C_1$-$C_{12}$ alkyl, $C_1$-$C_4$ dialkyl amino, or -L-$Ar^3$;
$R^{1a}$ and $R^{2d}$ are each $C_1$-$C_4$ alkoxy;
each of $R^{1b}$, $R^{1c}$, $R^{2b}$, $R^{2c}$, $R^{3b}$, and $R^{3c}$ is independently H; and
each of Y is independently H or $NO_2$.

In some embodiments, the each compound of Formula I is independently a compound of any one of the following:

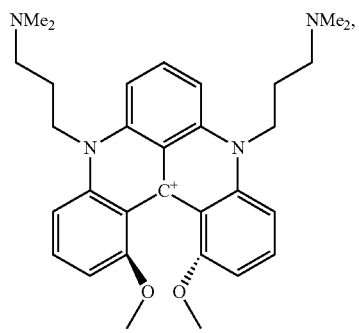

-continued

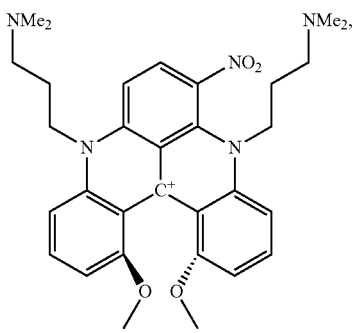

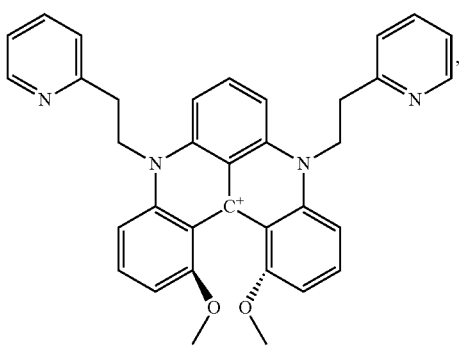

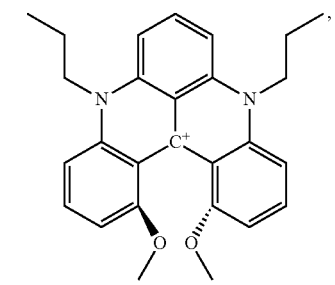

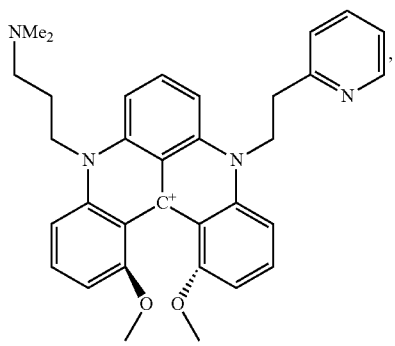

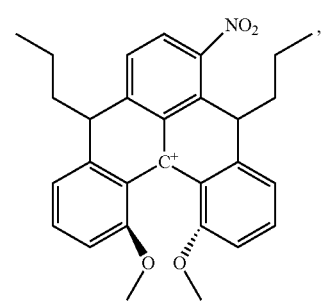

-continued

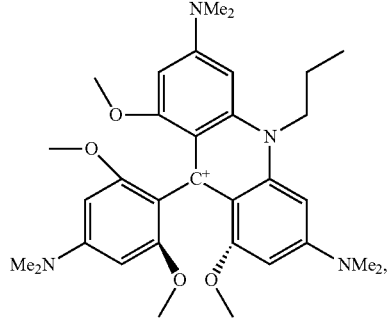

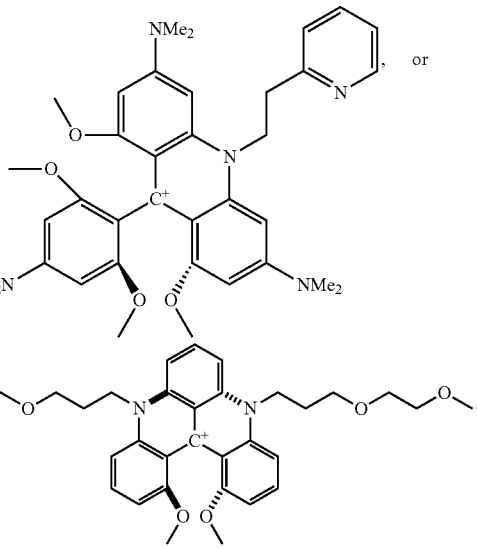

In some embodiments, each conjugated heterocyclic compound independently further comprises an anion selected from tetrafluoroborate, hexafluorophosphate, perchlorate, tetrarylborate, trifluoromethanesulfonate, oxalatoborate, oxalate, phosphate, bis-trifluoromethanesulfonimide, halide, anion of an ionic liquid, hydroxide, carbonate, bicarbonate, sulfate, hydrogen sulfate, sulfite; or a mixture of any two or more thereof. In some embodiments, the compound of formula I further comprises an anion selected from tetrafluoroborate, hexafluorophosphate, or a mixture of any two or more thereof.

In some embodiments, the redox flow battery further includes a separator positioned between the anolyte and the catholyte. In some embodiments, the separator is a porous membrane.

In some embodiments, the redox flow battery further includes a solvent and an electrolyte salt.

In some embodiments, the electrolyte salt is a lithium, sodium, potassium, ammonium, or alkylammonium salt of tetrafluoroborate, hexafluorophosphate, perchlorate, tetrarylborate, trifluoromethanesulfonate, oxalatoborate, oxalate, phosphate, bis-trifluoromethanesulfonimide, halide; or a mixture of any two or more thereof. In some embodiments, the electrolyte is an alkylammonium salt of tetrafluoroborate, hexafluorophosphate, perchlorate, tetrarylborate, trifluoromethanesulfonate, oxalatoborate, oxalate, phosphate, bis-trifluoromethanesulfonimide, halide; or a mixture of any two or more thereof. In some embodiments, the alkylammonium salt is a tetrabutylammonium salt, tetraethylammonium salt, or a mixture thereof. In some embodiments, the electrolyte salt is tetrabutylammonium hexafluororophosphate, tetrabutylammonium tetrafluoroborate, tetraethylammonium tetrafluoroborate, or a mixture of any two or more thereof.

In some embodiments, the solvent comprises nitrile solvent, an ether solvent, dimethylformamide, water, a halogenated solvent, or an ionic liquid.

In some embodiments, wherein the conjugated heterocyclic cationic compound is photoactive. In some embodiments, the redox flow battery has an open circuit potential of greater than about 1V, 1.5 V, or 2 V. In some embodiments, the redox flow battery has an open circuit potential of from about 1 V to about 5V, about 1.5 V to about 5 V, about 1.5 V to about 3 V, about 2 V to about 5V, about 2 V to about 4 V, or about 2V to about 3V.

In some embodiments, the redox flow battery, such as any one of the redox flow batteries described herein, further includes a separator positioned between the anolyte and the catholyte. In some embodiments, the separator is a porous membrane. In some embodiments, the redox flow battery further comprises a solvent and an electrolyte salt.

Any one of the redox flow battery described herein may further include an electrolyte salt. In some embodiments, the electrolyte salt is a lithium, sodium, potassium, ammonium, or alkylammonium salt of tetrafluoroborate, hexafluorophosphate, perchlorate, tetrarylborate, trifluoromethanesulfonate, oxalatoborate, oxalate, phosphate, bis-trifluoromethanesulfonimide, halide; or a mixture of any two or more thereof. In some embodiments, the electrolyte is an alkylammonium salt of tetrafluoroborate, hexafluorophosphate, perchlorate, tetrarylborate, trifluoromethanesulfonate, oxalatoborate, oxalate, phosphate, bis-trifluoromethanesulfonimide, halide; or a mixture of any two or more thereof. In some embodiments, the alkylammonium salt is a tetrabutylammonium salt, tetraethylammonium salt, or a mixture thereof. In some embodiments, the electrolyte salt is tetrabutylammonium hexafluorophosphate, tetrabutylammonium tetrafluoroborate, tetraethylammonium tetrafluoroborate, or a mixture of any two or more thereof.

Any one of the redox flow battery described herein may further include a solvent. In some embodiments, the solvent comprises a nitrile solvent, such as acetonitrile; an ether solvent, such as tetrahydrofuran; dimethylformamide; water; a halogenated solvent, such as dichloromethane, or an ionic liquid.

Provided in another aspect is a method of operating the redox flow battery, such as any one of the redox flow batteries described herein, including flowing the catholyte through a catholyte compartment and flowing the anolyte through an anolyte compartment, wherein the catholyte and anolyte compartments are separated by a porous separator and electron transfer from the anolyte to the catholyte is supported. In some embodiments, the separator is a porous membrane.

In some embodiments, after electron transfer, the method includes regenerating the catholyte and/or the anolyte by an external power source. In some embodiments, the regenerating the catholyte comprises regenerating the catholyte via photo-assisted oxidation. In some embodiments, the regenerating the anolyte comprises regenerating the anolyte via photo-assisted reduction.

The redox flow battery systems described herein may include any type of anodes, cathodes, and separators known to one of skilled in the art. Furthermore, the redox flow battery systems described herein may also be used for energy discharge and/or energy storage.

In any of the embodiments described herein, the redox flow battery system is a symmetric organic reverse flow battery (SORFB). In some embodiments, the separator or exchange membrane is a porous membrane. Illustrative examples of a porous membrane include but are not limited to Celgard® 2500, a porous membrane in polypropylene with a porosity of about 55%, a thickness of about 25 μm, and a pore size (average diameter) of about 0.064 μm, and Daramic® HD plus, a porous membrane having a porosity of about 55% and a thickness of about 175 μm. In some embodiments, the porous membrane is Celgard® 2500. In some embodiments, the porous membrane is a porous membrane in polypropylene having one or more of the following features: a porosity of at least about 55%, a thickness of at least about 25 μm, and a pore size (average diameter) of at least about 0.064 μm. In some embodiments, the porous membrane is a porous membrane in polypropylene having one or more of the following features: a porosity of about 55%, a thickness of about 25 μm, and a pore size (average diameter) of about 0.064 μm. In some embodiments, the porous membrane is Daramic® HD plus. In some embodiments, the porous membrane has one or more of the following features: a porosity of at least about 55% and a thickness of at least about 175 μm. In some embodiments, the porous membrane has one or more of the following features: a porosity of about 55% and a thickness of about 175 μm.

In some embodiments, the separator or exchange membrane is an anionic exchange membrane (AEM). In some embodiments, the symmetric organic redox flow battery (SORFB) having a porous membrane as the exchange membrane has equivalent or better efficiency or performance than a symmetric organic redox flow battery (SORFB) having an anionic exchange membrane as the exchange membrane. Suitable examples of an anionic exchange membrane include but are not limited to a fluorinated anionic exchange membrane, such as Fumasep® FAP-450 (a fluorinated anionic exchange membrane having a conductivity in 0.5 M $H_2SO_4$=9-12 mS $cm^{-1}$, selectivity 0.1/0.5 mol/kg KCl at T=25 is 90-96%, proton transfer rate 2500-4500 μmol $min^{-1}$ $cm^{-2}$, and a thickness of 50 μm). In some embodiments, the fluorinated anionic exchange membrane is Fumasep® FAP-450). In some embodiments, the fluorinated anionic exchange membrane has one or more of the following features: a conductivity in 0.5 M $H_2SO_4$=9-12 mS $cm^{-1}$, selectivity 0.1/0.5 mol/kg KCl at T=25 is 90-96%, proton transfer rate 2500-4500 mol $min^{-1}$ $cm^{-2}$, and a thickness of 50 μm.

Furthermore, as illustrated by Examples described herein, the following one or more features have been identified as relevant for identifying conjugated heterocyclic cationic compounds that are ideal candidates for RBF systems based on preliminary results from H-Cell cycling studies:
- must present at least 2 fully reversible electronic processes (symmetric parameter);
- be separated by at least 2V (energy density criteria);
- electronic processes must have a diffusion factor D≥5.0× $10^{-6}$ $cm^2 \cdot s^{-1}$;
- electronic processes must have a heterogeneous electronic transfer factor $k^0$≥1.0× $10^{-2}$ cm·$s^{-1}$;
- in their initial carbocationic state have to be soluble at ≥50 mM (energy density criteria); and
- must have a cyclability (capacity retention ≥90%)≥200 cycles in H-Cell.

In some embodiments, the conjugated heterocyclic cationic compounds described herein exhibits one or more of these features.

EXAMPLES

Example 1. Preliminary Result of RFB Cell Using Bis nPr Helicene

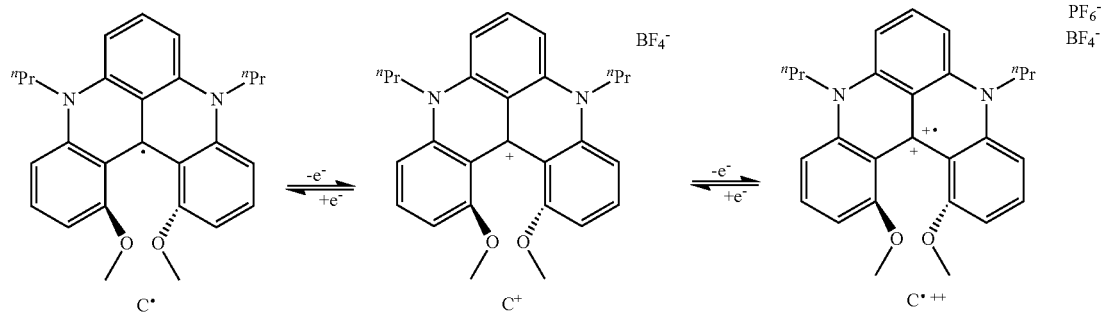

Figure 3:
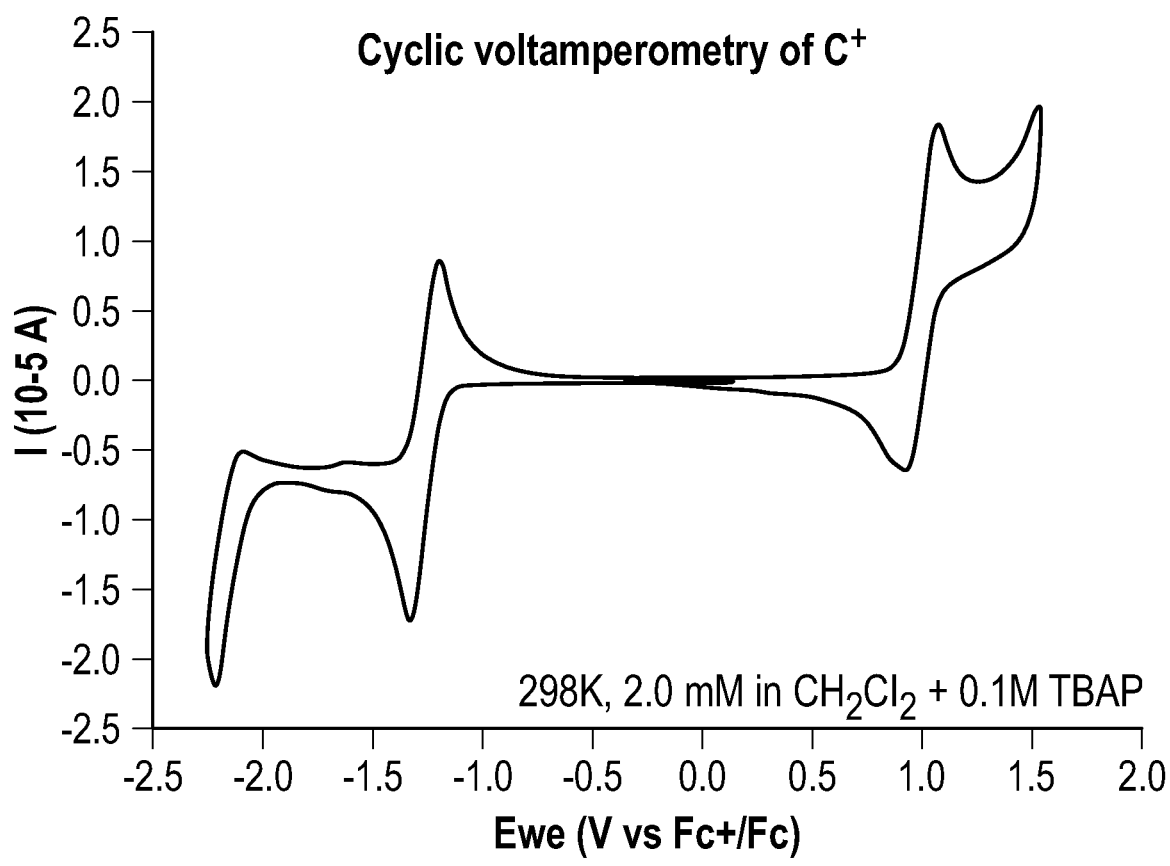
FIG. 3 is a cyclic voltammogram of bis nPr helicene in DCM, according to the examples.

During the first study of the compound cyclic voltammetry was carried out in a three electrode electrochemical cell, consisting of a carbon working electrode, a $AgNO_3/Ag$ reference electrode (0.01 M $AgNO_3$ in 0.1 M $nBu_4NPF_6$ in $CH_3CN$), and a platinum counter electrode. The glassy carbon disk electrode was polished using aluminum oxide polishing paper and anhydrous $CH_2Cl_2$. CV experiments were run at a scan rate of 100 mV/s in an $CH_2Cl_2$ electrolyte containing 2 mM active species and 0.1 M $TBAPF_6$ with added ferrocene as an internal voltage reference (FIG. 3).

For RFB Tests:

In order to facilitate understanding and comparison with charge and discharge measurements, all of the following data was provided with reference to an $AgNO_3/Ag$ electrode.

DMF

Dichloromethane seemed not to be a convenient solvent to stabilize the reduced species on a time scale longer than a cyclic voltammetry. DMF (dimethylformamide) was then chosen and studied for its high polarity, which will favor the solubility of the $C^+$ and $C^{++}$ species, and the known stability of the C. in solution (over days).

Figure 4:
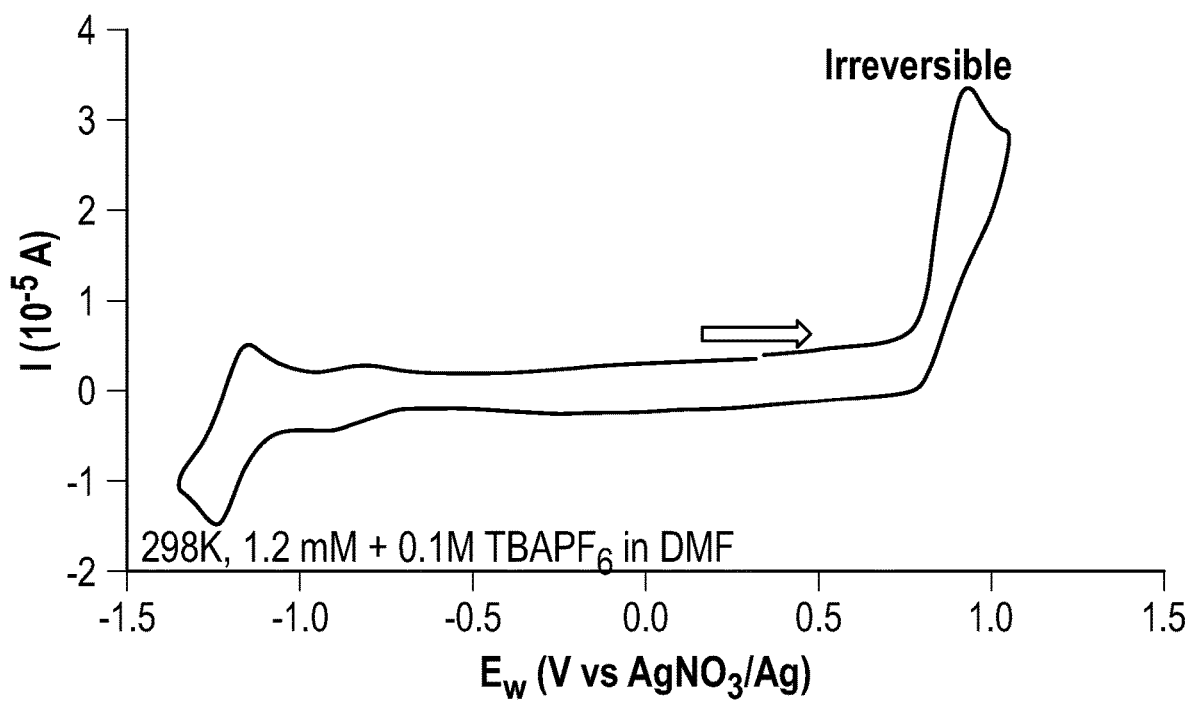
FIG. 4 is a cyclic voltammogram of bis nPr helicene in DMF, according to the examples.

Cyclic voltammetry was carried out in a three electrode electrochemical cell, consisting of a carbon working electrode, a $AgNO_3/Ag$ reference electrode (0.01 M $AgNO_3$ in 0.1 M $nBu_4NPF_6$ in DMF), and a platinum counter electrode. The glassy carbon disk electrode was polished using aluminum oxide polishing paper and anhydrous DMF. CV experiments were run at a scan rate of 100 mV/s in an 10 mL DMF electrolyte containing 1 mM active species (FIG. 4).

Figure 5:
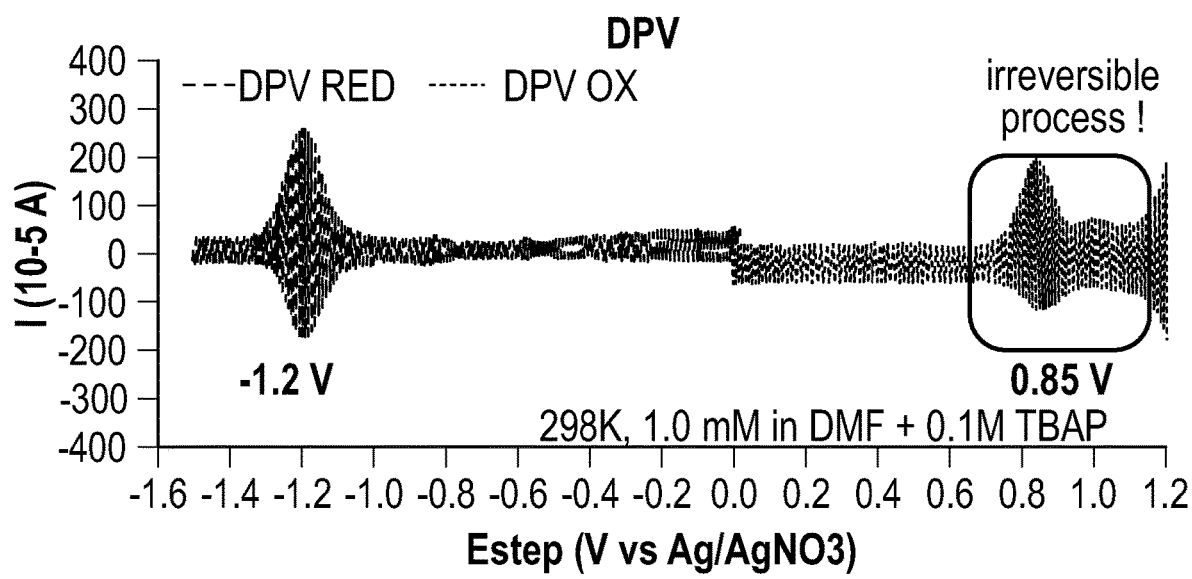
FIG. 5 is a differential pulse voltammogram (DPV) of bis nPr helicene in DMF, according to the examples.

Unfortunately, the formation of $C^{++}$, which occurred at 850 mV vs. $AgNO_3/Ag$, was not reversible. DPV experiment confirmed this by showing several processes at work in oxidation (FIG. 5).

ACN

The C. species was synthesized (vide supra) and dissolved in dry ACN in glovebox. No decomposition was observed by UV-Vis spectroscopy over a period of several hours. Thus ACN was chosen as solvent for further battery test.

Figure 6:
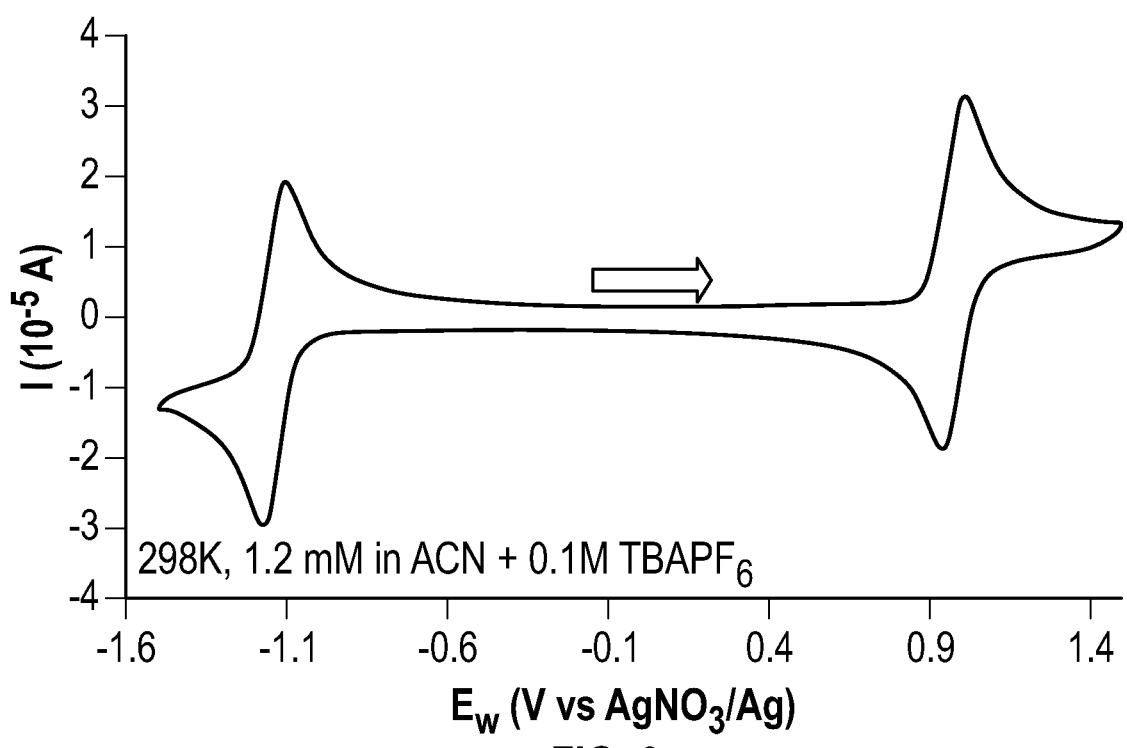
FIG. 6 is a cyclic voltammogram of bis nPr helicene in ACN, according to the examples.

Cyclic voltammetry was carried out in a three electrode electrochemical cell, consisting of a carbon working electrode, a $AgNO_3/Ag$ reference electrode (0.01 M $AgNO_3$ in 0.1 M $nBu_4NPF_6$ in $CH_3CN$), and a platinum counter electrode (FIG. 6). The glassy carbon disk electrode was polished using aluminum oxide polishing paper and anhydrous $CH_3CN$. CV experiments were run at a different scan rate of 10-100-500 mV/s in an $CH_3CN$ electrolyte containing 1 mM active species and 0.1 M $TBAPF_6$.

Figure 7:
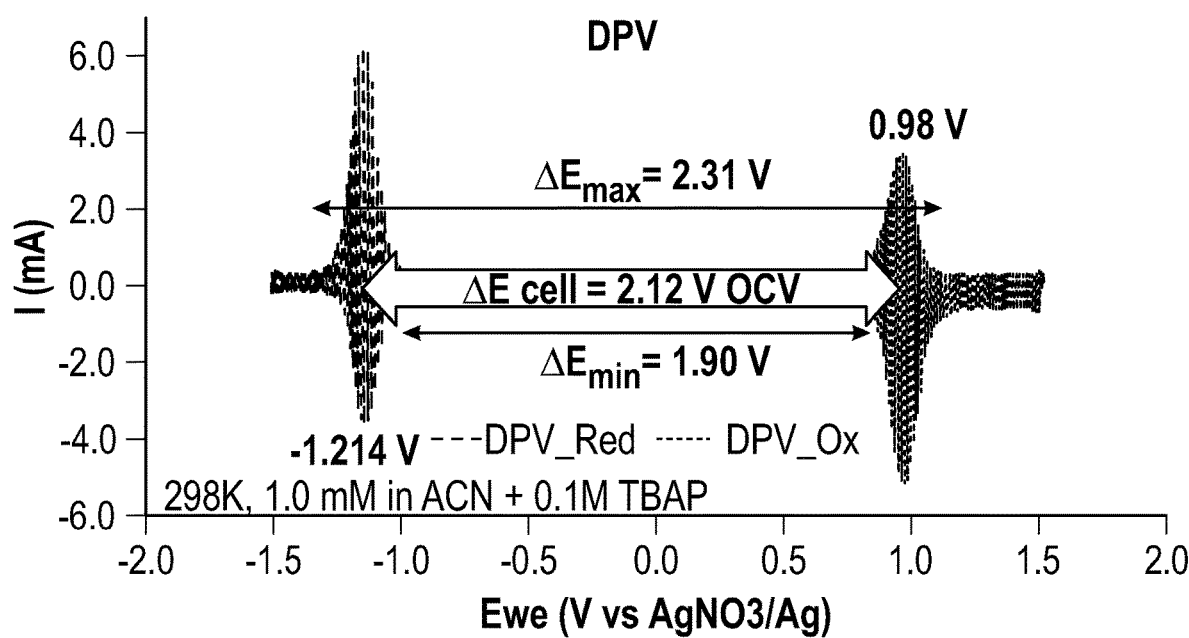
FIG. 7 is a differential pulse voltammogram (DPV) of bis nPr helicene in ACN, according to the examples.
Figure 8A:
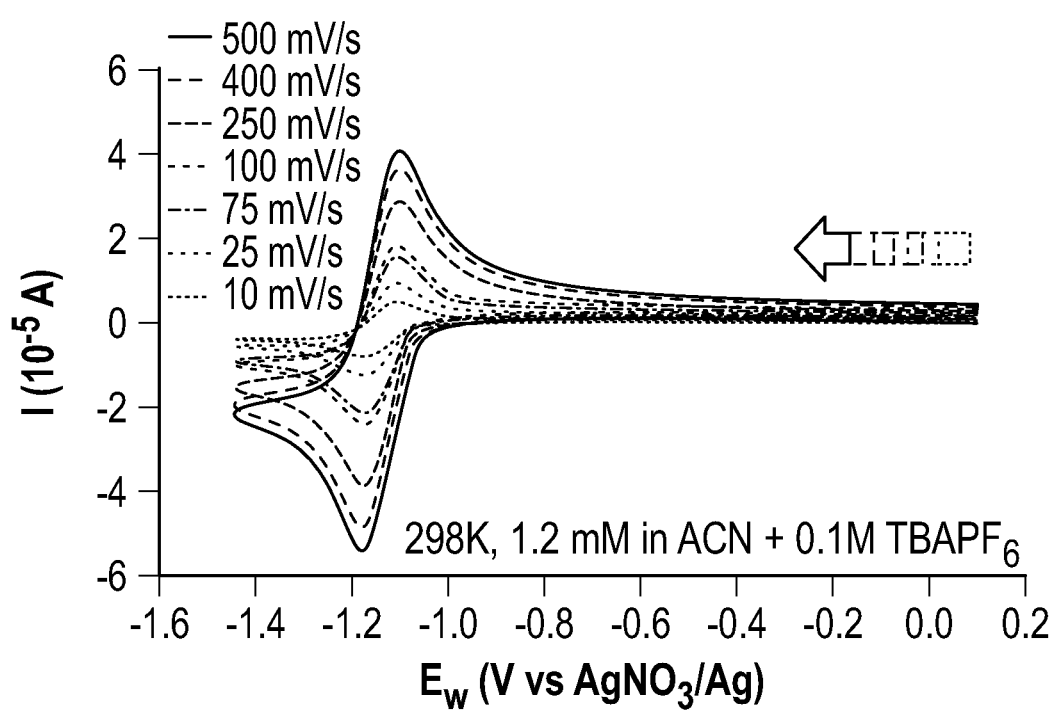
FIG. 8A is a cyclic voltammogram of bis nPr helicene in ACN with a close up view of the reduction event at different speed 10, 100 and 500 mV·s$^{-1}$, according to the examples.
Figure 8B:
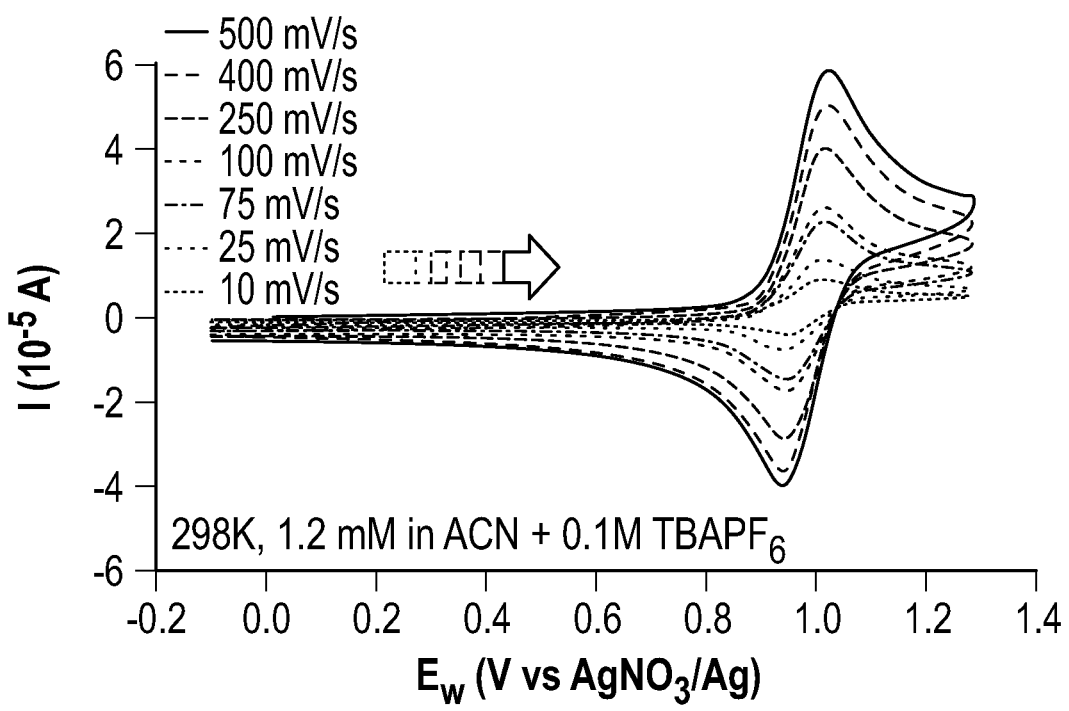
FIG. 8B is a cyclic voltammogram of bis nPr helicene in ACN with a close up view of the oxidation event at different speed 10, 100 and 500 mV·s$^{-1}$, according to the examples.

The reduction and oxidation processes take place at −1.14V and 0.98V with respect to the reference electrode (FIGS. 7, 8A, 8B). These measurements demonstrate that once charged the battery have an open circuit potential (OCV) of 2.12V between the two terminals (for 100% of the charged solution). At the moment preceding a total discharge of the system the minimum potential will be 1.90V. Measurements at different velocities (□, 100 and 500 mV/s, FIGS. 8A and 8B) of phenomena in oxidation and reduction exhibit waves that retain their shapes after 5 cycling, and attest to the stability of the species formed during electronic processes and its reversibility in the chosen solvent.

Figure 9:
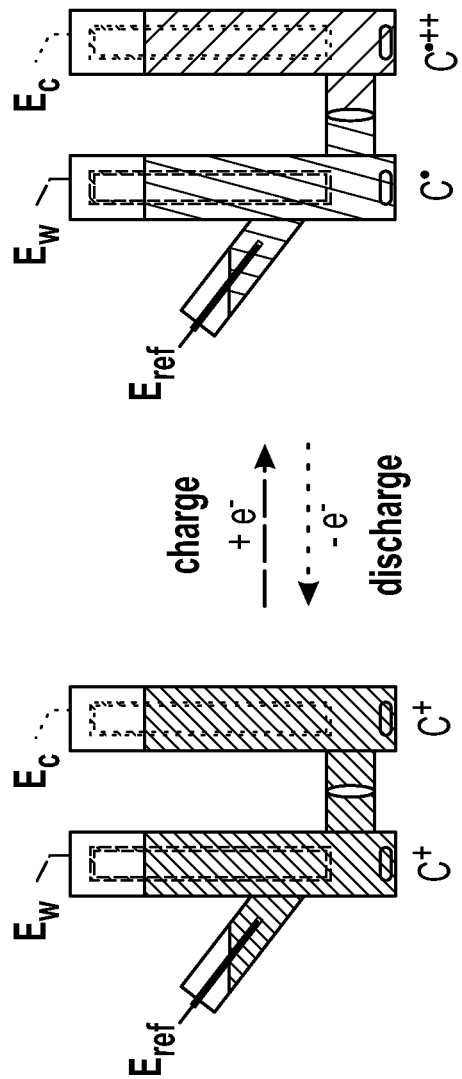
FIG. 9 is an illustration of the determination of overall capacity of a battery, according to the examples.

Conventionally, galvanostatic charge/discharge with potential limitation (GCPL) was applied to report the cyclic stability and the reversibility of the device. In order to avoid any phenomenon of over-oxidation/over-reduction of the electrolyte during this study, the overall capacity of the battery was determined theoretically in order to define a charge limit (FIG. 9).

To compensate a possible losses of electrical charges, heating and resistance inherent to the system an additional capacity limited to +1% has been defined. Therefore a load limit of 0.317 mA·h was chosen with a applied current of 5 mA. In what follows, the term "discharge" will mean "reverse current charging."

In addition, it should be noted that in the chosen cell configuration, we start with the battery in an intermediate "half charged" state. Indeed, each part of the cell contains the same neutral $C^+$ solution, i.e. half the amount of electronically active material. The first charge cycle must therefore be of $Capacity_{Total}/2$ (i.e. 0.1585 mA·h) in order to avoid any over-oxidation/reduction phenomenon. This first charge, and its total discharge (0.317 mA·h) have been removed from the following graphs in order to not distort, and artificially inflate, the efficiency of the system.

Figure 10:
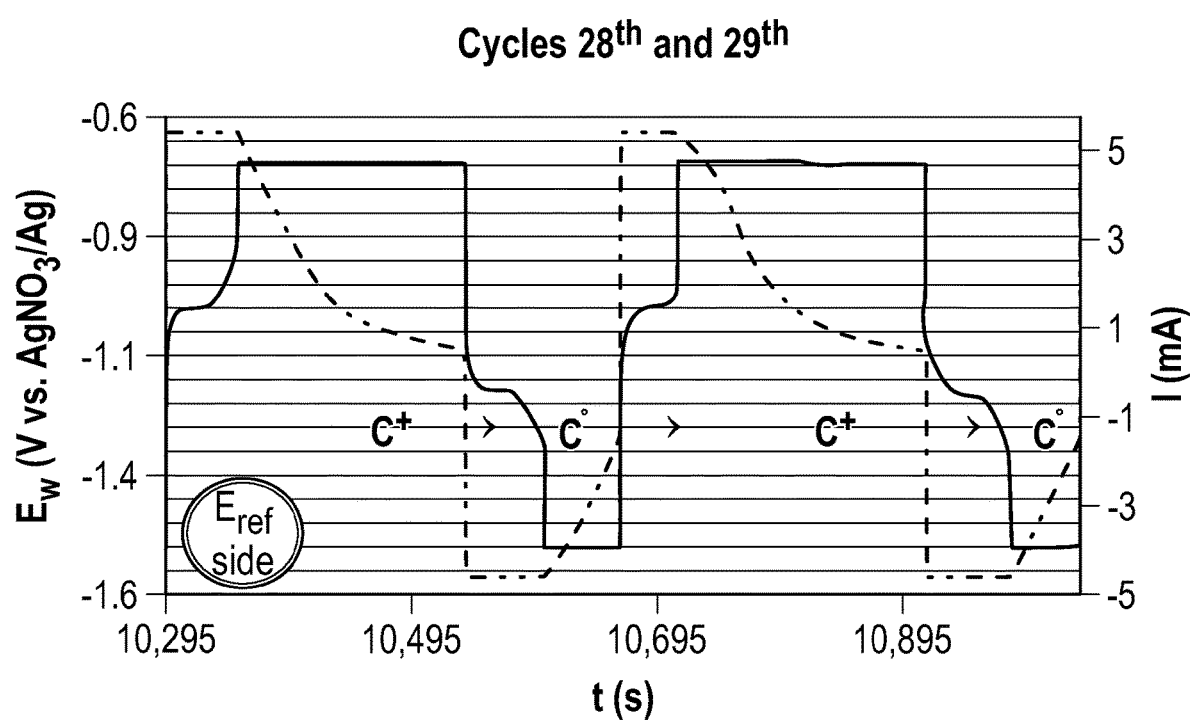
FIG. 10 is a zoom-in of $E_{we}$ during the 28$^{th}$ and 29$^{th}$ cycle of mono-electronic cycling and species formation in $E_{ref}$ compartment, according to the examples.
Figure 11:
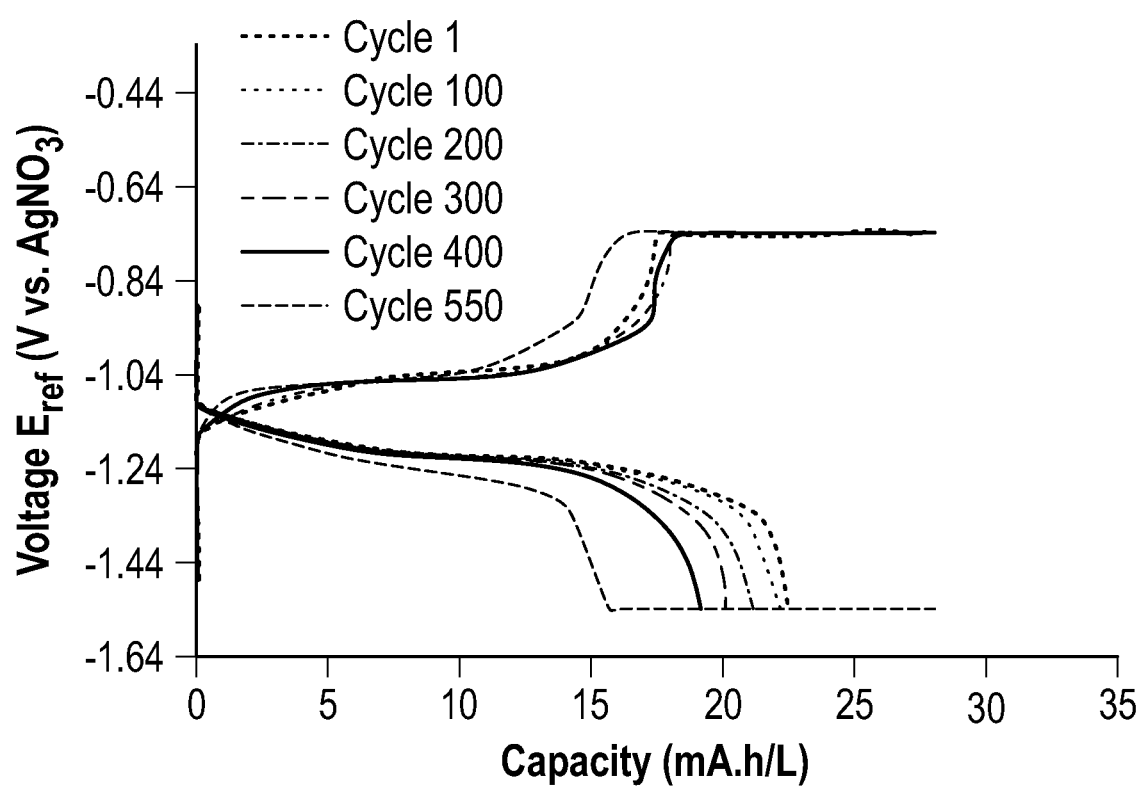
FIG. 11 shows the voltage profile at $E_{ref}$ compartment for mono-electronic cycling experiment, according to the examples.
Figure 12:
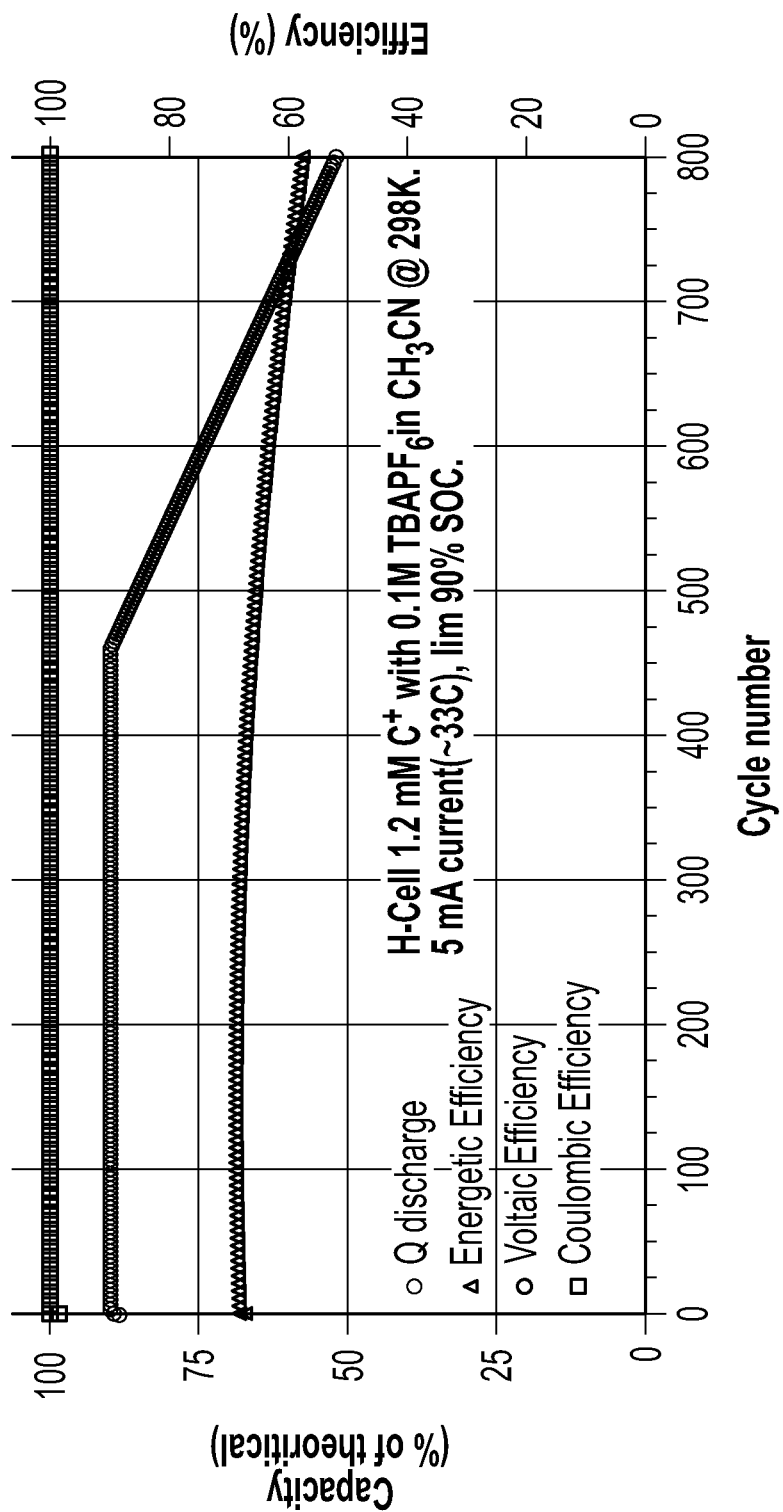
FIG. 12 shows the H-Cell cycling experiment data collected for $^n$PrDMQA$^+$ in CH$_3$CN with TBAPF$_6$ as the supporting electrolyte, according to the examples.
Figure 13:
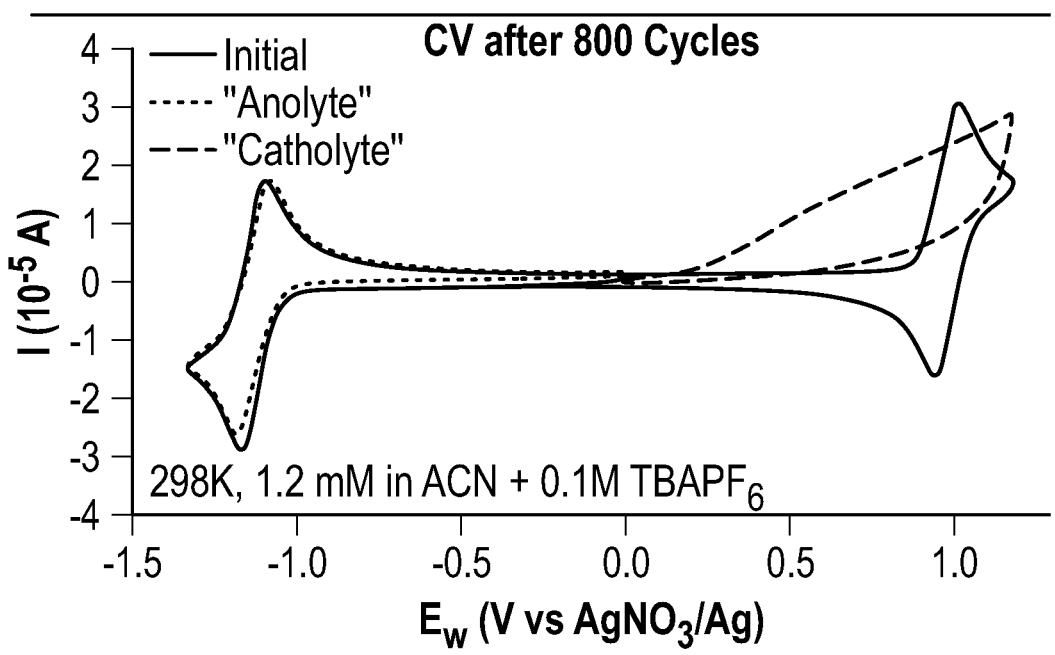
FIG. 13 shows the cyclic voltammogram analysis at 100 mV/s of the respective contents of each side of the cell after 800$^{th}$ cycles of GCPL CCCV mono-electronic cycling experiments, according to the examples

Charge/discharge measurements were carried out in a custom-made glass H-cell with a 2 mm fine porous glass frit (4-5.5 μm holes diameter) was used as the separator and a reference electrode (0.01 M $AgNO_3/Ag$ 0.01 M in 0.1 M $TBAPF_6$ in $CH_3CN$). 10 mL of a 1.2 mM solution (0.1 M $TBAPF_6$) of $C^+$ were equally filled into both compartments of the cell. Reticulated vitreous carbon (RVC) electrodes (100 ppi Duocel®) were cut into rods of the dimensions 0.5 cm×0.5 cm×4 cm and positioned about 2 cm deep in solution (active surface ~33 cm² per electrode). To rule out contamination processes, the electrodes were singly-used. Then a Constant Current following by a Constant Voltage galvanostatic charging (CCCV GCPL protocol) at |5| mA current was applied via RVC electrodes. For the mono-electronic cycling potentials boundaries were set at −1.54 V and −0.74V with a capacity limitation at 90% SOC, whereas the stress-test is limited between −1.54 V and 1.38 V with a capacity limitation at 100% SOC ($Q_{max}=Q_{theo}$). During charge-discharge experiments both cells were continuously stirred at 1000 rpm, In the first instance, mono-electronic transfer at 90% theoretical capacity limitation (90% State Of Charge "SOC") charge and discharge cycles (FIG. 9) were performed with a Constant Current following by a Constant Voltage galvanostatic charging (CCCV GCPL protocol) of |5| mA with potentials boundaries at −1.54 V and −0.64 V vs $E_{ref}$. A complete cycle corresponds to a charge step followed by a discharge step (FIG. 10). During the charge-discharge cycles two plateaus at c.a. −1.0 V and −1.2 V in $E_w$ voltage curves was noted and assigned to the electronic process of $C^+/C$. redox couple process (FIG. 11). Extremely satisfactorily, the monitoring of this test cell in FIG. 12, shows that the coulombic efficiency (CE, green triangle) remains constant and close to 100% throughout the experiment. Furthermore, the capacity Q (red and blue squares) has proven to be excellent, with an initial Capacity ($Q_{init}$) retention >90% over 550 cycles (FIG. 12). The decrease in the capacity of our battery started at the $461^{th}$ cycle. Then the system lost 0.16% of capacity retention per cycle, reaching a value of Q=0.081 mA·h at the $800^{th}$ cycle when the battery was stopped (i.e. 58% of the $Q_{init}$). After the $800^{th}$ cycle, a CV analysis at 100 mV/s of the respective contents of each side of the cell was performed (FIG. 13).

By analyzing more in depth all the data collected so far for $^n$PrDMQA⁺, it was noted on the following figure (FIG. 12) that in addition to a perfect coulombic efficiency (CE, green square) throughout the experiment, the cycling of the molecule under the standard conditions described exhibited impressive values of Energy Efficiency (EE red triangle), describing the efficiency of the electrochemical transformation, and Voltaic Efficiency (VE purple circle) relating the efficiency of the polarization in the system. In both cases, EE and VE retained between 60 and 70% of efficiency during the 550 cycles of cyclability displayed by the system, which was an excellent result when most ORFBs struggle to reach values of 60% at the beginning of cycling.

Figure 14:
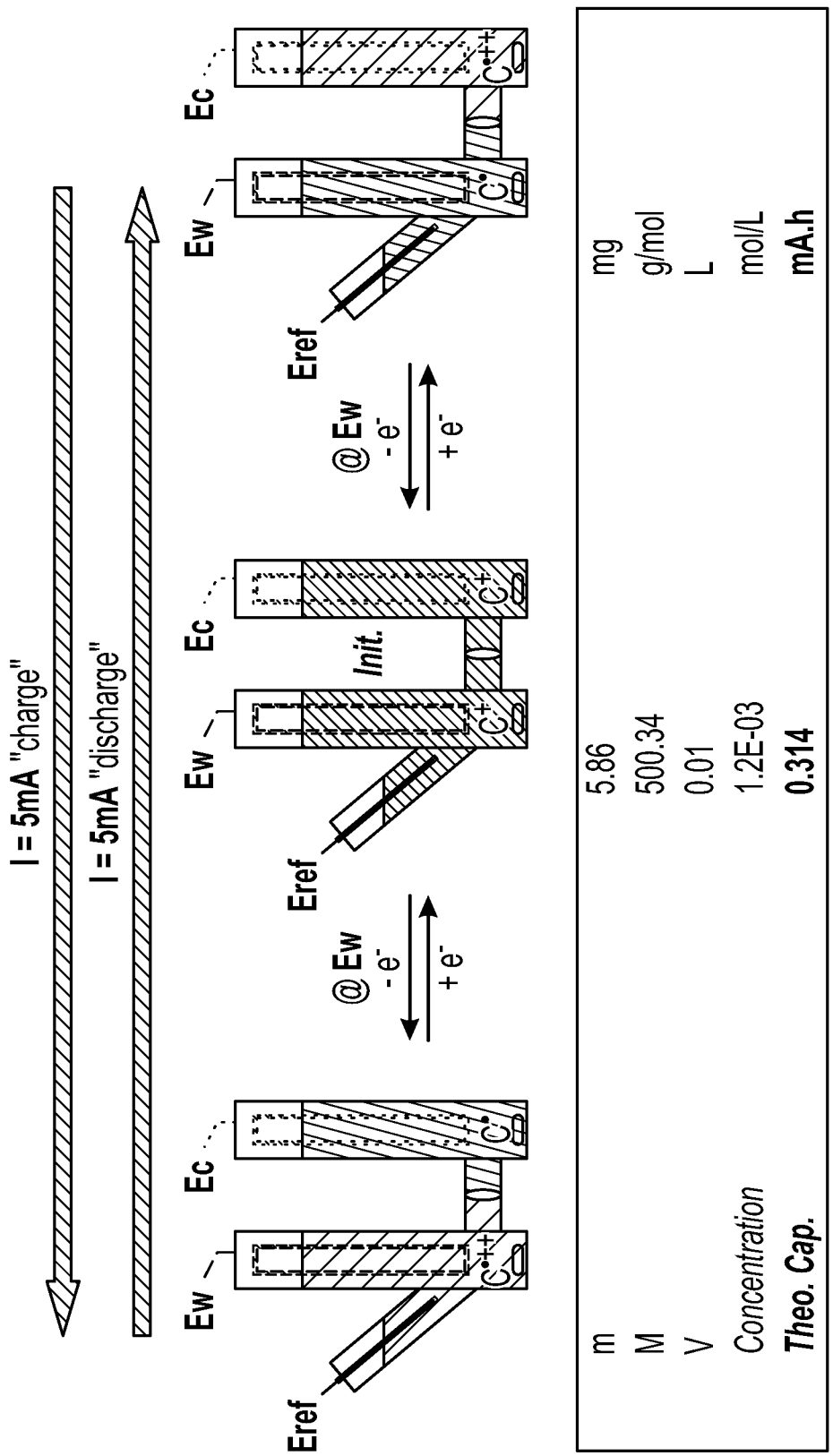
FIG. 14 is an illustration of the determination of overall capacity of a battery under stress-conditions, according to the examples.
Figure 15:
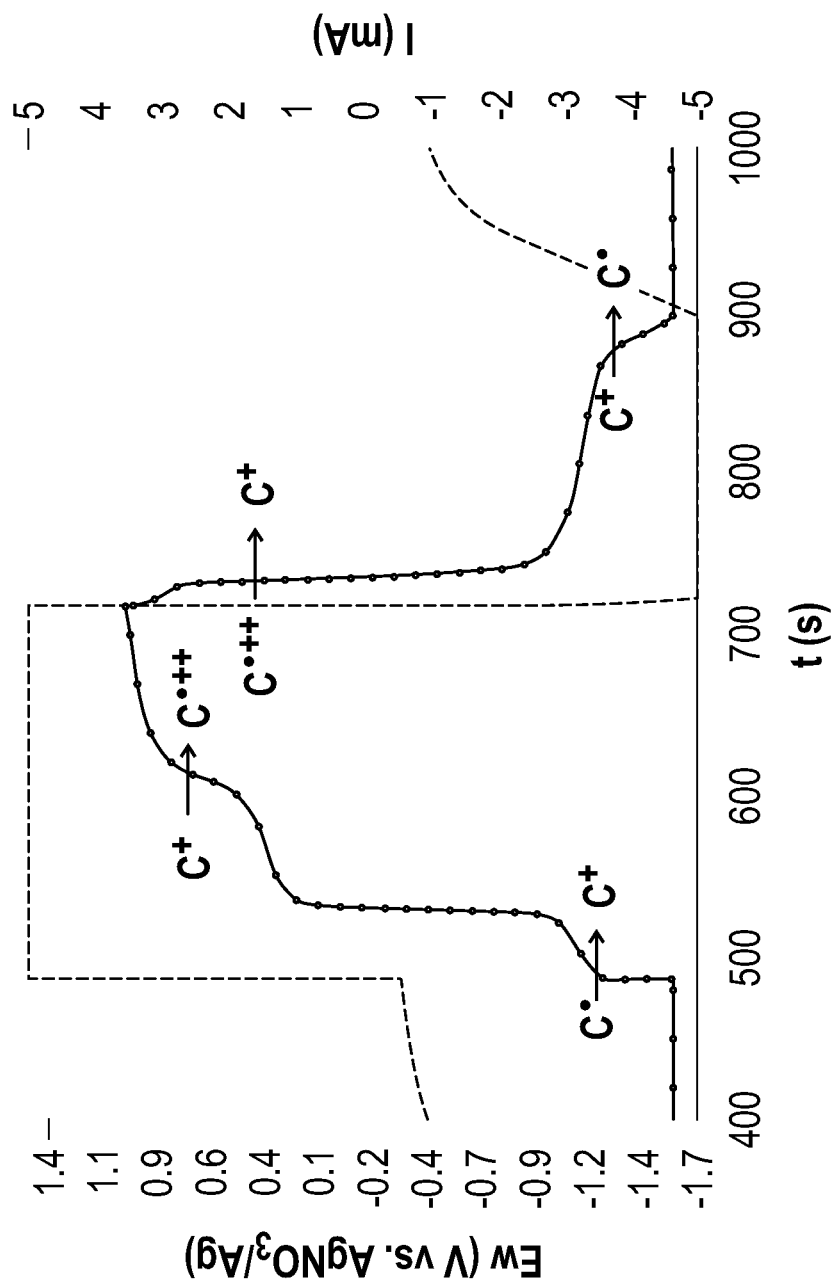
FIG. 15 is a graph the charge/discharge measurement by Ew and I monitoring of 1 cycle, according to the examples.

A CCCV galvanostatic charging sequence with a |5| mA current, setting potentials boundaries at 1.38 and −1.54 V vs. $E_{ref}$, was then started from initial state of this symmetrical battery (FIG. 14). A closer look at the charge/discharge measurement (zoom from 400 to 1000 seconds, i.e. 1 cycles, FIG. 15), revealed two different behaviors depending on the stage of battery charging. During loading (488-718 s) the value of 0.98 V for $E_{we}$ was slowly reached (in blue), highlighting slow load transfer kinetics. Conversely, when discharging (718-898 s), an easy access to a threshold plateau of −1V was noticed followed by a slow reach to the limit value of −1.54V (in blue). Supported by a decrease in current intensity (in red), this allowed us assume an efficient reduction, where the limiting factor is the diffusion of the matter in solution. An in-depth study of the resistivity of the system, the diffusion parameters and the optimization of agitation within the cell will easily solve these limitations. On the long term, we will be able to increase the current intensity, as well as the charge and discharge rates.

It should be noted that over the whole experiment, the threshold value of −1.54V in discharge was systematically reached, however the 1.38V value slowly reached over the 81 cycles as shown in by the blue trace. This phenomenon was due to two components: one being a degradation of the surface of the electrode and its support (oxidation of the clamp holding the carbon electrode). The second is the alteration of the electrolyte in its C.⁺⁺ form over time. This appears suddenly after the 80th cycle. These parameters can be and will be solved by a study and a reasoned choice of more reliable electrodes, and the stabilization of our electrolyte by an appropriate functionalization of the hanging arms.

Figure 16:
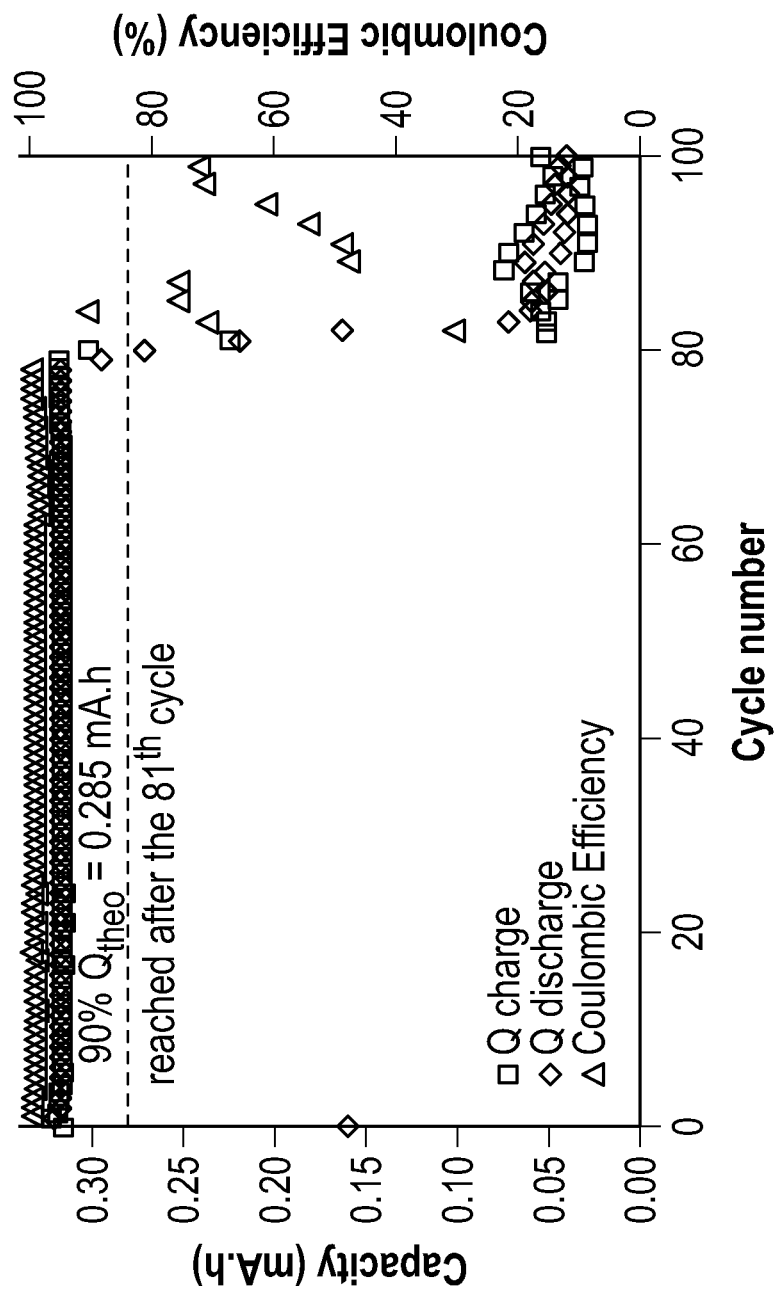
FIG. 16 is a graph of the Q charge, Q discharge and efficiency over 82 cycles, according to the examples.

Finally, the efficiency of this system was studied and found to be almost constant and close to 100% over the 81 cycles studied (cycle no. 81: 101% & no. 82: 30% efficiency, in green, FIG. 16). These measurements represent preliminary results and will be improved using more appropriate electrodes in the near future. The efficiency was calculated on the basis of the overall cell capacity, or Q charge/discharge of 0.317 mA·h kept during the study (in purple). All these data show the robustness and high reliability of the electrolyte system beyond 15 hours of chemical stress cycling.

The monitoring of the global capacity of the system during the cycles showed that over the course of the experiment a load of 0.317 mA·h can continue to be transmitted AND recovered to our system (FIG. 16). The system starts to lose capacity from cycle 80 onwards as shown by the decrease in the violet (FIG. 16) plot. It then starts to affect its efficiency from $81^{th}$ cycle.

It should be noted that when using a conventional "battery" type, this system will have an open circuit voltage of 2.12V but only half of the charge used to carry out this study will be available. Indeed this one can only return to its initial state $t_{init}$ (see the first scheme). The study of this cycling presented here is for information only and to prove the robustness and versatility of our system.

Example 2. Synthesis and Characterization of the Anolyte C. Radical

Stable neutral organic radicals are open-shell molecules with an unpaired electron occupying the highest molecular orbital (HOMO) which can easily take part in reactions, such as hydrogen abstraction, dimerization, or recombination.[1,2] These molecules have been of interest in the scientific community for several decades due to their low cost, ease of synthesis, and vast structural diversity, making them suitable for applications in catalysis[3] More recently, organic radicals have been of special interest in the development of organic light-emitting diodes (OLEDs) and other material applications[4] With the discovery of triphenylmethyl (trityl) radical by Gomberg in 1900,[5] fundamental studies of other persistent and stable carbon-based radicals have provided insight into their electronic structures and stability. Bulky protecting groups have been used to prevent dimerization, such is the case in triarylmethyl,[6] cyclopentadienyl,[7] fluorenyl,[8] and anthryl radicals.[9] An alternative approach to overcome the σ-dimerization of radicals, is to introduce electron withdrawing/donating substituents to control their electronic structure. For example, α,α-dicyanomethyls with nitrogen-based electron donors at the para-positions based carboradicals were demonstrated to be dynamically stable. The presence of electron-withdrawing group a to a radical center helps to shrink spin densities at the benzyl positions, weakening the intermolecular C—C coupling reactivity.[10]

Moreover, radicals can be stabilized when included in a large π-conjugated system. This is the case of porphyrinoid,[11] macrocycle, and fused π-skeletons.[12]

Besides linear systems, helical organic molecules can be obtained by developing fused π-conjugated systems. The inherent chirality of helical molecules is of great interest to development novel organic radicals, and apply them in optoelectronic and spintronic materials.[13, 14] Only a few examples of [n]helicene (n=4, 5, 6, 7) radicals have been reported in the literature, where n indicates the number of fused aromatic rings.[15] In most cases, the unpaired electron in these systems is stabilized through delocalization over the σ-conjugated substituents, and the molecules with a higher number of fused aromatic rings show a higher stability. Thus, [4]helicenes represent the least stable and less known radicals of this class. To the best of our knowledge, only four examples of [4]helicene radicals have been reported in the literature, one of which was not isolated (Scheme 1a).

In 1958, Neunhoffer and Haase reported the first [4]helicene radicals as doubly ortho-bridged radical (I). This radical showed low stability, readily decomposing when exposed to air.[16] Aulmich and co-workers also synthesized a [4]helicene radical with dimethyl-methylene units as bridging groups (II).[17] Later, Laursen et. al generated a quinolinoacridinium [4]helicene radical (III) by in situ electrochemical reduction of N,N'-dialkyl-1,13-dimethoxyquinacridinium (DMQA⁺) and studied it by UV-vis and electron paramagnetic resonance (EPR) spectroscopies.[18] The characterization data of this compound was not sufficient to conclude on the electronic structure of the radical species due to the unresolved EPR spectrum and lack of DFT calculations. In 2012, Morita and co-workers reported a chiral phenalenyl [4]helicene neutral radical (IV), stabilized by spin-delocalization of intramolecular π-electron network.[19] Recently, Osuka et al. reported an air stable triaryl Ni-porphyrin [4]helicene radical and its chemical oxidation and reduction products.[20]

Scheme 1. Literature reports and this work on [4]Helicenium Radical a) Previous [4]helicene radicals:

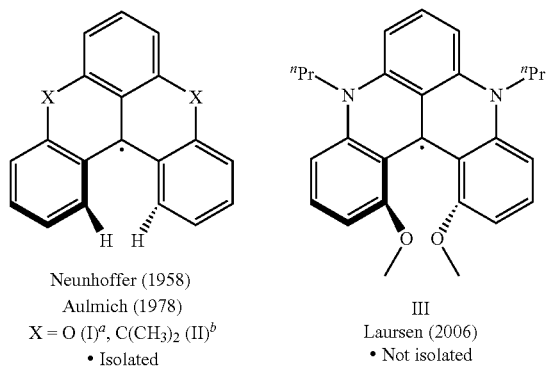

Neunhoffer (1958)
Aulmich (1978)
X = O (I)ᵃ, C(CH₃)₂ (II)ᵇ
• Isolated

III
Laursen (2006)
• Not isolated

• No electronic or XRD structure
• Delocalized/localized?

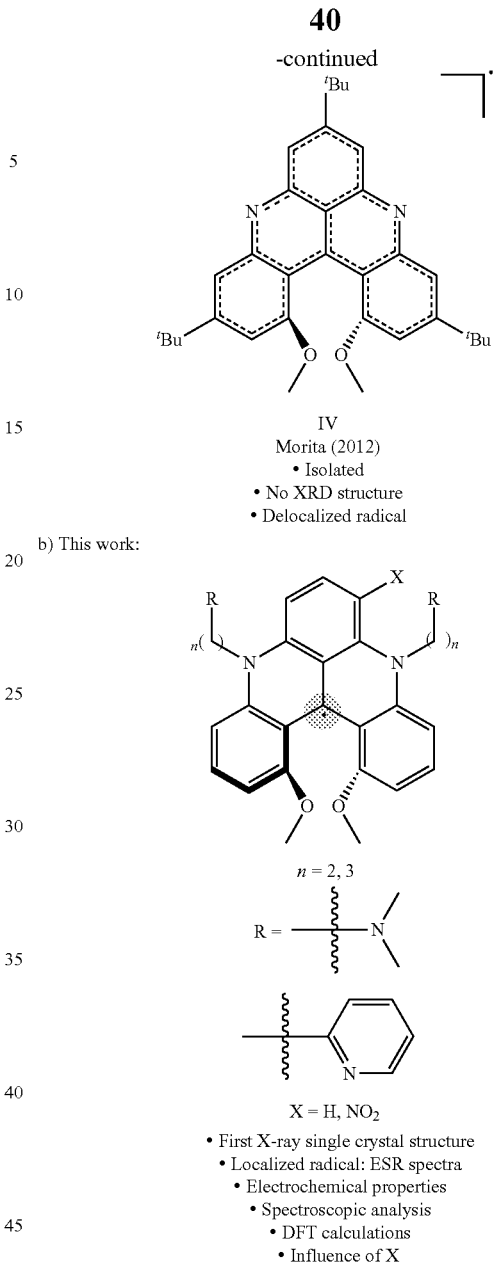

IV
Morita (2012)
• Isolated
• No XRD structure
• Delocalized radical b) This work:

X = H, NO₂
• First X-ray single crystal structure
• Localized radical: ESR spectra
• Electrochemical properties
• Spectroscopic analysis
• DFT calculations
• Influence of X It is noticeable that no X-ray crystallographic structure of a pure organic [4]helicene-based neutral radical system has been reported in any of the above works. Herein, we present the facile syntheses and structural tunability of [4]helicene quinacridyl neutral radicals and the first X-ray crystallographic data of such species. The electronic properties of these paramagnetic [4]helicenium-based radicals were systematically studied by $^1$H NMR spectroscopy, continuous wave (CW) EPR, electron-nuclear double resonance (ENDOR) spectroscopy, cyclic voltammetry, UV-vis absorption spectroscopy, and density functional theory (DFT) calculations. Similarly, we show that introducing an electron withdrawing —NO₂ group in the framework greatly influences the properties of the radical (stability, decomposition products, etc.), and allows a further one-electron reduction to access its diradical anion form. Additionally, the stability of all of these radicals under aerobic condition was investigated by UV-vis absorption spectroscopy. While most radicals react irreversibly with molecular oxygen, we observe the reversible oxidation of these carboradicals to their carbocation analogs.

Results and Discussion

The precursor helicenium cations were synthesized following literature protocols.[21] The tris(2,6-dimethoxyphenyl)methylium tetrafluoroborate (1), in the presence of a corresponding primary amine, was stirred in acetonitrile at 85° C. for 12 h. This resulted in the formation of the helicenium cations 2-$H^+$, $3^+$, and the previously reported $4^+$, in high yields (scheme 1a, condition i). The helicenium 2-$NO_2^+$ was obtained by nitration of 2-$H^+$ following the procedure reported by Lacour (Scheme 2a, condition ii). Finally, the helicenium cation $5^+$ was synthesized in a two-step process (Scheme 2a, condition iii). First, 1 was reacted with one equivalent of 2-(pyridin-2-yl)ethan-1-amine at room temperature for 2 h, resulting in a color change from purple to red, representative of the formation of the known acridinium intermediate S1.[22] S1 was then reacted with excess 3-(Dimethylamino)-1-propylamine in acetonitrile at 85° C. for 12 h, affording $5^+$ in high yield (Scheme 1a).[23] The formation of all [4]heliceniums ($2^+$-$5^+$) was confirmed by $^1H$ and $^{13}C$ NMR spectroscopies and by X-ray crystallography.

The $^1H$ NMR spectra of the carbocations 2-$H^+$ and $3^+$-$5^+$ appears well resolved and sharp at room temperature. At the same temperature, the 2-$NO_2^+$ $^1H$ NMR spectrum shows broad and poorly defined signals in the 2.70-2.00 ppm range suggesting the presence of a dynamic motion. Variable temperature (VT) $^1H$ NMR spectroscopy analysis of 2-$NO_2^+$ was conducted to resolve the broad signals observed. The sample was prepared on a non-coordinating solvent ($CD_2Cl_2$) and studied over a temperature range of 333-193 K. At room temperature (293 K), aromatic protons are poorly resolved and, the $^1H$ NMR spectrum shows that the amino arms are in rapid exchange. Decreasing the temperature to 193 K results in a sharp and well-defined proton signals, due to the reduced dynamic exchange. Clear differentiation and assignment of 6 methylenic protons of the amino arm are visible at 4.95 and 3.55 ppm, 4.87 and 4.68 ppm and 1.92 and 1.75 ppm. And their attribution could be successfully carried out thanks to a low-temperature COSY NMR sequence. These diastereostopic protons may result by the interaction between the nitrogen-lone pair of one -nPr-$NMe_2$ arm and the $C^+$ carbocation center (Scheme 3). Based on these data and the methylenic $H_{A-A'}$ protons shifts, we determined a coalescence temperature of 278K, obtaining a $NMe_2$-$C^+$ interaction of $\Delta G$=12.2 kcal/mol. Similarly, by looking at the methoxy groups of the [4]helicene structure (3.77 ppm & 3.73 ppm at 193 K), we can determine an o-MeOPh moiety interconversion energy of $\Delta G$=12.6 kcal/mol, via a coalescence temperature of 248 K.

Scheme 2. Synthetic Routes a) Synthesis of cations

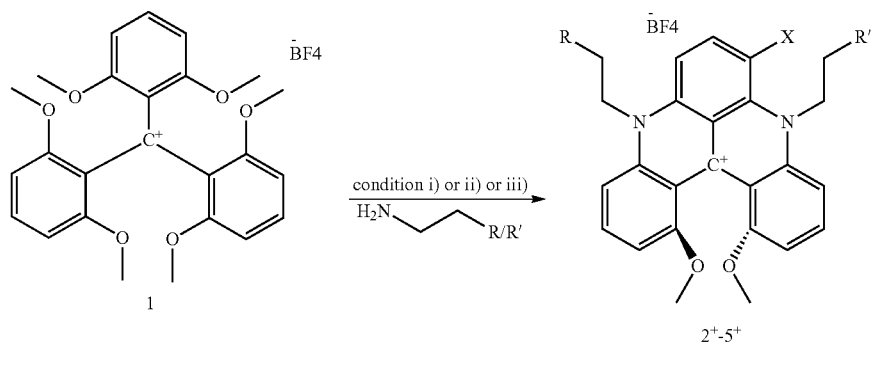

2-$H^+$, R = R' = —$CH_2NME_2$, X = H, 96%[i]
2-$NO_2^+$, R = R' = —$CH_2NMe_2$, X = $NO_2$, 90%[ii]
$3^+$, R = R' = -pyridyl, X = H, 95%[i]
$4^+$, R = R' = —$CH_3$, X = H, 95%[i]
$5^+$, R = —$CH_2NMe_2$, R' = -pyridyl, X = H, 88%[iii]

-continued b) Synthesis of radical

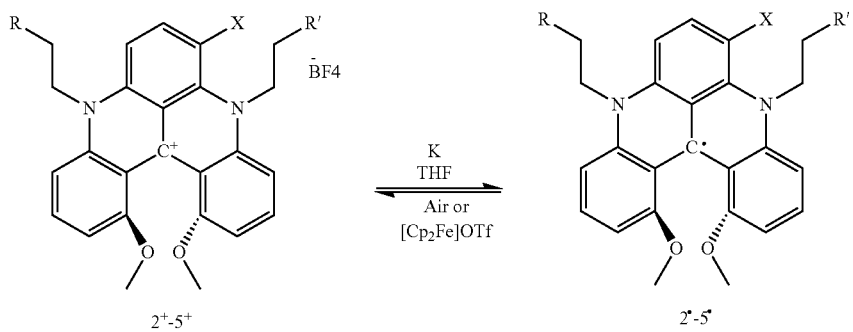

2-H•, R = R' = —CH$_2$NME$_2$, X = H, 82%
2-NO$_2$•, R = R' = —CH$_2$NMe$_2$, X = NO$_2$, 80%
3•, R = R' = -pyridyl, X = H, 80%
4•, R = R' = —CH$_3$, X = H, 75%
5•, R = —CH$_2$NMe$_2$, R' = -pyridyl, X = H, 86%

Scheme 2. a) i) Synthetic route for 2-H$^+$, 3$^+$ and 4$^+$: 1.0 equiv. of (1), 25.0 equiv of amine, CH$_3$CN, 85° C., 12 h; ii) Synthetic route for 2-NO$_2$$^+$: 1.0 equiv. of (2$^+$), HNO$_3$ (60%, 0.05 M), 15 min; iii) Synthetic route for 5$^+$:1.0 equiv. of (1), 1.2 equiv of 2-(2-Dimethylaminoethyl)pyridine, EtOAc, rt, 1.5 h; followed by 15.0 equiv of 3-(Dimethylamino)-1-propylamine, CH$_3$CN, 85° C., 12 h. b) Synthetic route for 2.-5.: 1.1 eq. of K or KC$_8$ in THF, rt, o/n.

aromatic protons of the helicene radical scaffold are not observable. However, the protons of the substituent arms α (N—CH$_2$—CH$_2$—R) and β (N—CH$_2$—CH$_2$—R) to the helicene core consistently appear broad and shifted at 17 and −7 ppm, respectively, for all radicals. The protons γ (N—CH$_2$—CH$_2$—R; R=CH$_3$, CH$_2$NMe$_2$, Py) to the helicene core are less influenced by the radical, and while broad, resonate in the diamagnetic 10-0 ppm region. For 2-H., Scheme 3. 2-NO$_2$$^+$-nPr-NMe$_2$ interaction with the C$^+$ observed by VT $^1$H NMR.

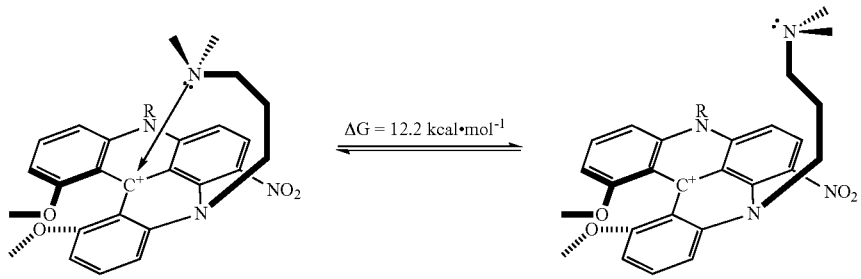

ΔG = 12.2 kcal•mol$^{-1}$

The radical analogs (2.-5.) were synthesized by reduction of 2$^+$-5$^+$ with potassium metal in THF at room temperature overnight (Scheme 1b). The reaction mixture turned from dark green suspension to a dark magenta solution. The insoluble KBF$_4$ salt that formed in the process was removed by filtration. THF was removed under vacuum, and the resultant solids were extracted with toluene. Crystallization from a toluene/hexane mixture at −35° C. afforded 2.-5. as dark brown crystals in good yields (Scheme 1b). The formation of radicals 2.-5. could be confirmed by the absence of fluorine signals in the $^{19}$F NMR spectrum and by observation of the characteristic EPR signals (Vide infra). It is noteworthy that the resultant radicals are remarkably stable under inert atmosphere at room temperature in both the solid and solution, retaining their color and crystallinity indefinitely (over several months).

The molecules 2.-5. were also analyzed by paramagnetic $^1$H NMR to determine if the pendant arms of the molecule have any effect or interaction with the radical system. Due to the pronounced radical nature of these compounds, the γ-protons as broad bands of 4 ppm wide centered around 5.71 ppm. The NO$_2$ electron-withdrawing group on 2-NO$_2$. is speculated to have a widening effect on this band (from 9 to 2 ppm) still centered on around 5.71 ppm. The pyridinyl protons (π) for 3. and 5. are well-defined at 8.58, 7.38, 6.33 and 6.03 ppm respectively. In scaffold 5, the broad signature of γ-protons at 5.71 ppm is partially hidden by π-protons. The γ-protons on 4. from the n-propyl groups are less affected by the radical system and appeared as a broad peak centered at 2.88 ppm. It thus appears that the nature of the chosen pendant arms has little influence on the radical character of the compounds 2.-5.. Conversely, the substitution of a proton of the helicenium core by an electron-withdrawing group induces a modification of the electronic structure of the resulting radical 2-NO$_2$.. This can be used in future research to modify at will the electronic structure of these helicinium.

X-ray diffraction. Slow DCM/hexane layering afforded suitable crystals of the cationic precursors 2-H$^+$ and 2-NO$_2$$^+$ for X-ray diffraction (XRD) analysis. 2-H$^+$ crystallized in P-1 triclinic space group whereas the nitro-cation (2-NO$_2^+$) exhibited a C2/c monoclinic system. In both structures, the [4]helicenium scaffold is planar along the nitrogen-cyclized fragment. Similarly, an important steric-hindrance induced twist between the o-(MeO)-phenyl moieties (2-H$^+$: 41.93°, 2-NO$_2^+$: 38.37°) is observed in the solid state (Table 1). These differences in torsion angle between 2-H$^+$ and 2-NO$_2^+$ are also underlined by the O1-O2 distances, 2.743 Å and 2.659 Å, respectively. The two -nPr-NMe$_2$ arms in 2-H$^+$ appear unconstrained and oriented in the same plane as the carbocation scaffold. As presupposed by the VT $^1$H NMR spectroscopy analysis, one of the -nPr-NMe$_2$ arms in 2-NO$_2^+$ is folded over the carbocation center (C1-N3: 3.194 Å). It can also be noted that this phenomenon takes place on the adjacent position to the NO$_2$ group, which is likely caused by steric hindrance. This interaction denotes the increased Lewis acidity conferred on then carbocation center by the presence of the m-(NO$_2$) group in 2-NO$_2^+$, resulting in a non-binding interaction of C1 and the lone pair in N3 in solid state and confirms our VT $^1$H NMR spectrum interpretation.

The neutral radicals 2-H· and 2-NO$_2$· were isolated from a concentrated toluene solution by slow diffusion of hexane, resulting in crystals with orthorhombic Pbca and triclinic P-1 space groups, respectively. The absence of BF$_4^-$ counter ion confirms the single-electron reduction induced by metallic K in THF. The distortion of the o-(MeO)-phenyl groups is more accentuated than their cationic precursors in 2-H· (45.92°, +3.99°), and particularly in 2-NO$_2$· (52.05°, +13.68°), resulting in similar O1-O2 distances for both complexes (2-H·: 2.772 Å and 2-NO$_2$·: 2.773 Å) (Table 1).

The increase in C1-C2, C1-C3 and C1-C4 interatomic distances in 2-H· (1.439, 1.444, and 1.446 Å, respectively) relative to the cation 2-H$^+$ (1.406, 1.435 and 1.431 Å), indicates an antibonding interaction between C1 and its surrounding atoms. This interaction, along with the localization of the electron density in C1, is supported by DFT calculations (vide infra). Similarly, the C1-C3 distance in 2-NO$_2$· (1.429 Å) was elongated when compared to 2-NO$_2^+$ (1.413 Å). In contrast, bond distances in 2-NO$_2$· were shortened compared to 2-NO$_2^+$ C1-C2 (1.423 vs 1.431 Å), C1-C4 (1.438 vs 1.440 Å), C2-C5 (1.408 vs 1.435 Å). This phenomenon is presumed to be due to the electron withdrawing NO$_2$ group, which also shows shortening in its inter-atomic distances C—NO$_2$ (1.444 from 1.452 Å) and N—O (1.226/1.235 from 1.233/1.235 Å) and should cause a higher delocalization of the electronic charge. Finally, the -nPr-NMe$_2$ arm adjacent to the nitro group in 2-NO$_2$· is out of plane due steric hindrance of the NO$_2$ moieties. However, unlike in 2-NO$_2^+$ where an interaction is observed between the lone pair of NMe$_2$ and the electron poor p-system, the NMe$_2$ is oriented away from the electron rich π-system of the neutral radical molecule. Moreover, it can be seen that the transition from the 2$^+$ to 2· state results in an increase in the torsion angle of the MeO-Ph groups of the helicene. The angle between the two planes formed by the aromatics slightly increases from 41.93° to 45.92° for 2-H (i.e. +3.99°). While for 2-NO$_2^+$, if a torsion angle close to that of 2-H$^+$ in the carbocation state (38.37°) is noted, an increase of +13.68° (52.05°) is observed during the transition to the radical state, underlining the influence of the —NO$_2$ group.

TABLE 1

Characteristic Bond lengths and bond angles for 2-H$^+$, 2-H·, 2-NO$_2^+$ and 2-NO$_2$·

| Selected Bonds | 2-H$^+$ | 2-H· | 2-NO$_2^+$ | 2-NO$_2$· |
|---|---|---|---|---|
| Bonds length (Å) | | | | |
| C1—C2 | 1.406 | 1.439 | 1.431 | 1.423 |
| C1—C3 | 1.435 | 1.444 | 1.413 | 1.429 |
| C1—C4 | 1.431 | 1.446 | 1.440 | 1.438 |
| O1—O2 | 2.743 | 2.772 | 2.659 | 2.773 |
| C2—C5 | — | — | 1.435 | 1.408 |
| C—NO$_2$ | — | — | 1.452 | 1.444 |
| N2—O (NO$_2$) | — | — | 1.233/1.235 | 1.226/1.235 |
| Angles (°) | | | | |
| o-(MeO)Ph ^ o-(MeO) Ph | 41.93 | 45.92 | 38.37 | 52.05 |
| NO$_2$—Ph ^ N-nPr—NMe$_2$ | — | — | 37.69 | 45.60 |

DFT calculations. Geometry optimization followed by frequency calculations of open-shell models with S=2, were obtained to determine the electronic structure of radicals 2.-5.. Open-shell DFT calculations were performed to determine the electronic structure of the radicals 2.-5.. In all of these radicals, the electron spin was found to be distributed over the whole □-system, with the largest spin population, ~60%, residing on the central carbon atom, C1. The spin density distribution was not affected by the nature of the alkyl amine appendages R and R' (see Scheme 2). The valence electron in the SOMO for the radicals 2.-5. resides lower in energy than the lowest unoccupied molecular orbital (LUMO) by ~4 kcal/mol.

Figure 17A:
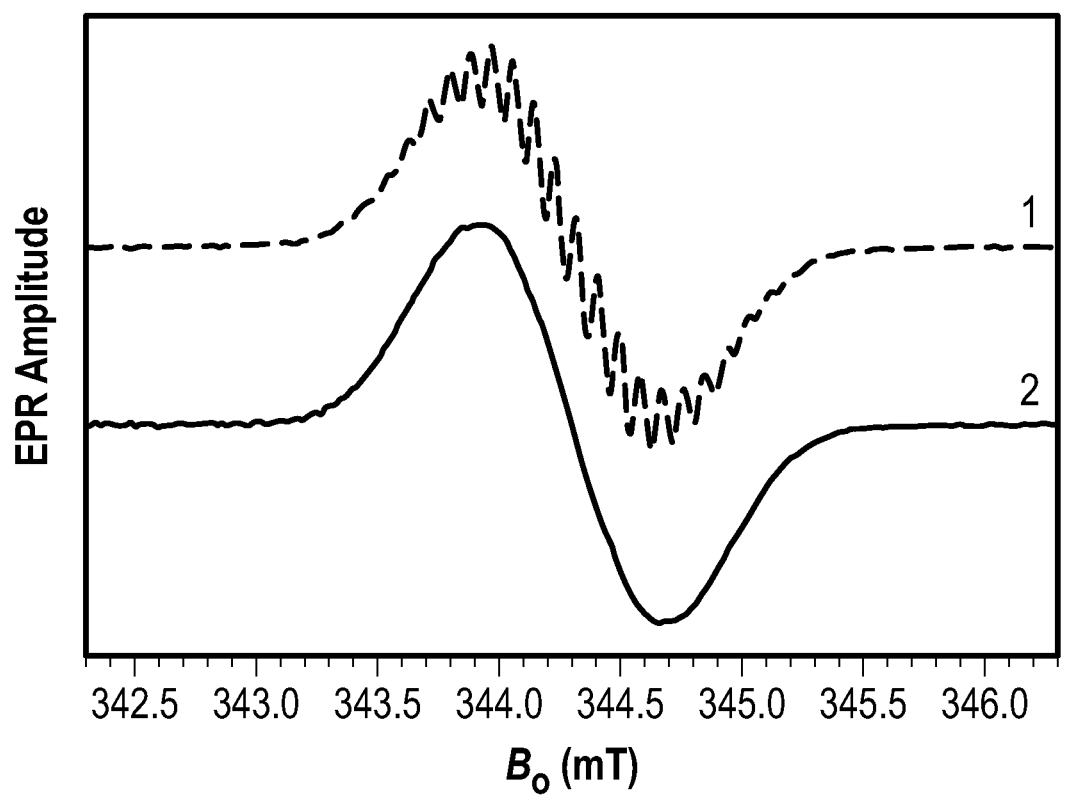
FIG. 17A shows the continuous wave electron paramagnetic resonance (CW EPR) spectra of radicals 2-H. (trace 1) and 2-NO$_2$. (trace 2) in liquid toluene solutions at room temperature. Experimental conditions: mw frequency, 9.651 GHz; mw power, 2 mW; magnetic field modulation amplitude, 0.01 mT.
Figure 17B:
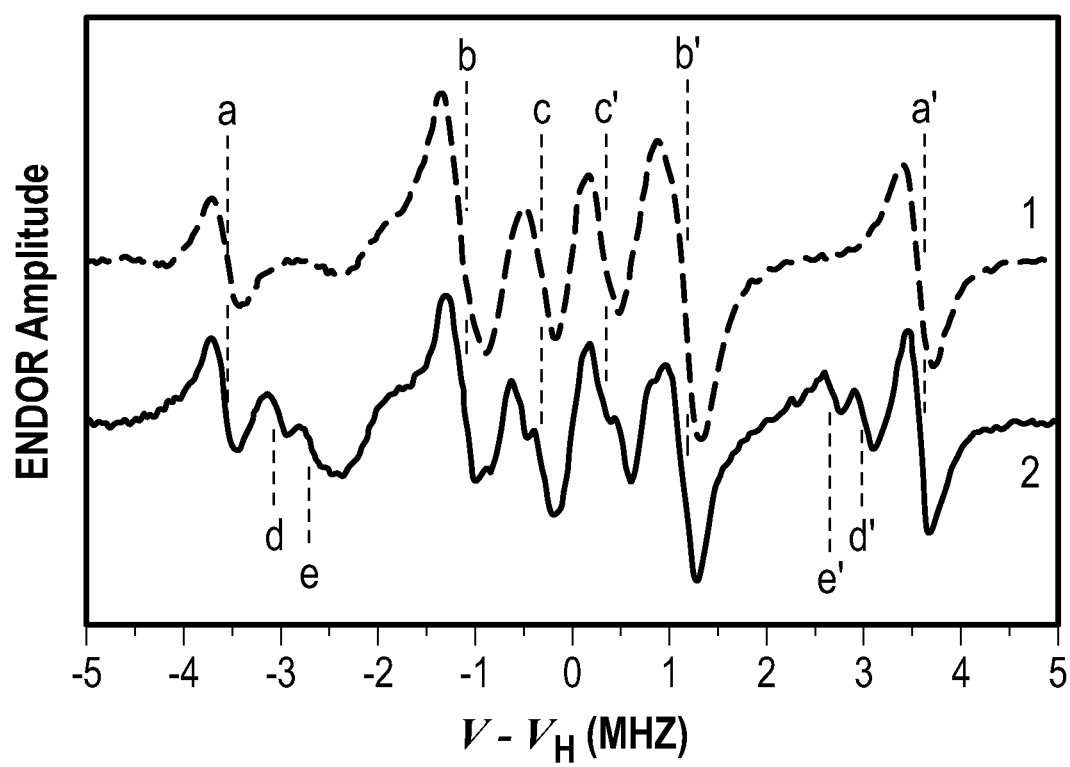
FIG. 17B shows the continuous wave electron nuclear double resonance (CW ENDOR) spectra of radicals 2 (trace 1) and 3 (trace 2) in liquid toluene-d$_8$ solutions. Experimental conditions: mw frequency, 9.558 GHz; mw power, 32 mW; magnetic field, 340.9 mT (center of the EPR spectrum); radiofrequency (rf) power, 200 W; rf modulation amplitude, 100 kHz (frequency modulation); temperature, 210 K.

ESR, ENDOR, Measurements: The X-band EPR spectra of 2-H. and 3.-5. in liquid toluene solutions are represented as a Gaussian line centered at g≈2.003, with the width of about 0.76 mT and a poorly resolved multiline hyperfine structure with the splitting of about 0.088 mT (as an example, see trace 1 in FIG. 17A showing the spectrum of 2-H.). The EPR spectrum of 2-NO$_2$. has the same g-factor and width, but the hyperfine structure is unresolved. To obtain more detailed information about the $^1$H hyperfine interactions (hfi), continuous wave electron-nuclear double resonance (ENDOR) experiments were performed (FIG. 17B). The $^1$H ENDOR spectra of 2-H. and 3.-5. were generally similar, showing three pairs of lines denoted by (a,a'), (b,b'), and (c,c'). Each pair of lines is located at the frequencies of $v_H \pm a_H/2$, where $v_H$ is the proton Zeeman frequency and $a_H$ is the hfi constant (different for different protons). The specific hfi constants estimated for each pair of ENDOR lines are: $|a_{Ha}| \approx 7.1$ MHz (for a,a' lines), $|a_{Hb}| \approx 2.3$ MHz (for b,b' lines), and $|a_{Hc}| \approx 0.65$ MHz (for c,c' lines). The splitting of 0.088 mT (~2.5 MHz in frequency units) observed in the EPR spectra of 2-H. and 3.-5. is obviously determined by $a_{Ha}$ and $a_{Hb}$.

Figure 18:
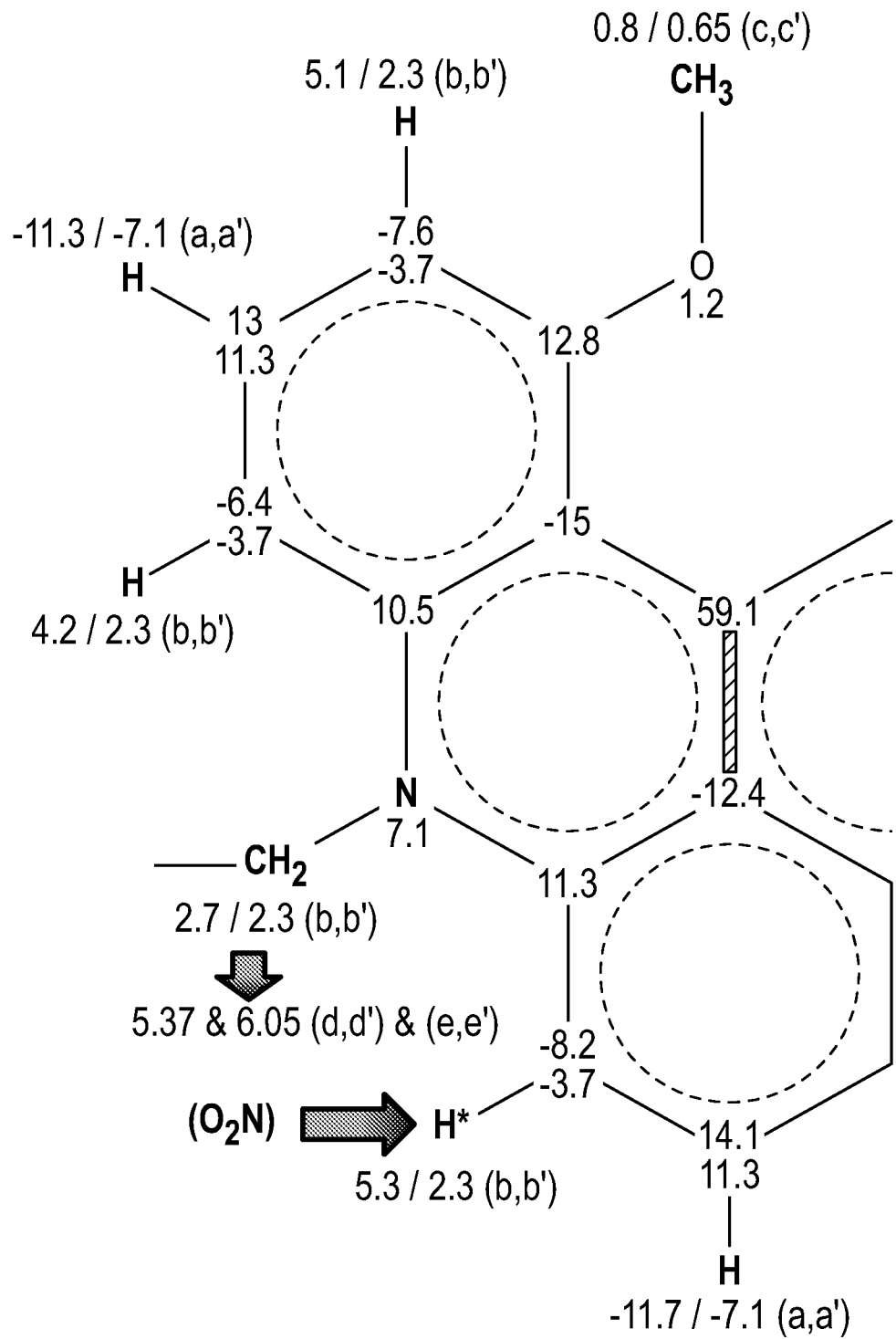
FIG. 18 shows the spin populations and $^1$H hfi constants in radicals 2.-5.. Only one half of the ring system is shown. The second half is related by C$_2$ symmetry with respect to the C1-C ## bond (shown by thick brown line). In radical 2-NO$_2$., the hydrogen marked by an asterisk is substituted by NO$_2$ group on one side of the molecule only. This substitution and the resulting change of the proton hfi constants are shown by the colored arrows. The calculated spin populations of the ring atoms are shown in magenta. The calculated proton hfi constants are shown in green, and those determined by ENDOR are in light blue. The ENDOR line assignments are in red color and in parentheses. The ring carbon spin populations estimated from the experimental hfi constants using the McConnell equation are shown in dark blue.

The $^1$H hfi constants were assigned to specific molecular positions by comparing them to the DFT predictions. FIG. 18 shows the relevant part of the molecular structure of 2-H. and 3.-5. (i.e. one half of the structure is shown because the ring system has an approximate C$_2$ symmetry with respect to C1-C ##axis). The calculated spin populations for the ring carbons, nitrogen(s), and ##oxygen are indicated in magenta. The $^1$H hfi constants resulting from the calculated spin populations on the hydrogen atoms ($a_H$=1420 $\rho_H$ [MHz]) are shown in green, and the corresponding tentatively assigned experimental hfi constants are shown in light blue. The ENDOR line assignments are indicated in parentheses. The spin populations on the ring carbon atoms estimated from the experimental $a_H$ values of the neighboring protons (α-protons) using the McConnell equation: $a_H$=(−63 MHz)ρc, are shown in FIG. 18 in dark blue.

For radical 2-NO$_2$., the proton marked by an asterisk in FIG. 18 is substituted by a nitrogen of NO$_2$ group (on one side of the molecule only, see Scheme 2). The spectroscopic result of this substitution is a ~30% decrease of the relative intensity of (b,b') lines in the ENDOR spectrum and appearance of (d,d') and (e,e') lines corresponding to $a_H$=6.05 and 5.37 MHz, respectively (see trace 2 in FIG. 17B). Such a significant decrease in the (b,b') lines intensity can be explained by the fact that, according to our hfi assignments shown in FIG. 18, the H to NO$_2$ substitution removes one proton from the $a_H$=2.3 MHz pool ((b,b') lines). In addition, two more protons are "relocated" from the (b,b') lines to the new (d,d') and (e,e') ENDOR lines. The three protons removed from the $a_H$=2.3 MHz pool, which originally consisted of 10 protons, thus explain the 30% decrease of the (b,b') lines intensity.

To assign the protons contributing to the (d,d') and (e,e') ENDOR lines, let us consider the molecular structures and the DFT results. In radical 2-NO$_2$., the steric clash between the NO$_2$ group and the CH$_2$ group attached to the nearest ring nitrogen, results in a significant conformational distortion of the aromatic ring structure and a reorientation of the affected CH$_2$ group. In particular, the whole set of three aromatic rings shown in FIG. 18 acquires a pronounced saddle conformation, with the N—CH$_2$ bond making an angle of 380 with the mean plane formed by the N-containing ring (compared with <100 in 2-H and 3.-5.). At the same time, the DFT calculation for radical 2-NO$_2$. results in essentially the same distribution of spin populations as in 2-H. and 3.-5.. Therefore, even allowing for a certain inaccuracy in the DFT predictions, we can safely conclude that the hfi constants of 6.05 and 5.37 MHz should most likely be assigned to the protons of the methylene group attached to the ring nitrogen neighbouring the NO$_2$ group in 2-NO$_2$., and the change of the $a_H$ values for these protons from 2.3 MHz to 6.05 and 5.37 MHz is mostly caused by the abovementioned conformational changes.

Figure 19:
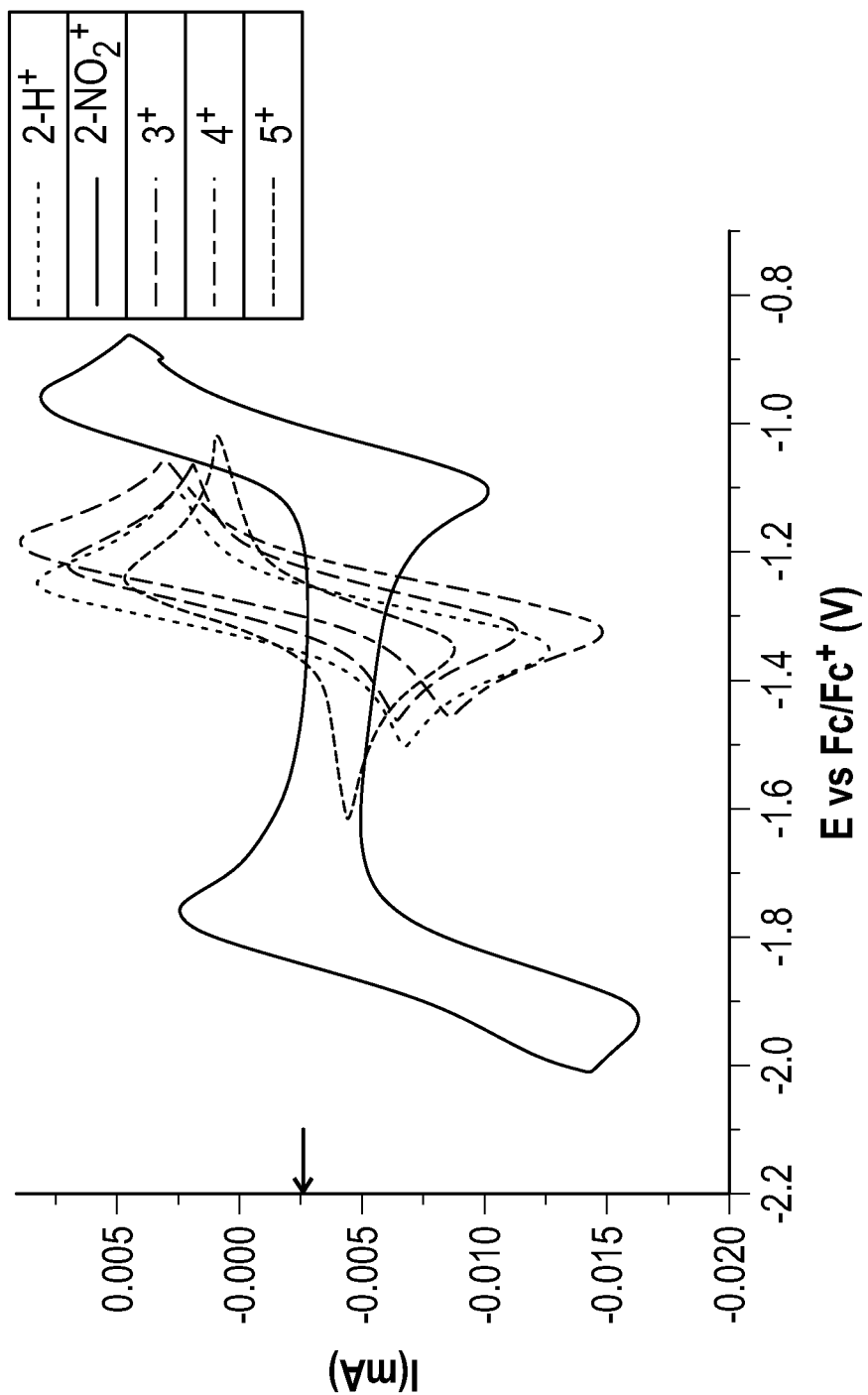
FIG. 19 illustrates the cyclic voltammograms of 2$^+$-5$^+$ (2 mM) in DCM ([TBA][PF$_6$] 0.1 M) solutions recorded at a glassy carbon working electrode (n=0.1 V/s) and Ag/Ag$^+$ as internal reference electrode, Fc/Fc$^+$ was used as secondary reference by setting its $E_{1/2}$=0. The arrows indicate the direction of the scan. Reduction half-wave potential values (V) measured by CV for 2-H$^+$ ($E_{1/2}^{red1}$=−1.308), 2-NO$_2^+$ ($E_{1/2}^{red1}$=−1.046, $E_{1/2}^{red2}$=−1.849), 3$^+$ ($E_{1/2}^{red1}$=−1.264), 4$^+$ ($E_{1/2}^{red1}$=−1.267), and 5$^+$ ($E_{1/2}^{red1}$=−1.286), E versus the Fc/Fc$^+$ redox couple.

Electrochemistry: The electrochemical behavior of 2$^+$-5$^+$ was investigated via cyclic voltammetry (FIG. 19). Under reductive conditions, a fully reversible event is observed around $E_{1/2}$=−1.25 V in 2$^+$-5$^+$ which corresponds to the reduction of C$^+$ to C. (CV of 4$^+$ is reported by Laursen).[18] This event is observed at a lower potential for 2-NO$_2^+$ (−1.0 V), consistent with a more electron deficient scaffold due to the presence of the NO$_2$ group. For 2-NO$_2^+$, a second reversible reduction was observed at $E_{1/2}$=−1.8 V. In the case of 2-H$^+$, 3$^+$-5$^+$, an irreversible reduction event is found at $E_{1/2}$=−2.3 V, corresponds to reduction of C. to C—, as reported by Laursen.[18]

UV-Vis spectroscopy. The UV-visible spectra of the cations and radicals (2-5) were studied to understand the electronic transitions (Table 2). The radical 2-H. shows a sharp absorption band with the maximum absorbance at 392 nm (ε=15936), with a shoulder at 445 nm (ε=5090), and a broad absorption peak at 558 nm (ε=6496). Such kind of transition band were absent in compound IV,[19] which indicates that inductive effect of the R-substituent either on aryl ring or bridge nitrogen responsible for radical transitions. On other side, its cationic precursor (2-H$^+$) shows sharp peak at 617 nm (ε=14431), with a shoulder at 570 nm (ε=10526), and a broad absorption at 435 nm (ε=6044).[34] However, 2-H. shows blue shift in absorption bands compared to 2-H$^+$, which indicates the presence of radical character at central atom and reduction of the involvement of the heteroatoms in the molecular framework as well as conjugation is remarkably decreased. The presence of higher number of more localised transitions in isolated radical form (2-H) responsible for increased number of transition bands in the visible region in 2-H. with respect to 2-H$^+$.[18] Further, other radical 3.-5. shows more or less similar transition energy indicates nitrogen bridge substituents has negligible effect on transition energy. To the note, 2-NO$_2$ displayed the highest energy of the first transition among all due combine inductive stabilization of NO$_2$ group and N-alkyl bridge.

TABLE 2

Photophysical properties of compounds 2-5 in α,α,α-Trifluorotoluene

| Compound | λmax absorption [nm] (ε [M$^{-1}$ · cm$^{-}$ |
|---|---|
| 2-H+ | 435 (6044), 577 (10526), 617 |
| 2-H· | 392 (15936), 445 (5093), 558 (6496) |
| 2-NO$_2^+$ | 417 (18320), 576 (12854) |
| 2-NO$_2$· | 395 (26172), 505 (8116), 604 (1559) |
| 3$^+$ | 433 (7501), 574 (10987), 612 (14925) |
| 3· | 392 (23422), 444 (8061), 554 (9555) |
| 4$^+$ | 434 (7325), 570 (7706), 613 (10006) |
| 4· | 392 (19476), 476 (5245), 556 |
| 5$^+$ | 440 (6368), 572 (8705), 615 (11032) |
| 5· | 391 (16222), 473 (5229), 557 |

Figure 20A:
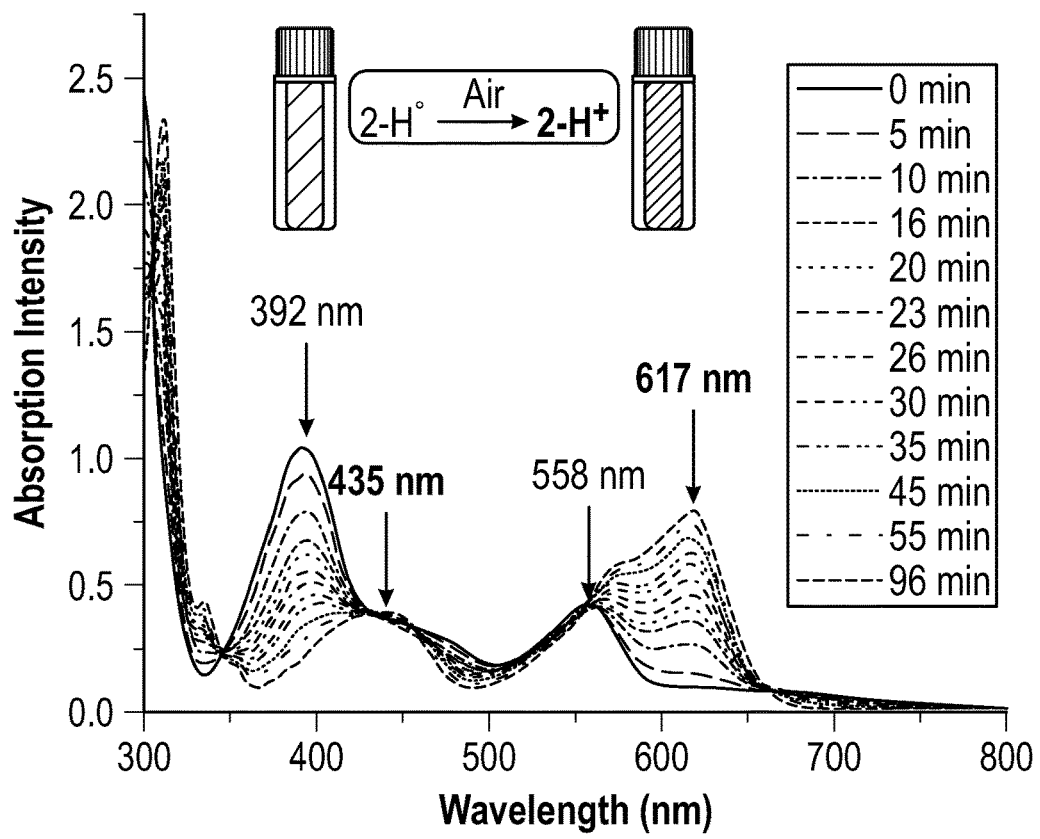
FIG. 20 shows the change of UV-visible absorption spectra for 2. upon exposure to air. Spectra recorded at different time intervals. Half life time ($t_{1/2}$) for 2-H around 27 min, 45 min for 3., 47 min for 5., 57 min for 4., and 210 min for 2-NO$_2$..
Figure 20B:
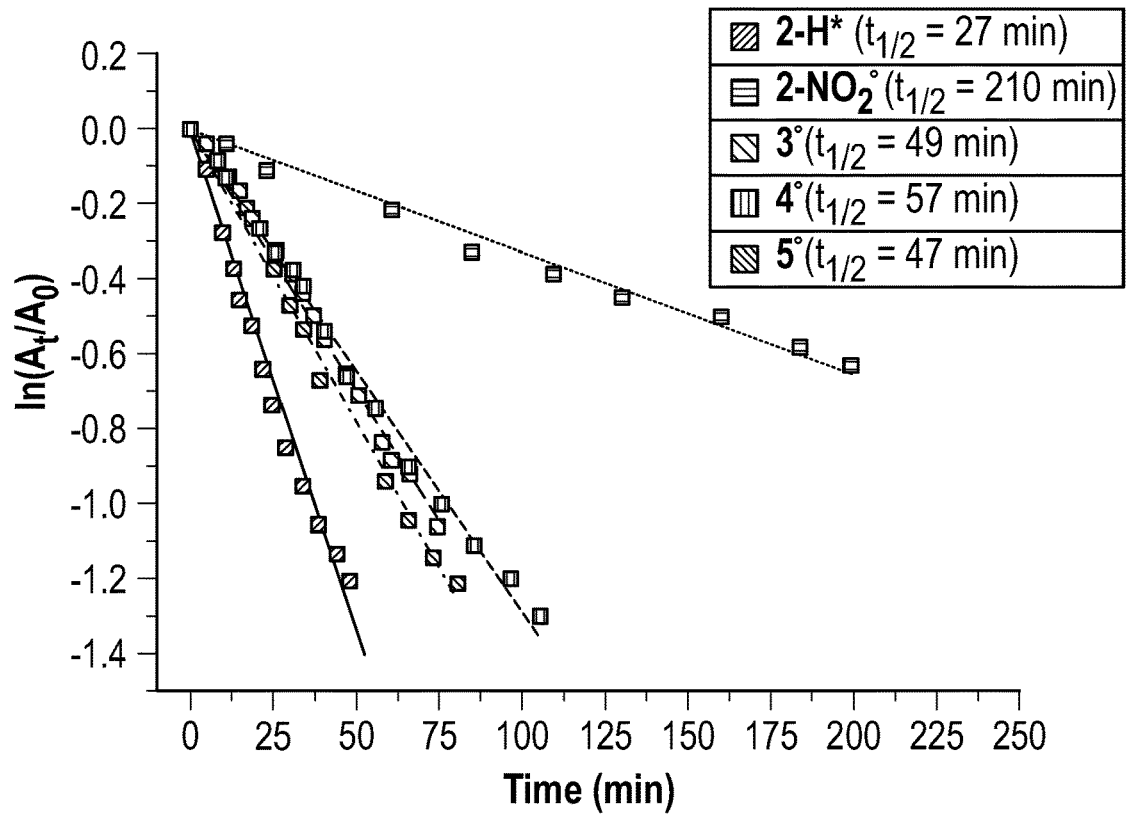

To quantify the stability of all radicals in the presence of oxygen, solutions of 2.-5. in CF$_3$-tol prepared in a N$_2$-filled glove box were exposed to air and monitored by UV-vis spectroscopy over time. For radical 2-H. and 3.-5., the absorption spectrum of the radical slowly decreased with time (indicate by arrow and reached to lower absorption in hours and the final absorption spectrum decay was identical to that of its cationic form (See FIG. 20). Unlike other radicals in this family, these quinacridyl [4]helicenium radicals do not undergo oxygen insertion or dimer formation because of the two ortho-methoxy groups in the molecule which interact to prevent a completely planar structure for the radical. The steric repulsion inhibits delocalization avoids the formation of the dimer or oxo-analog.[16,17,25]. Instead, a clean reversible oxidation to the cationic analogs is observed. The 2-H. showed half-life time ($t_{1/2}$) of around 27 min, 45 min for 3., 47 min for 5, and 57 min for 4.. Positive inductive effect of n-propyl fragment of 4. as compare to others responsible for longer half life as compared to others. On other hand, the electronically deficient 2-NO$_2$. radical exhibits longer $t_{1/2}$ of about 271 min which indicates that radical is stabilized by inductive effect of nitro group as well as n-propyl fragment. The stronger —I effect —NO$_2$ group leads to the dilution of a spin densities and causes diminished reactivities.[26] Furthermore, electron-withdrawing —NO$_2$ groups make radicals less reactive toward molecular oxygen, thus the 2-NO$_2$ oxidation to form its cation analog is a less selective.[27]

Figure 21:
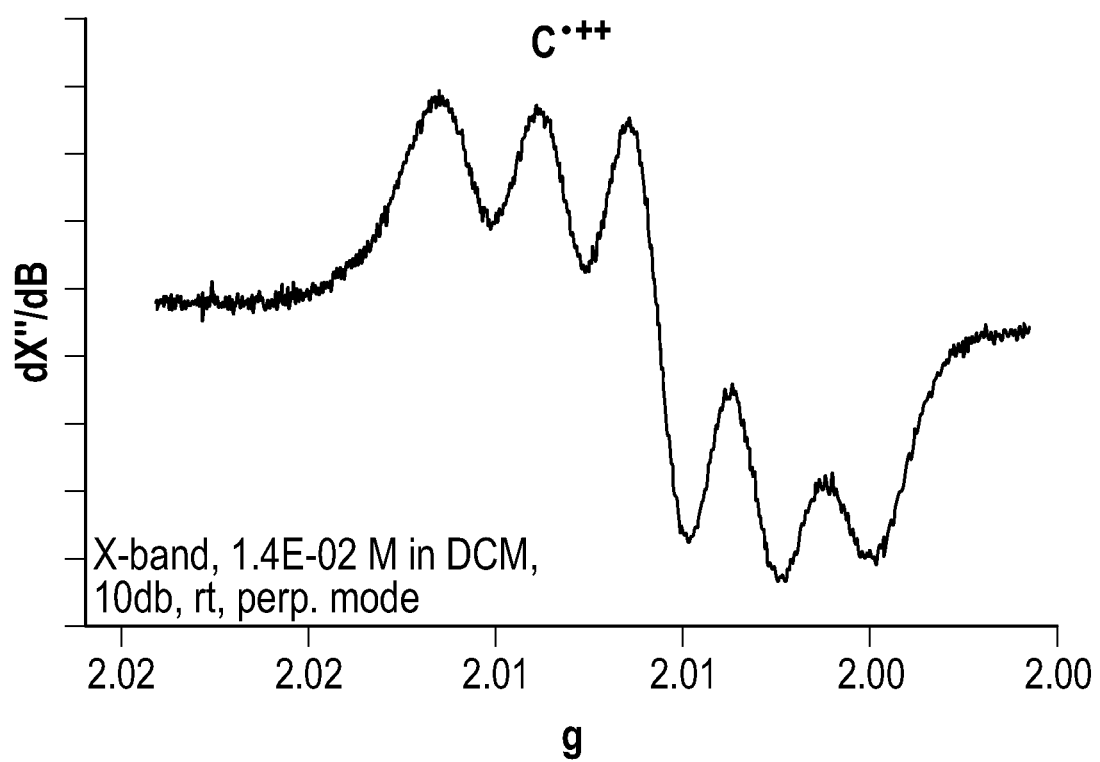
FIG. 21 is an EPR spectrum of the catholyte C++ from Example 3.

Example 3. Preliminary Result on Radical Dication Supporting that C$^{++}$. is a Stable Catholyte The catholyte C++ as shown in the scheme below has been successfully synthesized and isolated by oxidation of the carbenium C+ precursor using magic blue as oxidant. Preliminary EPR spectroscopy measurement is shown in FIG. 21. This work is currently in progress in order to obtain full characterization in this molecule using X-Ray diffraction spectroscopy, UV-Vis spectroscopy and DFT calculation.

a) Synthesis of cations

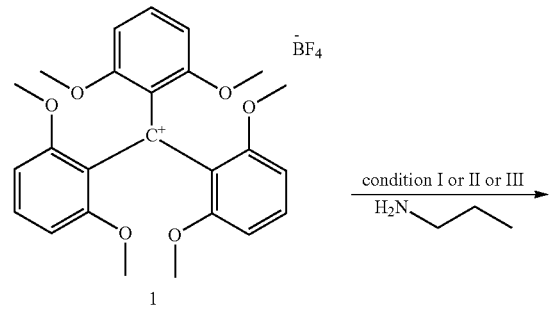

b) Synthesis of radical dication

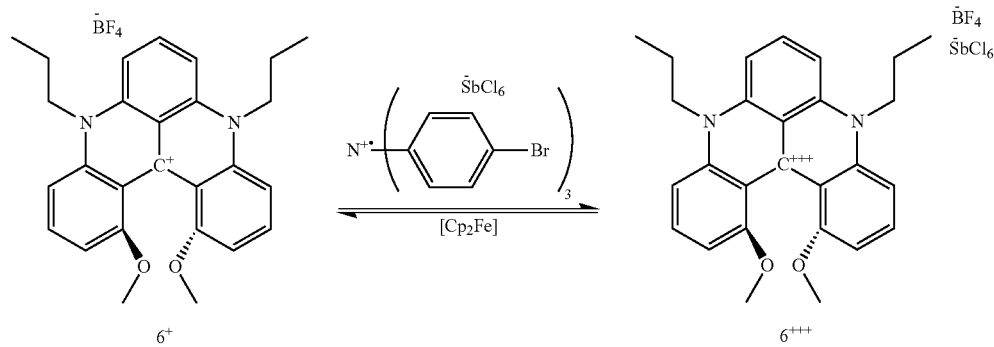

Figure 22:
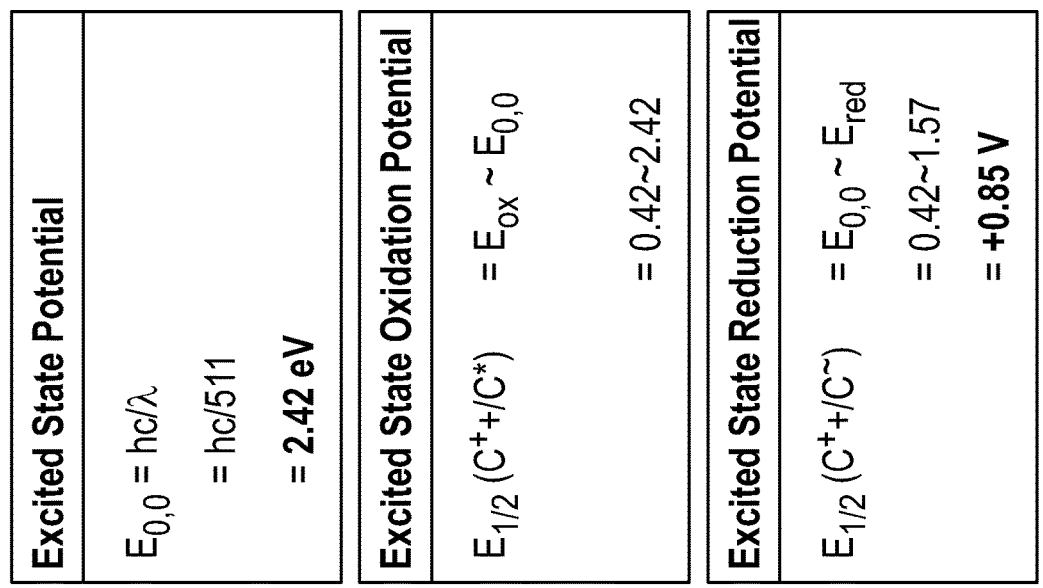
FIG. 22 shows the UV-visible spectra, cyclic voltammetry, excited state potentials of the compounds from Example 4.
Figure 22:
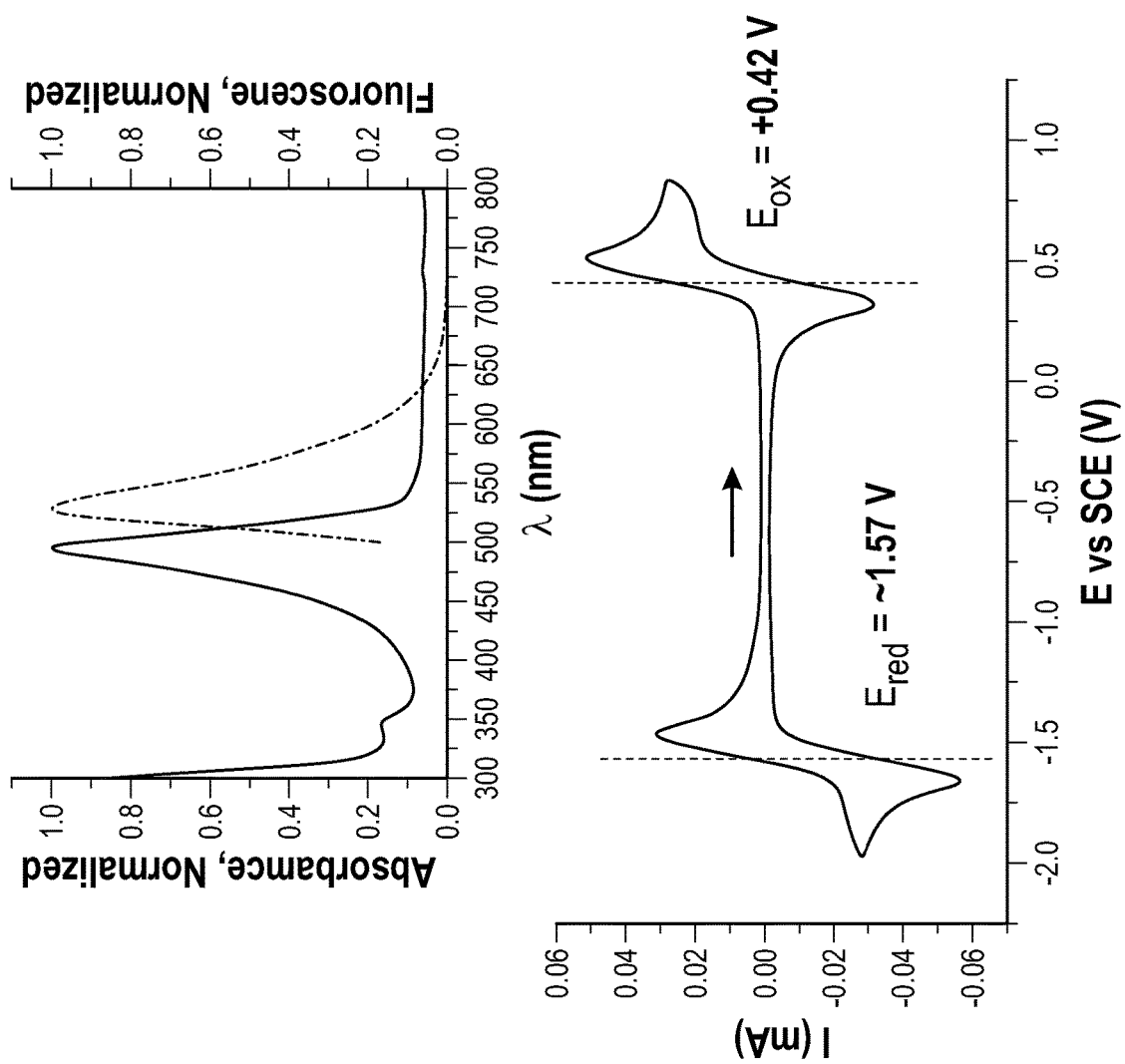

Example 4. Preliminary Result Photocatalytic Activity for Photovoltaic Charge of the Battery The scheme below shows the photocatalytic activities of the following compounds. FIG. 22 shows the corresponding the UV-visible spectra, cyclic voltammetry, excited state potentials of these compounds.

Scheme C.
Potentials recorded in acetonitrile and referenced to SCF electrode.

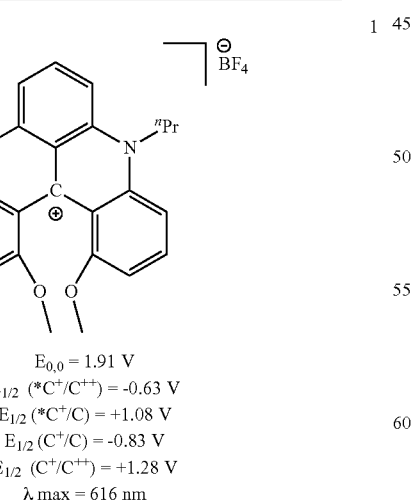

1

$E_{0,0} = 1.91$ V
$E_{1/2}$ (*C$^+$/C$^{++}$) = −0.63 V
$E_{1/2}$ (*C$^+$/C) = +1.08 V
$E_{1/2}$ (C$^+$/C) = −0.83 V
$E_{1/2}$ (C$^+$/C$^{++}$) = +1.28 V
$\lambda$ max = 616 nm -continued

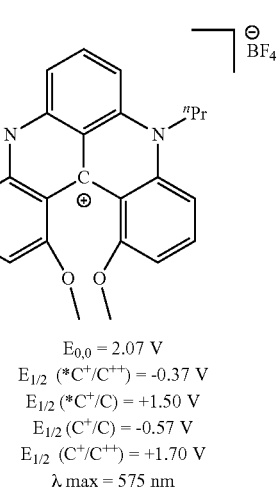

2

$E_{0,0} = 2.07$ V
$E_{1/2}$ (*C$^+$/C$^{++}$) = −0.37 V
$E_{1/2}$ (*C$^+$/C) = +1.50 V
$E_{1/2}$ (C$^+$/C) = −0.57 V
$E_{1/2}$ (C$^+$/C$^{++}$) = +1.70 V
$\lambda$ max = 575 nm -continued

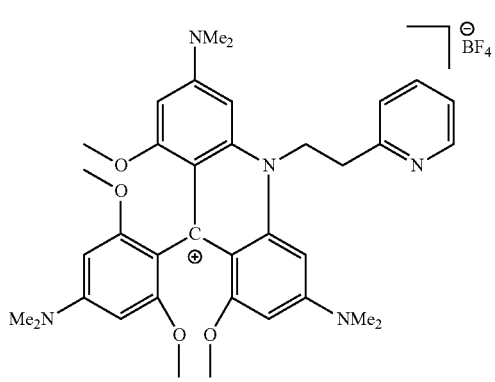

$E_{0,0} = 2.35$ V
$E_{1/2}$ (*C$^+$/C$^{++}$) = -2.0 V
$E_{1/2}$ (*C$^+$/C) = +0.80 V
$E_{1/2}$ (C$^+$/C) = -1.56 V
$E_{1/2}$ (C$^+$/C$^{++}$) = +0.41 V
$\lambda$ max = 506 nm

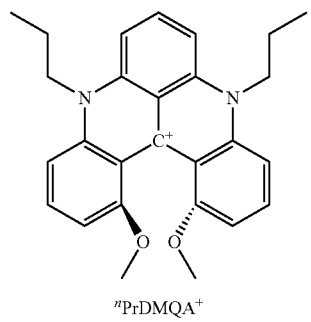

$^n$PrDMQA$^+$

Example 5. Evaluation of Robustness and Cyclability of the Active Carbocation Electrolytes Depending on the Supporting Electrolyte Salts In this example, the robustness and cyclability of the active carbocation electrolytes depending on the supporting electrolyte salts was evaluated by using H-cell cycling. The following compound $^n$PrDMQA$^+$ was used.

TBAPF$_6$, a salt initially chosen for its accessibility, its affordable cost (see Table 3) and its large potential stability window (6.6V in acetonitrile) [28] allowed for 550 cycles before the system lost 10% of its capacity. The use of a TBABF$_4$ salt, slightly more expensive and less robust (6.4V stability window) [28], allowed an improvement of this result, allowing a retention of capacity beyond 90% of the initial charge during 680 cycles. The use of a TEABF$_4$ salt (6.4V stability) [28], confirmed the importance of the tetrabutylammonium salt for the stability of the system. Indeed, from the second charge cycle, the capacity retention of the model-battery dropped rapidly, and showed a loss higher than 10% after the 195th cycle.

TABLE 3

Comparison of different supporting electrolytes.

| Supporting Electrolyte | TBAPF$_6$ | LiBF$_4$ | TBABF$_4$ | TEABF$_4$ | TEAOTf | TBAOTf | TBATFSI |
|---|---|---|---|---|---|---|---|
| MW (g/mol) | 387.43 | 93.8 | 329.27 | 217.06 | 279.32 | 337.56 | 522.61 |
| Reversibility | YES | NO | YES | YES | — | — | — |
| Cyclability (n > 90%) | 550 | — | 680 | 195 | — | — | — |
| Cost ($/0.1 kg) | 179 | 324 | 291 | 222 | 1644 | 686 | 319 |
| 1 L at 0.1M ($) | 69.35 | 30.38 | 95.82 | 48.19 | 459.20 | 231.57 | 166.71 |
| C + RFB Suitable | YES | NO | YES | moderately | expensive | expensive | expensive |

From these studies, it was discovered that a strong dependence of the longevity of the system and its ability to maintain its capacity directly correlated to the nature of the anion and the counter-cation composing the support salt.

These results led to the conclusion that the initial choice of supporting electrolyte was relevant, because of its cost and the good results it provided in a galvanostatic cycling with potential limitation (GCPL) cycling situation. Thus, $TBAPF_6$ is a good "model" electrolyte for $CH_3CN$ in future investigations. It seems also important to underline the remarkable robustness of the redox material that proposed herein. Testing in the H-cell will ensure first-order stability in the evaluation step for suitable RFB systems. Indeed, while lithium batteries are only tested in charge rate at 1° C. *maximum* and show 60% loss in these conditions, the tested compound was charged and discharged at 33 C (i.e., 3.3× faster than the extreme charge rate of current batteries). The results also show that, in static system it maintained its capacity retention beyond 500 cycles in the most harsh and stressful conditions.

Figure 23:
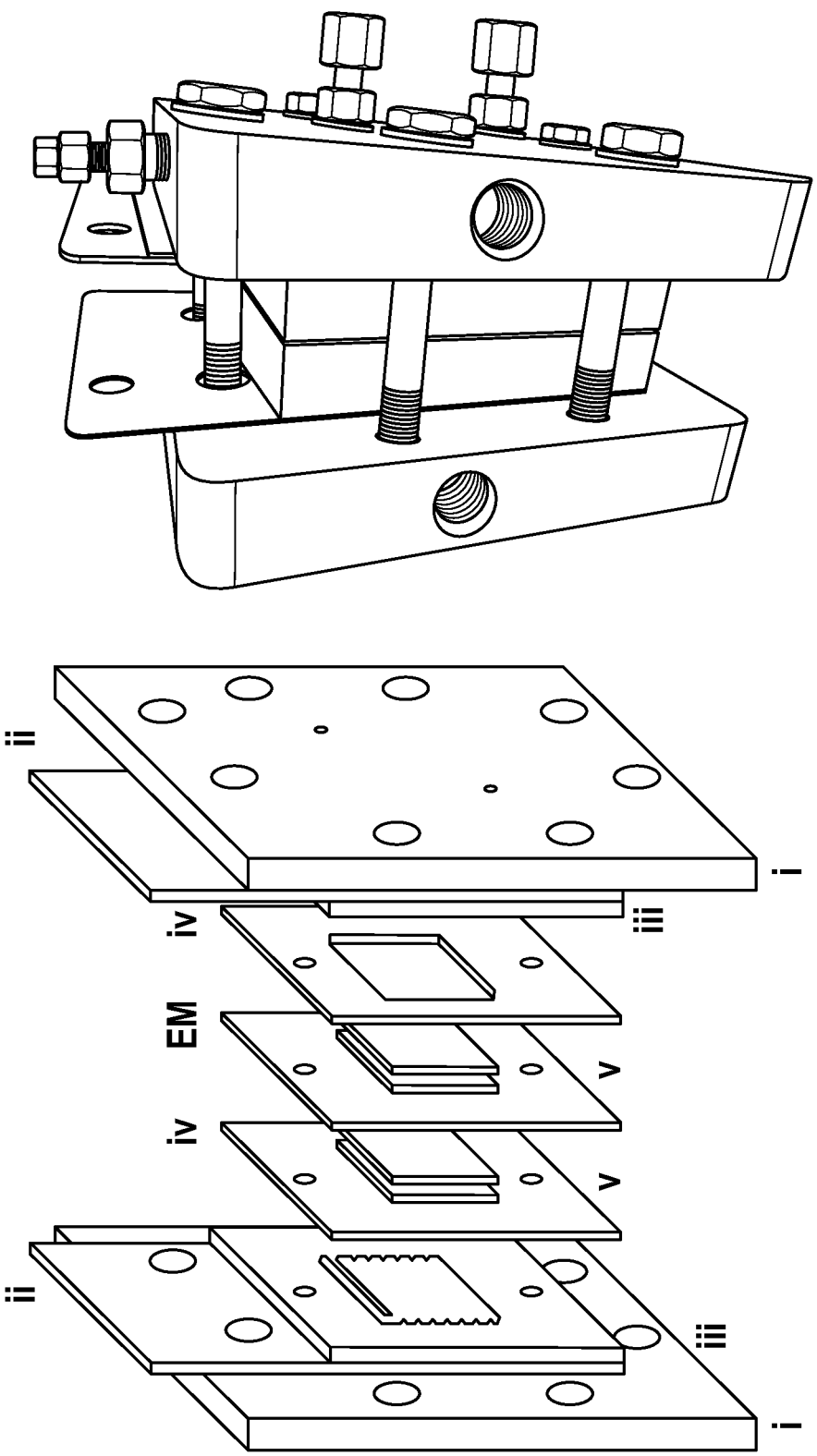
FIG. 23 is a depiction of a redox flow battery prototype.

Example 6. Evaluation of Robustness and Cyclability of the Active Carbocation Electrolytes Depending on the Supporting Electrolyte Salts This example is about the design and construction of a flow redox cell that is robust, scalable, and reliable. An example of a non-aqueous, organic and symmetric RFB is shown in FIG. 23.

The RFB cell is a no-gap architecture sold by Fuel Cell Technologies, Inc., composed of one exchange membrane EM (porous or anionic selective), two metal plates i, two gold-plated current collector ii, two POCO® graphite serpentin bipolar electrode iii, two Teflon gaskets iv and two graphite-felts (Sigracet 29 AA) v with an area of 5 cm². Eight bolts were used to seal the cell. A two channel Cole-Parme Masterflex peristaltic pump, two electrolyte tanks, and some pump tubes completed the RFB assembly.

For the validation of an electrolyte as a redox-active material for electrochemical energy storage in symmetric ONRFB, several points were evaluated:
- various $DMQA^+$ concentrations (which influenced the energy density but also the viscosity and thus the energy transfer efficiency within the cell)
- current density (which affected the charge rate C, the fatigue of the electroactive material and the duration of these studies)
- the nature of the membrane EM, anionic (very expensive, representing 40% of the cost of deployment of a VRFB, however already proven as a separator) or a porous membrane (4 to 10 times cheaper, and made possible by the symmetric nature of this system).

Extensive efforts were dedicated to the standardized cutting (carbon felts, membrane, gaskets), the connection of all the pipes, the calibration of the flow rates, and especially the leak tests of the whole RFB system to guarantee its reliability and the reproducibility of the results. After many adjustments and tweaks, a full assembly RFB system in a dedicated glovebox was constructed.

Figure 24:
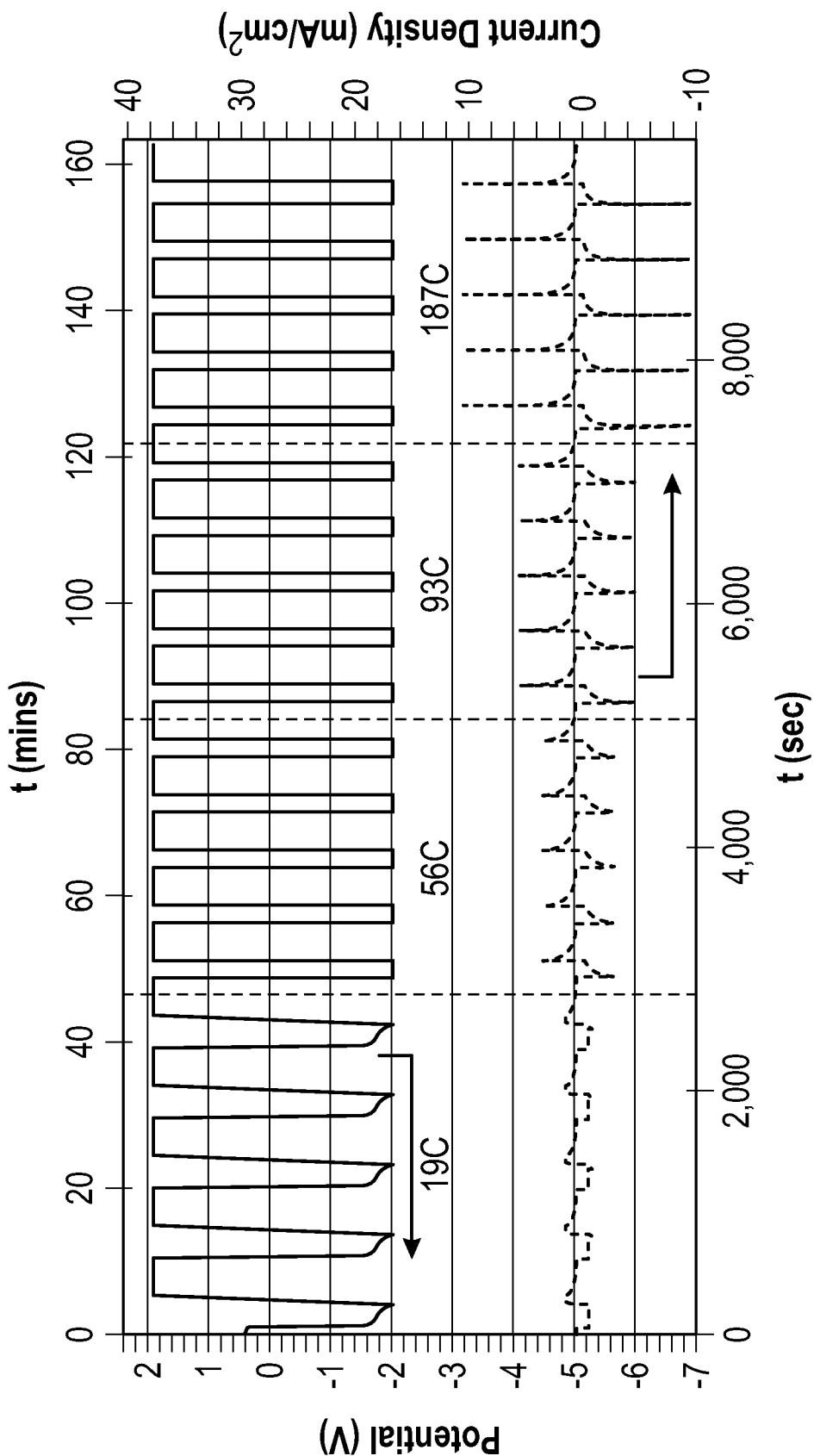
FIG. 24 shows the GCPL CCCV experiment with cycling at 100% SOC for different current densities.

In order to obtain preliminary results, the study was conducted with 10 mL of 1 mM solution of the $C^+$ model in 0.1M $TBAPF_6$ $CH_3CN$ in each tanker, for a flow rate of 10 mL/min$^{-1}$ per tanker. The EM selected for this evaluation was a porous membrane (Daramic HD plus, 175 µm, generously provided by Daramic Inc.). To prove the compatibility of the compounds described herein, "PrDMQA$^+$ was the $C^+$ model used with a "real" RFB application. A galvanostatic cycling with potential limits (GCPL) Constant Current Constant Voltage (CCCV) cycling at 100% state of charge (SOC) for different current density (1, 3, 5 10 mA·cm², 5 cycles for each) was performed to record data in the most stressful conditions (e.g., >10 C), which was expected to provide better results than in "normal" regime (FIG. 24).

The inexpensive porous membrane performed well as a separator as the charge and discharge operated normally, providing evidence of the reliability of the proof-of-concept for SONRFB with a porous separator. This was also true for different working arrangements (including the demented >100 C). At 1 mA·cm², despite the high C rate (19 C), the reduction of $C^+$ into C. around 2.1V is clearly evident, as proof of the electrochemical process (black trace, FIG. 24).

Figure 25:
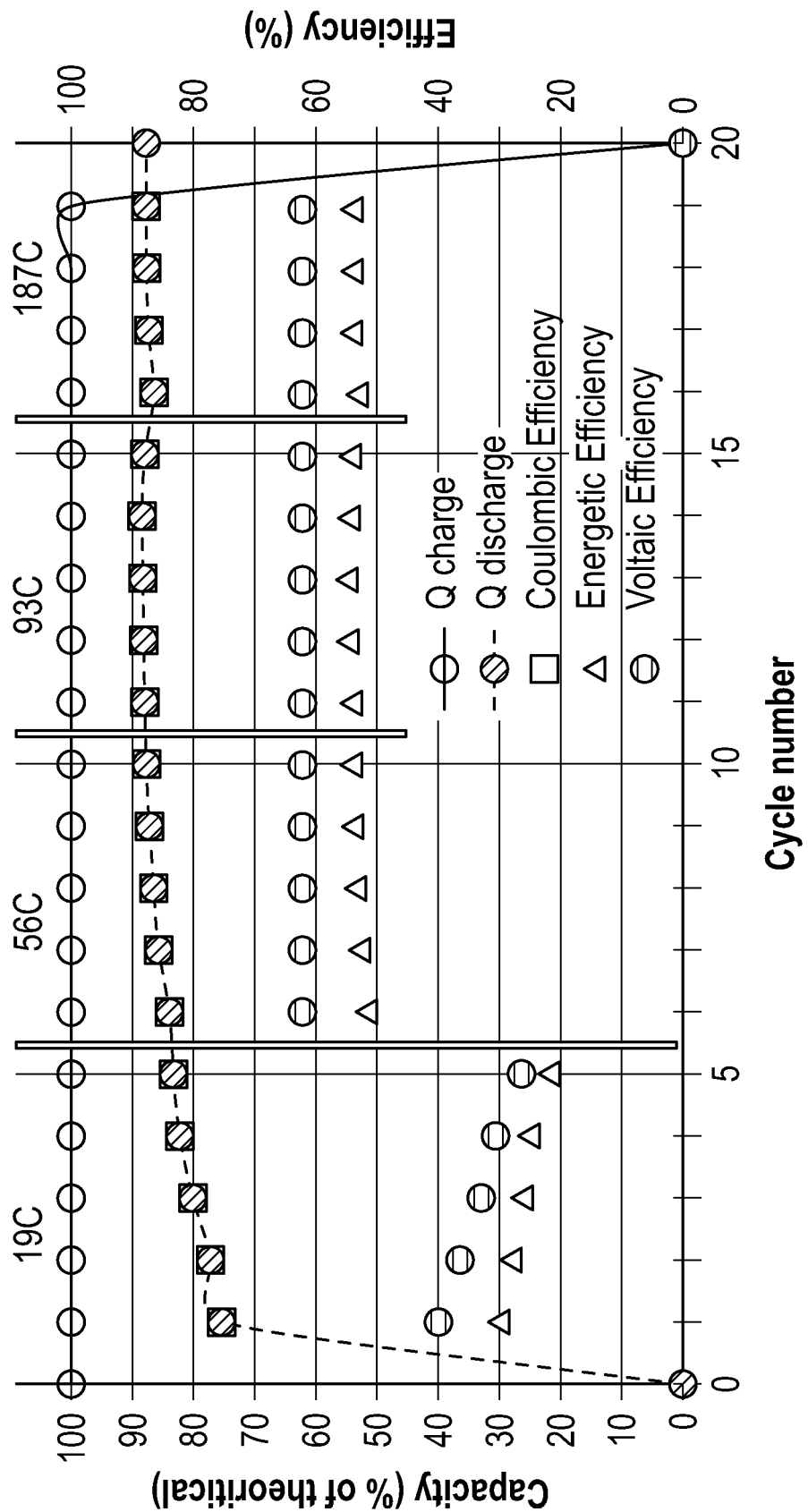
FIG. 25 shows the capacity retention and efficiency result for the RFB model using $^n$PrDMQA$^+$ as the active material.

While the focus is on the capacity retention and efficiency result along the number of cycles, the results were absolutely stunning for a system in its beta version (FIG. 25).

Along the 19 C cycling, which was interpretated as a equilibrium period, there was a slow rise of the discharge capacity (blue trace, classic behavior in RFB) from 75% to 83%. Then, along 56 C, 93 C and 187 C rate of charge, the Q discharge rose to almost 90% with a CE close to 90%. It is noted that if the first 5 balancing cycles were omitted, then the values of EE and VE were good (>50%), and were close to those observed for the same compound in H-Cell, even for C regimes 5.5× higher. This result validated the proposed approach and also highlighted that the H-Cell is a very good test bed system for new compounds before scale-up to a full RFB cell. Further investigations are underway with a max 10 C rate charge, 10× concentration, and a minimum of 200 cycles.

Para. 1. A redox flow battery comprising:
a catholyte comprising a radical dication of a conjugated heterocyclic carbenium compound; and
an anolyte comprising a neutral radical of a conjugated heterocyclic carbenium compound;
wherein the conjugated heterocyclic compounds present in the catholyte and anolyte are the same compound.

Para. 2. A redox flow battery comprising:
a catholyte comprising a radical dication of a compound of Formula I; and
an anolyte comprising a neutral radical of a compound of Formula I;
wherein the compound of Formula (I) is represented by the following structure:

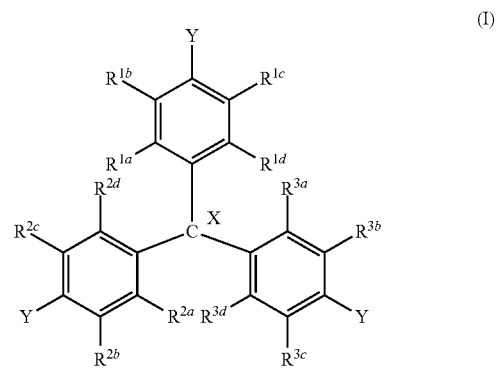

wherein:

X is from −4 to +4;

each of $R^{1a}$, $R^{1b}$, $R^{1c}$, $R^{1d}$, $R^{2a}$, $R^{2b}$, $R^{2c}$, $R^{2d}$, $R^{3a}$, $R^{3b}$, $R^{3c}$, and $R^{3d}$ is independently H, halide, $CF_3$, $NH_2$, $C_1$-$C_{12}$ alkyl, $C_1$-$C_4$ alkoxy, $C_1$-$C_4$ alkylamino, $C_1$-$C_4$ dialkyl amino, $NO_2$, CN, $CO_2R$, or $Ar^1$;

or $R^{2a}$ and $R^{3d}$ together form —$X^1$—;

or $R^{1a}$ and $R^{2d}$ together form —$X^2$—;

or $R^{1d}$ and $R^{3a}$ together form —$X^3$—;

or $R^{1a}$ and $R^{1b}$ together with atoms to which they are attached to form a phenyl;

or $R^{2c}$ and $R^{2d}$ together with atoms to which they are attached to form a phenyl;

each of $X^1$, $X^2$ and $X^3$ is independently O, $NR^{4a}$, $PR^{4a}$, $CR^{4a}R^{4b}$, or $SiR^{4a}R^{4b}$;

each of $R^{4a}$ and $R^{4b}$ is independently H, halide, $CF_3$, $C_1$-$C_{12}$ alkyl, $C_1$-$C_4$ alkoxy, $C_1$-$C_4$ alkylamino, $C_1$-$C_4$ dialkyl amino, $Ar^3$, -L-$Ar^3$, -L-Z, or $L^2$-$Z^2$;

each of Y is independently H, halide, $OR^{5a}$, $NR^{5a}R^{5b}$, $PR^{5a}R^{5b}$, $NO_2$, CN, $CF_3$, $CO_2R$, $N_3$, or $Ar^2$;

each of $R^{5a}$, and $R^{5b}$ is independently H, $CF_3$, $C_1$-$C_{12}$ alkyl, $C_1$-$C_4$ alkoxy, $C_1$-$C_4$ alkylamino, $C_1$-$C_4$ dialkyl amino, $Ar^4$, -$L^1$-$Ar^4$, or -$L^1$-$Z^1$;

each of L and $L^1$ is independently $C_1$-$C_{12}$ alkylene, $C_1$-$C_{12}$ heteroalkylene, or arylene;

each of $L^2$ is independently $C_1$-$C_{12}$ alkylene;

Z and $Z^1$ are each independently a moiety comprising conjugated heterocyclic carbenium;

$Z^2$ is each independently —$(OCH_2CH_2O)_n CH_3$;

n is each independently 1 to 20;

each of R is independently $C_1$-$C_{12}$ alkyl or aryl;

$Ar^1$, $Ar^2$, $Ar^3$, and $Ar^4$ are each independently unsubstituted or substituted phenyl or unsubstituted or substituted heteroaryl; each of $Ar^1$, $Ar^2$, $Ar^3$, and $Ar^4$ is independently substituted with 0 to 5 substituents; the substituents are each independently selected from the group consisting of halide, $CF_3$, $NH_2$, $C_1$-$C_4$ alkyl, $C_1$-$C_4$ alkoxy, $C_1$-$C_4$ alkylamino, $C_1$-$C_4$ dialkyl amino, $NO_2$, CN, or aryl.

Para. 3. The redox flow battery of Para. 2, wherein the compound of Formula I is a compound of Formula Ia, Formula Ib, or Formula Ic:

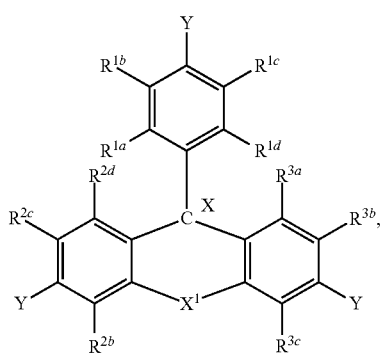

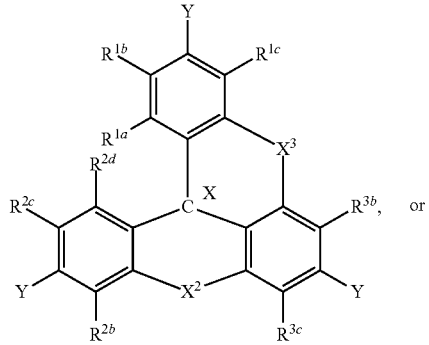

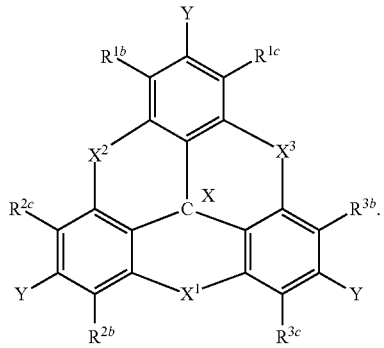

Para. 4. The redox flow battery of Para. 2, wherein each of $X^1$, $X^2$, and $X^3$ is independently O or $NR^{4a}$.

Para. 5. The redox flow battery of Para. 4, wherein each $R^{4a}$ is independently $C_1$-$C_{12}$ alkyl, $C_1$-$C_4$ alkoxy, $C_1$-$C_4$ alkylamino, $C_1$-$C_4$ dialkyl amino, $Ar^3$, -L-$Ar^3$, -L-Z, or -$L^2$-$Z^2$.

Para. 6. The redox flow battery of Para. 5, wherein each $R^{4a}$ is independently methyl, ethyl, propyl, butyl, pentyl, hexyl, —$(CH_2)$—$N(Me)_2$, —$(CH_2)_2$—$N(Me)_2$, —$(CH_2)_3$—$N(Me)_2$, —$(CH_2)_3$—$N(Me)_2$, —$(CH_2)_4$—$N(Me)_2$, —$(CH_2)_2$—$Ar^3$, —$(CH_2)_3$—$Ar^3$, —$(CH_2)_3$—$Ar^3$, or —$(CH_2)_4$—$Ar^3$; and $Ar^3$ is 2-pyridinyl.

Para. 7. The redox flow battery of Para. 5, wherein each $R^{4a}$ is —$(CH_2)$—$(OCH_2CH_2O)_n CH_3$, —$(CH_2)_2$—$(OCH_2CH_2O)_n CH_3$, —$(CH_2)_3$—$(OCH_2CH_2O)_n CH_3$, or —$(CH_2)_4$—$(OCH_2CH_2O)_n CH_3$; and n is 0, 1, 2, 3, 4, 5, 6, 7, 8, 9, 10, 11, 12, 13, 14, 15, 16, 17, 18, 19, or 20.

Para. 8. The redox flow battery of Para. 7, wherein each $R^{4a}$ is —$(CH_2)$—$(OCH_2CH_2O)_n CH_3$, —$(CH_2)_2$—$(OCH_2CH_2O)_n CH_3$, —$(CH_2)_3$—$(OCH_2CH_2O)_n CH_3$, or —$(CH_2)_4$—$(OCH_2CH_2O)_n CH_3$; and n is 1.

Para. 9. The redox flow battery of Para. 2, wherein each of Y is independently H or $NO_2$.

Para. 10. The redox flow battery of Para. 2, wherein $R^{1a}$ and $R^{2d}$ are each $C_1$-$C_4$ alkoxy.

Para. 11. The redox flow battery of Para. 3, wherein the compound of Formula Ib is a compound, wherein:
$X^2$ and $X^3$ are each $NR^{4a}$;
each $R^{4a}$ is independently $C_1$-$C_{12}$ alkyl, $C_1$-$C_4$ dialkyl amino, -L-$Ar^3$, or -$L^2$-$Z^2$;
$R^{1a}$ and $R^{2d}$ are each $C_1$-$C_4$ alkoxy;
each of $R^{1b}$, $R^{1c}$, $R^{2b}$, $R^{2c}$, $R^{3b}$, and $R^{3c}$ is independently H, $C_1$-$C_4$ alkylamino, or $NO_2$;
each of Y is independently H, $NO_2$, or $NR^{5a}R^{5b}$; and
each of $R^{5a}$ and $R^{5b}$ is independently H, $CF_3$, or $C_1$-$C_{12}$ alkyl.

Para. 12. The redox flow battery of Para. 2, wherein the compound of Formula I is a compound of any one of the following:

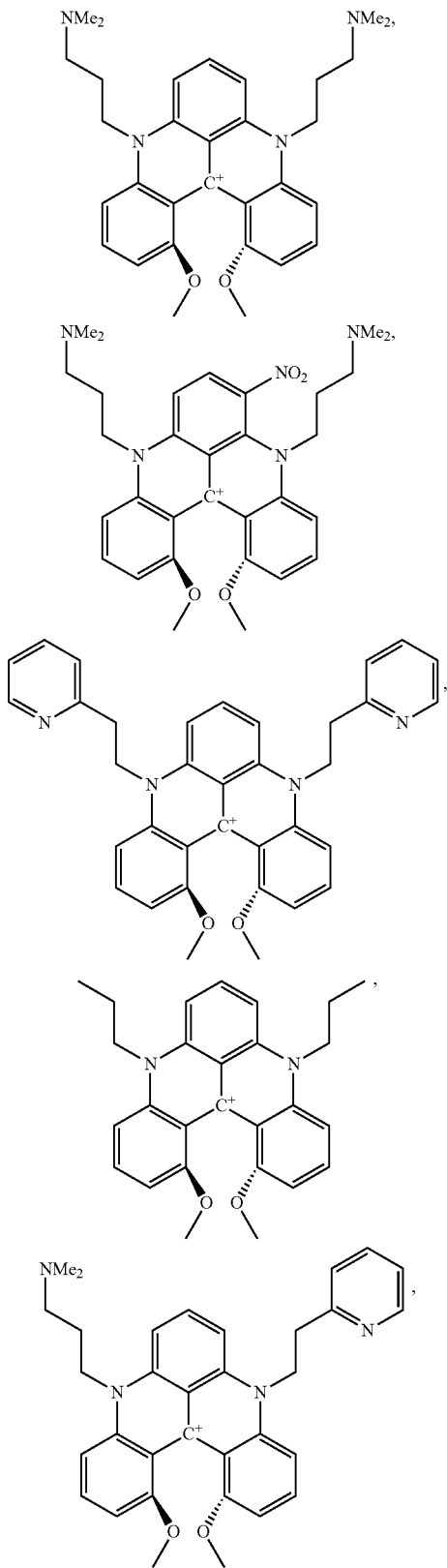

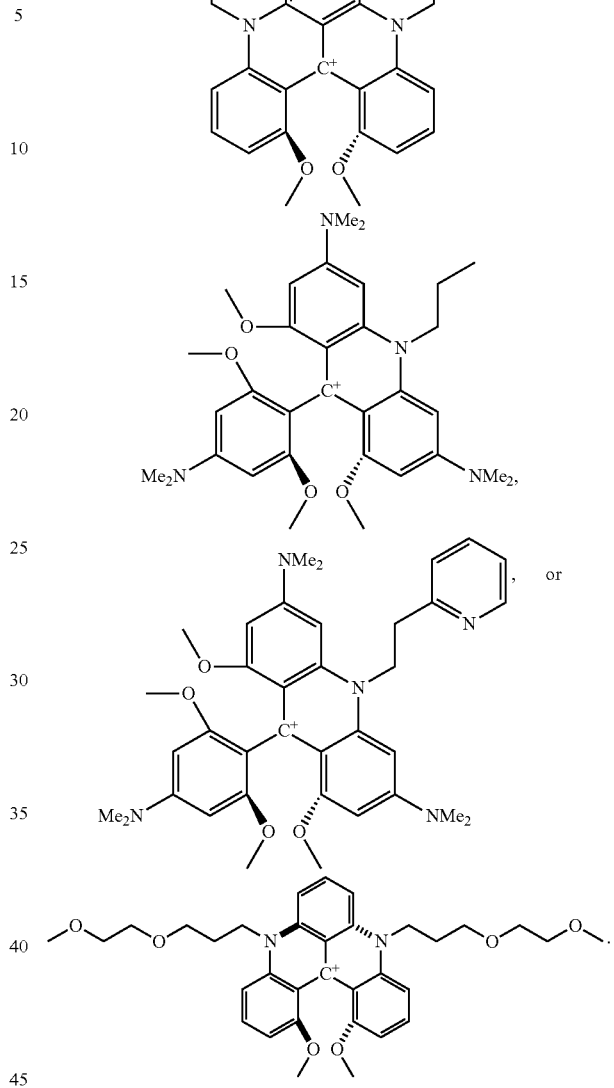

Para. 13. The redox flow battery of Para. 2, wherein the compound of formula I further comprises an anion selected from tetrafluoroborate, hexafluorophosphate, perchlorate, tetrarylborate, trifluoromethanesulfonate, oxalatoborate, oxalate, phosphate, bis-trifluoromethanesulfonimide, halide, anion of an ionic liquid, hydroxide, carbonate, bicarbonate, sulfate, hydrogen sulfate, sulfite; or a mixture of any two or more thereof.

Para. 14. The redox flow battery of Para. 2, further comprising a separator positioned between the anolyte and the catholyte.

Para. 15. The redox flow battery of Para. 14, wherein the separator is a porous membrane.

Para. 16. The redox flow battery of Para. 2, further comprising a solvent and an electrolyte salt.

Para. 17. The redox flow battery of Para. 16, wherein the electrolyte salt is a lithium, sodium, potassium, ammonium, or alkylammonium salt of tetrafluoroborate, hexafluorophosphate, perchlorate, a tetrarylborate, trifluoromethanesulfonate, oxalatoborate, oxalate, phosphate, bis-trifluoromethanesulfonimide, halide; or a mixture of any two or more thereof.

Para. 18. The redox flow battery of Para. 16, wherein the solvent comprises nitrile solvent, an ether solvent, dimethylformamide, water, a halogenated solvent, or an ionic liquid.

Para. 19. The redox flow battery of Para. 1, wherein the compound of Formula I is photoactive.

Para. 20. A method of operating the redox flow battery of Para. 2, the method comprising flowing the catholyte through a catholyte compartment and flowing the anolyte through an anolyte compartment, wherein the catholyte and anolyte compartments are separated by a porous separator and electron transfer from the anolyte to the catholyte is supported.

Para. 21. The method of Para. 20, wherein after electron transfer, the method comprises regenerating the catholyte and/or the anolyte by an external power source.

Para. 22. The method of Para. 21, wherein the regenerating the catholyte comprises regenerating the catholyte via photo-assisted oxidation.

Para. 23. The method of Para. 21, wherein the regenerating the anolyte comprises regenerating the anolyte via photo-assisted reduction.

Para. 24. A redox flow battery comprising:
a catholyte comprising a conjugated heterocyclic cationic compound in a first oxidation state; and
an anolyte comprising a conjugated heterocyclic cationic compound in a second oxidation state;
wherein the first oxidation state is a higher oxidation state than the second oxidation state.

Para. 25. The redox flow battery of Para. 24, wherein conjugated heterocyclic cationic compound in the catholyte and anolyte are each independently a compound of Formula I, wherein the compound of Formula (I) is represented by the following structure:

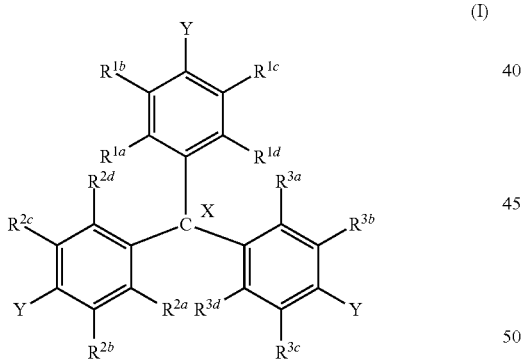

(I)

wherein:
X is from −4 to +4;
each of $R^{1a}$, $R^{1b}$, $R^{1c}$, $R^{1d}$, $R^{2a}$, $R^{2b}$, $R^{2c}$, $R^{2d}$, $R^{3a}$, $R^{3b}$, $R^{3c}$, and $R^{3d}$ is independently H, halide, $CF_3$, $NH_2$, $C_1$-$C_{12}$ alkyl, $C_1$-$C_4$ alkoxy, $C_1$-$C_4$ alkylamino, $C_1$-$C_4$ dialkyl amino, $NO_2$, CN, $CO_2R$, or $Ar^1$;
or $R^{2a}$ and $R^{3d}$ together form —$X^1$—;
or $R^{1a}$ and $R^{2d}$ together form —$X^2$—;
or $R^{1d}$ and $R^{3a}$ together form —$X^3$—;
or $R^{1a}$ and $R^{1b}$ together with atoms to which they are attached to form a phenyl;
or $R^{2c}$ and $R^{2d}$ together with atoms to which they are attached to form a phenyl;
each of $X^1$, $X^2$ and $X^3$ is independently O, $NR^{4a}$, $PR^{4a}$, $CR^{4a}R^{4b}$, or $SiR^{4a}R^{4b}$;

each of $R^{4a}$ and $R^{4b}$ is independently H, halide, $CF_3$, $C_1$-$C_{12}$ alkyl, $C_1$-$C_4$ alkoxy, $C_1$-$C_4$ alkylamino, $C_1$-$C_4$ dialkyl amino, $Ar^3$, -L-$Ar^3$, -L-Z; or -$L^2$-$Z^2$;
each of Y is independently H, halide, $OR^{5a}$, $NR^{5a}R^{5b}$, $PR^{5a}R^{5b}$, $NO_2$, CN, $CF_3$, $CO_2R$, $N_3$, or $Ar^2$;
each of $R^5$, and $R^{5b}$ is independently H, $CF_3$, $C_1$-$C_{12}$ alkyl, $C_1$-$C_4$ alkoxy, $C_1$-$C_4$ alkylamino, $C_1$-$C_4$ dialkyl amino, $Ar^4$, -$L^1$-$Ar^4$, or -$L^1$-$Z^1$;
each of L and $L^1$ is independently $C_1$-$C_{12}$ alkylene, $C_1$-$C_{12}$ heteroalkylene, or arylene;
each of $L^2$ is independently $C_1$-$C_{12}$ alkylene;
Z and $Z^2$ are each independently a moiety comprising conjugated heterocyclic carbenium;
$Z^2$ is each independently —$(OCH_2CH_2O)_n CH_3$;
n is each independently 1 to 20;
each of R is independently $C_1$-$C_{12}$ alkyl or aryl;
$Ar^1$, $Ar^2$, $Ar^3$, and $Ar^4$ are each independently unsubstituted or substituted phenyl or unsubstituted or substituted heteroaryl; each of $Ar^1$, $Ar^2$, $Ar^3$, and $Ar^4$ is independently substituted with 0 to 5 substituents; the substituents are each independently selected from the group consisting of halide, $CF_3$, $NH_2$, $C_1$-$C_4$ alkyl, $C_1$-$C_4$ alkoxy, $C_1$-$C_4$ alkylamino, $C_1$-$C_4$ dialkyl amino, $NO_2$, CN, or aryl.

Para. 26. The redox flow battery of Para. 25, wherein each compound of Formula I is independently a compound of Formula Ia, Formula Ib, or Formula Ic:

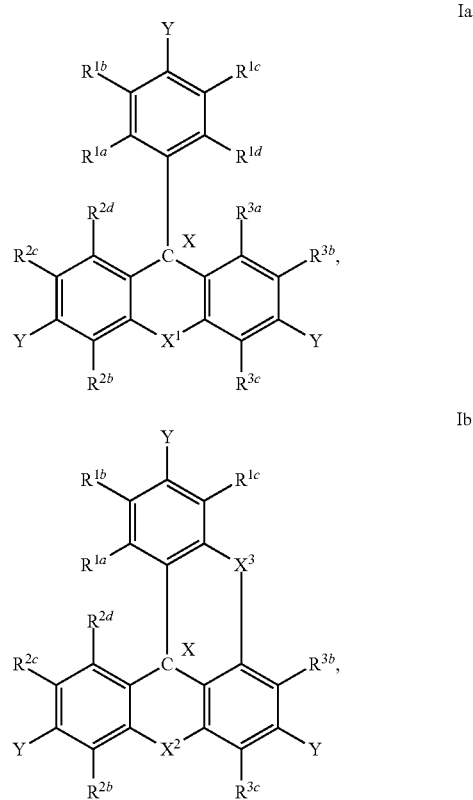

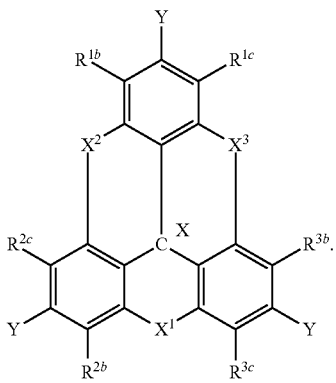

Ic

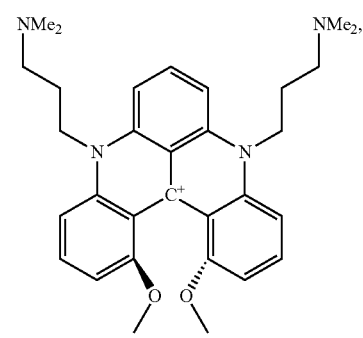

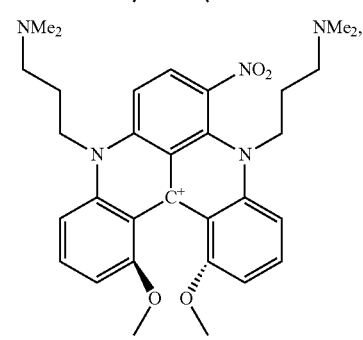

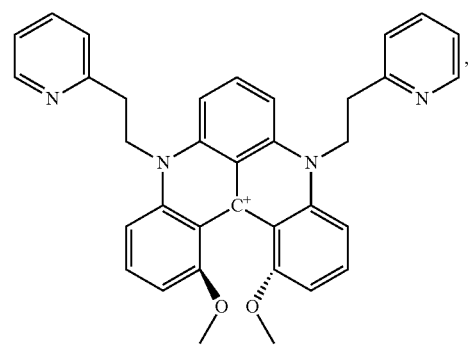

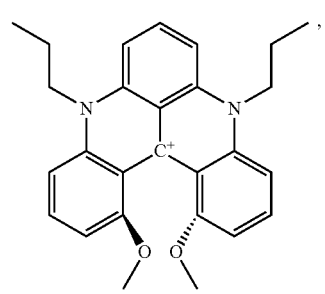

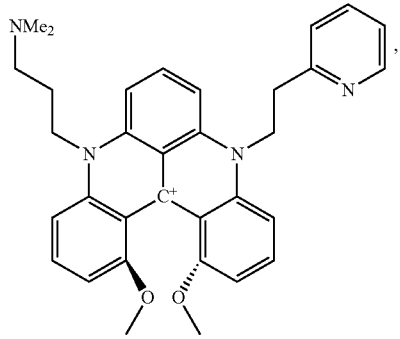

Para. 27. The redox flow battery of Para. 25, wherein each of $X^1$, $X^2$, and $X^3$ is independently O or $NR^{4a}$.

Para. 28. The redox flow battery of Para. 27, wherein each $R^{4a}$ is independently $C_1$-$C_{12}$ alkyl, $C_1$-$C_4$ alkoxy, $C_1$-$C_4$ alkylamino, $C_1$-$C_4$ dialkyl amino, $Ar^3$, -L-$Ar^3$, -L-Z, or -$L^2$-$Z^2$.

Para. 29. The redox flow battery of Para. 28, wherein each $R^{4a}$ is independently methyl, ethyl, propyl, butyl, pentyl, hexyl, —($CH_2$)—$N(Me)_2$, —($CH_2$)$_2$—$N(Me)_2$, —($CH_2$)$_3$—$N(Me)_2$, —($CH_2$)$_3$—$N(Me)_2$, —($CH_2$)$_4$—$N(Me)_2$, —($CH_2$)$_2$—$Ar^3$, —($CH_2$)$_3$—$Ar^3$, —($CH_2$)$_3$—$Ar^3$, or —($CH_2$)$_4$—$Ar^3$; and $Ar^3$ is 2-pyridinyl.

Para. 30. The redox flow battery of Para. 28, wherein each $R^{4a}$ is —($CH_2$)—($OCH_2CH_2O$)$_n$$CH_3$, —($CH_2$)$_2$—($OCH_2CH_2O$)$_n$$CH_3$, —($CH_2$)$_3$—($OCH_2CH_2O$)$_n$$CH_3$, or —($CH_2$)$_4$—($OCH_2CH_2O$)$_n$$CH_3$; and n is 0, 1, 2, 3, 4, 5, 6, 7, 8, 9, 10, 11, 12, 13, 14, 15, 16, 17, 18, 19, or 20.

Para. 31. The redox flow battery of Para. 30, wherein each $R^{4a}$ is —($CH_2$)—($OCH_2CH_2O$)$_n$$CH_3$, —($CH_2$)$_2$—($OCH_2CH_2O$)$_n$$CH_3$, —($CH_2$)$_3$—($OCH_2CH_2O$)$_n$$CH_3$, or —($CH_2$)$_4$—($OCH_2CH_2O$)$_n$$CH_3$; and n is 1.

Para. 32. The redox flow battery of Para. 25, wherein each of Y is independently H or $NO_2$.

Para. 33. The redox flow battery of Para. 25, wherein $R^{1a}$ and $R^{2d}$ are each $C_1$-$C_4$ alkoxy.

Para. 34. The redox flow battery of Para. 26, wherein each compound of Formula Ib is independently a compound, wherein:

$X^2$ and $X^3$ are each $NR^{4a}$;

each $R^{4a}$ is independently $C_1$-$C_{12}$ alkyl, $C_1$-$C_4$ dialkyl amino, -L-$Ar^3$, or -$L^2$-$Z^2$;

$R^{1a}$ and $R^{2d}$ are each $C_1$-$C_4$ alkoxy;

each of $R^{1b}$, $R^{1c}$, $R^{2b}$, $R^{2c}$, $R^{3b}$, and $R^{3c}$ is independently H, $C_1$-$C_4$ alkylamino, or $NO_2$;

each of Y is independently H, $NO_2$, $NR^{5a}R^{5b}$; and each of $R^{5a}$ and $R^{5b}$ is independently H, $CF_3$, $C_1$-$C_{12}$ alkyl.

Para. 35. The redox flow battery of Para. 25, wherein each compound of Formula I is independently a compound of any one of the following:

-continued

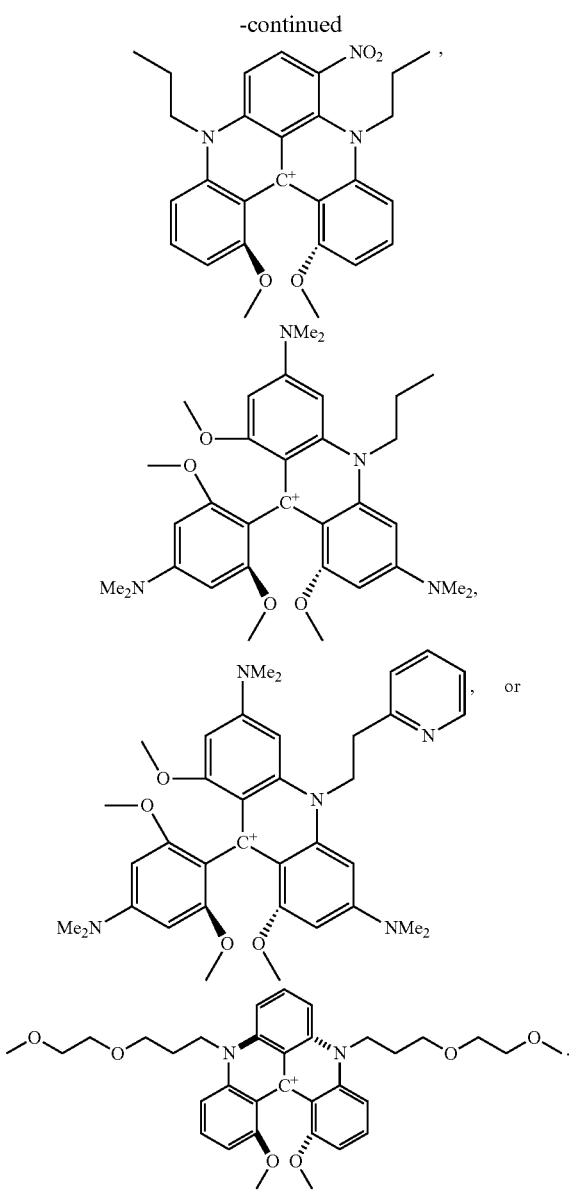

Para. 36. The redox flow battery of Para. 24, wherein each conjugated heterocyclic cationic compound independently further comprises an anion selected from tetrafluoroborate, hexafluorophosphate, perchlorate, a tetrarylborate, trifluoromethanesulfonate, oxalatoborate, oxalate, phosphate, bis-trifluoromethanesulfonimide, halide, anion of an ionic liquid, hydroxide, carbonate, bicarbonate, sulfate, hydrogen sulfate, sulfite; or a mixture of any two or more thereof.

Para. 37. The redox flow battery of Para. 24, further comprising a separator positioned between the anolyte and the catholyte.

Para. 38. The redox flow battery of Para. 37, wherein the separator is a porous membrane.

Para. 39. The redox flow battery of Para. 24, further comprising a solvent and an electrolyte salt.

Para. 40. The redox flow battery of Para. 39, wherein the electrolyte salt is a lithium, sodium, potassium, ammonium, or alkylammonium salt of tetrafluoroborate, hexafluorophosphate, perchlorate, tetrarylborate, trifluoromethanesulfonate, oxalatoborate, oxalate, phosphate, bis-trifluoromethanesulfonimide, halide; or a mixture of any two or more thereof.

Para. 41. The redox flow battery of Para. 39, wherein the solvent comprises nitrile solvent, an ether solvent, dimethylformamide, water, a halogenated solvent, or an ionic liquid.

Para. 42. The redox flow battery of Para. 24, wherein conjugated heterocyclic cationic compound is independently photoactive.

Para. 43. The redox flow battery of Para. 24, wherein the redox flow battery has an open circuit potential of greater than about 1V, 1.5 V, or 2 V.

Para. 44. A method of operating the redox flow battery of Para. 24, the method comprising flowing the catholyte through a catholyte compartment and flowing the anolyte through an anolyte compartment, wherein the catholyte and anolyte compartments are separated by a porous separator and electron transfer from the anolyte to the catholyte is supported.

Para. 45. The method of Para. 44, wherein after electron transfer, the method comprises regenerating the catholyte and/or the anolyte by an external power source.

Para. 46. The method of Para. 45, wherein the regenerating the catholyte comprises regenerating the catholyte via photo-assisted oxidation.

Para. 47. The method of Para. 45, wherein the regenerating the anolyte comprises regenerating the anolyte via photo-assisted reduction.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

CITED REFERENCES

[1](a) Buchachenko, A., Turton, C. and Turton, T. (1965). *Stable radicals*. New York: Consultants Bureau; Selected reviews: (b) Takashi Kubo *Molecules* 2019, 24, 665; (c) K. Kato, A. Osuka *Angew. Chem. Int. Ed.*, 2019, 58, 8978-8986; (d) Y. Shen, C.-F. Chen, *Chem. Rev.* 2012, 112, 1463-1535.

[2](a) Stable Radicals: Fundamental and Applied Aspects of Odd-electron Compounds; Hicks, R., Ed.; Wiley-Blackwell: New York, 2010; 1-606; Selected reviews: (b) I. Ratera and J. Veciana, *Chem. Soc. Rev.*, 2012, 41, 303-349; (c) T. Sugawara, H. Komatsua and K. Suzuki, *Chem. Soc. Rev.*, 2011, 40, 3105-3118; (d) Hicks, R. G. *Org. Biomol. Chem.* 2007, 5, 1321; (e) Rawson, J. M.; Alberola, A.; Whalley, A. *J. Mater. Chem.* 2006, 16, 2560-2575; (f) Rajca, A. *Chem. Rev.* 1994, 94, 871-893.

[3] Selected reviews: (a) K. U. Ingold, D. A. Pratt, *Chem. Rev.* 2014, 114, 9022-9046; (b) Q. Cao, L. M. Doman, L. Rogan, N. L. Hughes, M. J. Muldoon, *Chem. Commun.* 2014, 50, 4524-4543; (c) G. Moad, E. Rizzardo, S. H. Thang, *Polymer* 2008, 49, 1079-1131; (d) W. A. Braunecker, K. Matyjaszewski, *Prog. Polym. Sci.* 2007, 32, 93-146; (e) K. Matyjaszewski, J. Xia, *Chem. Rev.* 2001, 101, 2921-2990.

[4](a) T. Kusamoto, H. Nishihara, *Nature* 2018, 563, 480-481; (b) A. Obolda, X. Ai, M. Zhang, F. Li, *ACS Appl. Mater. Interfaces* 2016, 8, 35472-35478; (c) Q. Peng, A. Obolda, M. Zhang, F. Li, *Angew. Chem. Int. Ed.* 2015, 54, 7091-7095; (d) Y. Hattori, T. Kusamoto, H. Nishihara, *Angew. Chem. Int. Ed.* 2014, 53, 11845-11848.

[5] M. Gomberg, *J. Am. Chem. Soc.* 1900, 22, 757-771.

[6](a) M. Ballester, *Acc. Chem. Res.* 1985, 18, 380-387; (b) M. Ballester, J. Riera, J. Castaner, C. Badfa, J. M. Monso, *J. Am. Chem. Soc.* 1971, 93, 2215-2225.

[7] Selected examples: (a) C. Janiak, R. Weimann, F. Gerlitz, *Organometallics* 1997, 16, 4933-4936; (b) H. Sitzmann, H. Bock, R. Boese, T. Dezember, Z. Havlas, W. Kaim, M. Moscherosch, L. Zanathy, *J. Am. Chem. Soc.* 1993, 115, 12003-12009; (c) H. Sitzmann, R. Boese, *Angew. Chem. Int. Ed.* 1991, 30, 971-973.

[8] Selected examples. (a) H. Kalita, T. Y. Gopalakrischna, J. Wu, *Org. Lett.* 2018, 20, 445-448; (b) S. Qiu, Y. Zhang, X. Huang, L. Bao, Y. Hong, Z. Zeng, J. Wu, *Org. Lett.* 2016, 18, 6018-6021; (c) Y. Tian, K. Uchida, H. Kurata, Y. Hirao, T. Nishiuchi, T. Kubo, *J. Am. Chem. Soc.* 2014, 136, 12784-12793; (d) Z. Zeng, Y. M. Sung, N. Bao, D. Tan, R. Lee, J. L. Zafra, B. S. Lee, M. Ishida, J. Ding, J. T. Llpez Navarrete, Y. Li, W. Zeng, D. Kim, K.-W. Huang, R. D. Webster, J. Casado, J. Wu, *J. Am. Chem. Soc.* 2012, 134, 14513-14525.

[9] T. Nishiuchi, S. Aibara, T. Kubo, *Angew. Chem. Int. Ed.* 2018, 57, 16516-16519.

[10] Selected examples: (a) R. Zhang, J. P. Peterson, L. J. Fischer, A. Ellern, A. H. Winter, *J. Am. Chem. Soc.* 2018, 140, 14308-14313. (b) K. Okino, S. Hira, Y. Inoue, D. Sakamaki, S. Seki, *Angew. Chem. Int. Ed.* 2017, 56, 16597-16601. (c) J. P. Peterson, M. R. Geraskina, R. Zhang, A. H. Winter, *J. Org. Chem.* 2017, 82, 6497-6501; (d) T. Kobashi, D. Sakamaki, S. Seki, *Angew. Chem. Int. Ed.* 2016, 55, 8634-8638.

[11] Selected examples: (a) B. Liu, T. Yoshida, X. Li, M. Ste,pien', H. Shinokubo, P. J. Chmielewski, *Angew. Chem. Int. Ed.* 2016, 55, 13142-3146; (b) P. Schweyen, K. Brandhorst, R. Wicht, B. Wolfram, M. Brering, *Angew. Chem. Int. Ed.* 2015, 54, 8213-8216.

[12] Selected examples: (a) T. Kushida, S. Shirai, N. Ando, T. Okamoto, H. Ishii, H. Matsui, M. Yamagishi, T. Uemura, J. Tsurumi, S. Watanabe, J. Takeya, S. Yamaguchi, *J. Am. Chem. Soc.* 2017, 139, 4336-14339; (b) T. Kubo, Y. Katada, A. Shimizu, Y. Hirao, K. Sato, T. Takui, M. Uruichi, K. Yakushi, R. C. Haddon, *J. Am. Chem. Soc.* 2011, 133, 14240-14243; (c) Y. Morita, S. Nishida, T. Murata, M. Moriguchi, A. Ueda, M. Satoh, K. Arifuku, K. Sato, T. Takui, *Nat. Mater.* 2011, 10, 947-951.

[13](a) R. Naaman, Y. Paltiel, D. H. Waldeck, *Nat. Rev. Chem.* 2019, 3, 250-260; (b) V. Kiran, S. P. Mathew, S. R. Cohen, I. Hernandez Delgado, J. Lacour, R. Naaman, *Adv. Mater.* 2016, 28, 1957-1962.

[14](a) S. Shil, D. Bhattacharya, A. Misra, D. J. Klein, *Phys. Chem. Chem. Phys.* 2015, 17, 23378-23383; (b) C. Herrmann, G. C. Solomon, M. A. Ratner, *J. Am. Chem. Soc.* 2010, 132, 3682-3684.

[15] Selected examples: (a) K. Kato, K. Furukawa, T. Mori, A. Osuka *Chem. —Eur. J.* 2018, 24, 572-575; (b) P. Ravat, P. Ribar, M. Rickhaus, D. Hässinger, M. Neuburger, M. Juriček *J. Org. Chem.* 2016, 81, 12303-12317; (c) Y. Wang, H. Zhang, M. Pink, A. Olankitwanit, S. Rajca, A. Rajca, *J. Am. Chem. Soc.* 2016, 138, 7298-7304; (d) P. Ravat, T. Šolomek, M. Rickhaus, D. Häussinger, M. Neuburger, M. Baumgarten, M. Juriček, M. Cethrene *Angew. Chem. Int. Ed.* 2016, 55, 1183-1186. (e) J. Liu, P. Ravat, M. Wagner, M. Baumgarten, X. Feng, K. Millen *Angew. Chem. Int. Ed.* 2015, 54, 12442-12446; (f) J. K. Zak, M. Miyasaka, S. Rajca, M. Lapkowski, A. Rajca *J. Am. Chem. Soc.* 2010, 132, 3246-3247.

[16] O. Neunhoffer and H. Haase, *Chem. Ber.* 1958, 91, 1801.

[17](a) D. Hellwinkel, M. Melan, G. Aulmich, *Tetrahedron Lett.* 1976, 17, 4137-4138; (b) Neugebauer, D. Hellwinkel, G. Aulmich, *Tetrahedron Lett.* 1978, 19, 4871-4874.

[18] Sorensen, T. J.; Nielsen, M. F.; Laursen, B. W. *ChemPlusChem* 2014, 79, 1030-1035.

[19] A. Ueda, H. Wasa, S. Suzuki, K. Okada, K. Sato, T. Takui, Y. Morita *Angew. Chem. Int. Ed.* 2012, 51, 6691-6695.

[20] K. Kato, W. Cha, J. Oh, K. Furukawa, H. Yorimitsu, D. Kim, A. Osuka *Angew. Chem. Int. Ed.* 2016, 55, 8711-8714.

[21] J. C. Martin and R. G. Smith, *J. Am. Chem. Soc.* 1964, 86, 2252-2256

[22] L. Mei, J. M. Veleta, J. Bloch, H. J. Goodman, D. Pierce-Navarro, A. Villalobos, T. L. Gianetti, *Dalton Trans.* 2020, doi.org/10.1039/D0DT00419G.

[23] See supporting information.

[24] S. Pascal, C. Besnard, F. Zinna, L. D. Bari, B. L. Guennic, D. Jacquemin, J. Lacour *Org. Biomol. Chem.* 2016, 14, 4590-4594; (b) I. Hernandez Delgado, S. Pascal, A. Wallabregue, R. Duwald, C. Besnard, L. Guénée, C. Nangoz, E. Vauthey, R. C. Tovar, J. L. Lunkley, G. Muller, J. Lacour *Chem. Sci.* 2016, 7, 4685-4693; (c) O. Kel, A. Frstenberg, N. Mehanna, C. Nicolas, B. Laleu, M. Hammarson, B. Albinsson, J. Lacour, E. Vauthey, *Chem. Eur. J.* 2013, 19, 7173-7180; (d) O. Kel, P. Sherin, N. Mehanna, B. Laleu, J. Lacour, E. Vauthey, *Photochem. Photobiol. Sci.* 2012, 11, 623-631.

[25] M. J. Sabacky, C. S. Johnson, Jr., R. G. Smith, H. S. Gutowsky, J. C. Martin, *J. Am. Chem. Soc.* 1967, 89, 2054-2058.

[26] D. Shimizu, A. Osuka, *Chem. Sci.* 2018, 9, 1408-1423.

[27] (a) M. Frenette, C. Aliaga, E. Font-Sanchis, J. C. Scaiano, *Org. Lett.* 2004, 6, 2579-2582; (b) E. Font-Sanchis, C. Aliaga, K.-S. Focsaneanu, J. C. Scaiano, *Chem. Commun.* 2002, 1576-1577; (c) E. V. Bejan, E. Font-Sanchis, J. C. Scaiano, *Org. Lett.* 2001, 3, 4059-4062; (d) C. Harnack, W. Krull, M. Leehnig, W. P. Neumann, A. K. Zarkadis, *J. Chem. Soc. Perkin Trans.* 1, 1994, 1247-1252; (e) H. D. Hartzler, *J. Org. Chem.* 1966, 31, 2654-2658.

[28] K. Gong, Q. Fang, S. Gu, S. F. Y. Li and Y. Yan, *Energy Environ. Sci.,* 2015, 8, 3515-3530.

[29] R. A. Potash, J. R. McKone, S. Conte and H. D. Abruna, *J. Electrochem. Soc.,* 2016, 163, A338-A344.

[30] H. Chen, Z. Niu, J. Ye, C. Zhang, X. Zhang and Y. Zhao, *ACS Appl. Energy Mater.*, 2020, acsaem.0c02733.

[31] J. Chai, A. Lashgari, Z. Cao, C. K. Williams, X. Wang, J. Dong and J. "Jimmy" Jiang, *ACS Appl. Mater. Interfaces,* 2020, 12, 15262-15270.

[32] M. Li, J. Case and S. D. Minteer, *ChemElectroChem,* 2021, 8, 1215-1232.

What is claimed is:

1. A redox flow battery comprising:
   a catholyte comprising a radical dication of a compound of Formula I; and
   an anolyte comprising a neutral radical of a compound of Formula I;
   wherein the compound of Formula (I) is represented by the following structure:

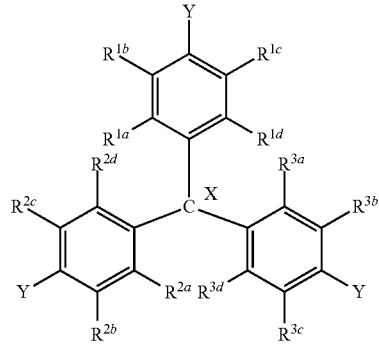

(I)

wherein:

X is from −4 to +4;

each of $R^{1a}$, $R^{1b}$, $R^{1c}$, $R^{1d}$, $R^{2a}$, $R^{2b}$, $R^{2c}$, $R^{2d}$, $R^{3a}$, $R^{3b}$, $R^{3c}$, and $R^{3d}$ is independently H, halide, $CF_3$, $NH_2$, $C_1$-$C_2$ alkyl, $C_1$-$C_4$ alkoxy, $C_1$-$C_4$ alkylamino, $C_1$-$C_4$ dialkyl amino, $NO_2$, CN, $CO_2R$, or $Ar^1$;

or $R^{2a}$ and $R^{3d}$ together form —$X^1$—;

or $R^{1a}$ and $R^{2d}$ together form —$X^2$—;

or $R^{1d}$ and $R^{3a}$ together form —$X^3$—;

or $R^{1a}$ and $R^{1b}$ together with atoms to which they are attached to form a phenyl;

or $R^{2c}$ and $R^{2d}$ together with atoms to which they are attached to form a phenyl;

each of $X^1$, $X^2$ and $X^3$ is independently O, $NR^{4a}$, $PR^{4a}$, $CR^{4a}R^{4b}$, or $SiR^{4a}R^{4b}$;

each of $R^{4a}$ and $R^{4b}$ is independently H, halide, $CF_3$, $C_1$-$C_{12}$ alkyl, $C_1$-$C_4$ alkoxy, $C_1$-$C_4$ alkylamino, $C_1$-$C_4$ dialkyl amino, $Ar^3$, -L-$Ar^3$, -L-Z, or -$L^2$-$Z^2$;

each of Y is independently H, halide, $OR^{5a}$, $NR^{5a}R^{5b}$, $PR^{5a}R^{5b}$, $NO_2$, CN, $CF_3$, $CO_2R$, $N_3$, or $Ar^2$;

each of $R^{5a}$, and $R^{5b}$ is independently H, $CF_3$, $C_1$-$C_{12}$ alkyl, $C_1$-$C_4$ alkoxy, $C_1$-$C_4$ alkylamino, $C_1$-$C_4$ dialkyl amino, $Ar^4$, -$L^1$-$Ar^4$, or -$L^1$-$Z^1$;

each of L and $L^1$ is independently $C_1$-$C_{12}$ alkylene, $C_1$-$C_{12}$ heteroalkylene, or arylene;

each of $L^2$ is independently $C_1$-$C_{12}$ alkylene;

Z and $Z^1$ are each independently a moiety comprising conjugated heterocyclic carbenium;

$Z^2$ is each independently —(OCH$_2$CH$_2$O)$_n$CH$_3$;

n is each independently 1 to 20;

each of R is independently $C_1$-$C_{12}$ alkyl or aryl;

$Ar^1$, $Ar^2$, $Ar^3$, and $Ar^4$ are each independently unsubstituted or substituted phenyl or unsubstituted or substituted heteroaryl; each of $Ar^1$, $Ar^2$, $Ar^3$, and $Ar^4$ is independently substituted with 0 to 5 substituents; the substituents are each independently selected from the group consisting of halide, $CF_3$, $NH_2$, $C_1$-$C_4$ alkyl, $C_1$-$C_4$ alkoxy, $C_1$-$C_4$ alkylamino, $C_1$-$C_4$ dialkyl amino, $NO_2$, CN, or aryl.

2. The redox flow battery of claim 1, wherein the compound of Formula I is a compound of Formula Ia, Formula Ib, or Formula Ic:

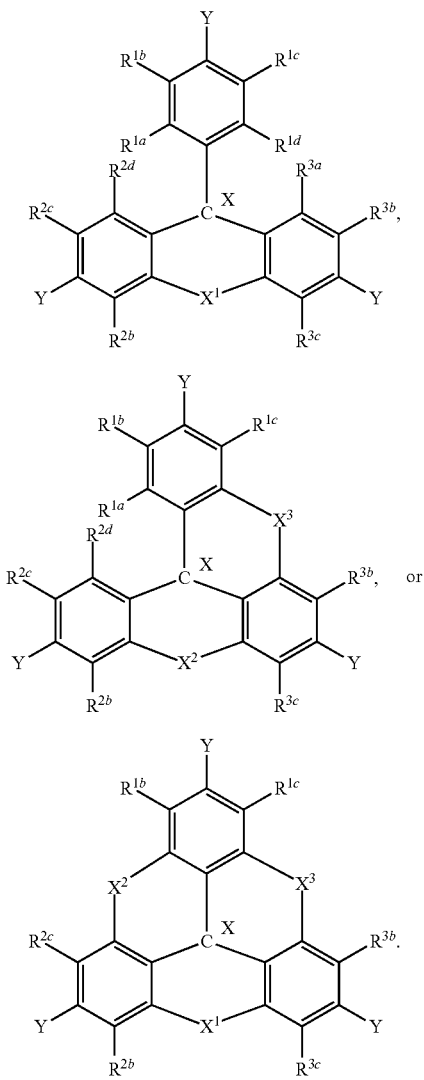

3. The redox flow battery of claim 1, wherein each of $X^1$, $X^2$, and $X^3$ is independently O or $NR^{4a}$.

4. The redox flow battery of claim 3, wherein each $R^{4a}$ is independently $C_1$-$C_{12}$ alkyl, $C_1$-$C_4$ alkoxy, $C_1$-$C_4$ alkylamino, $C_1$-$C_4$ dialkyl amino, $Ar^3$, -L-$Ar^3$, -L-Z, or -$L^2$-$Z^2$.

5. The redox flow battery of claim 3, wherein each $R^{4a}$ is independently methyl, ethyl, propyl, butyl, pentyl, hexyl, —$(CH_2)$—$N(Me)_2$, —$(CH_2)_2$—$N(Me)_2$, —$(CH_2)_3$—$N(Me)_2$, —$(CH_2)_3$—$N(Me)_2$, —$(CH_2)_4$—$N(Me)_2$, —$(CH_2)_2$—$Ar^3$, —$(CH_2)_3$—$Ar^3$, —$(CH_2)_3$—$Ar^3$, —$(CH_2)_4$—$Ar^3$, —$(CH_2)$—$(OCH_2CH_2O)CH_3$, —$(CH_2)_2$—$(OCH_2CH_2O)CH_3$, —$(CH_2)_3$—$(OCH_2CH_2O)CH_3$, or —$(CH_2)_4$—$(OCH_2CH_2O)CH_3$; $Ar^3$ is 2-pyridinyl.

6. The redox flow battery of claim 2, wherein the compound of Formula Ib is a compound, wherein:
$X^2$ and $X^3$ are each $NR^{4a}$;
each $R^{4a}$ is independently $C_1$-$C_{12}$ alkyl, $C_1$-$C_4$ dialkyl amino, -L-$Ar^3$, or -$L^2$-$Z^2$;
$R^{1a}$ and $R^{2d}$ are each $C_1$-$C_4$ alkoxy;
each of $R^{1b}$, $R^{1c}$, $R^{2b}$, $R^{2c}$, $R^{3b}$, and $R^{3c}$ is independently H, $C_1$-$C_4$ alkylamino, or $NO_2$;
each of Y is independently H, $NO_2$, or $NR^{5a}R^{5b}$; and
each of $R^{5a}$ and $R^{5b}$ is independently H, $CF_3$, or $C_1$-$C_{12}$ alkyl..

7. The redox flow battery of claim 1, wherein the compound of Formula I is a compound of any one of the following:

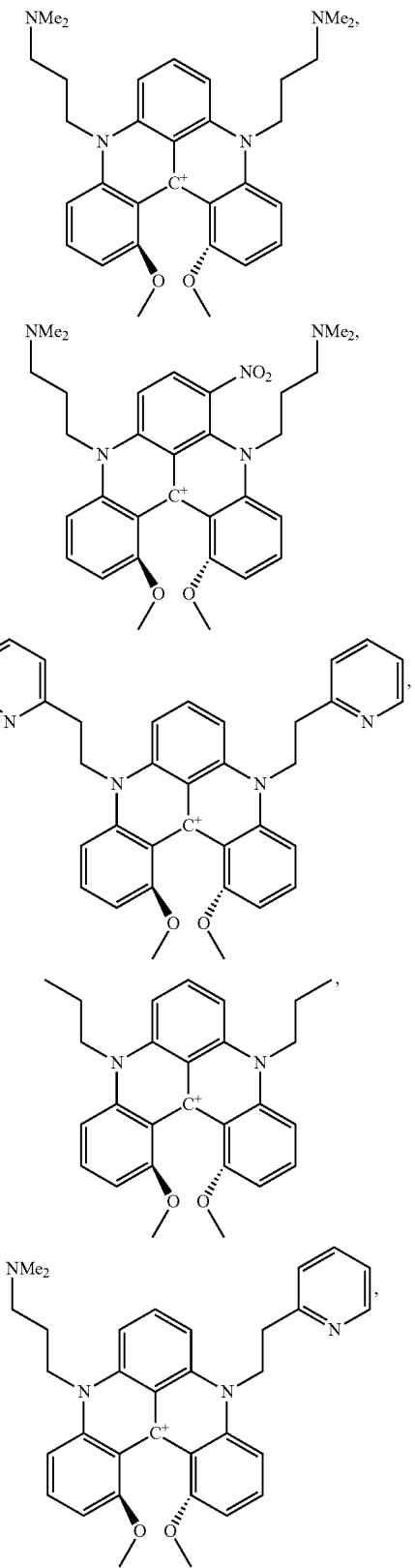

-continued

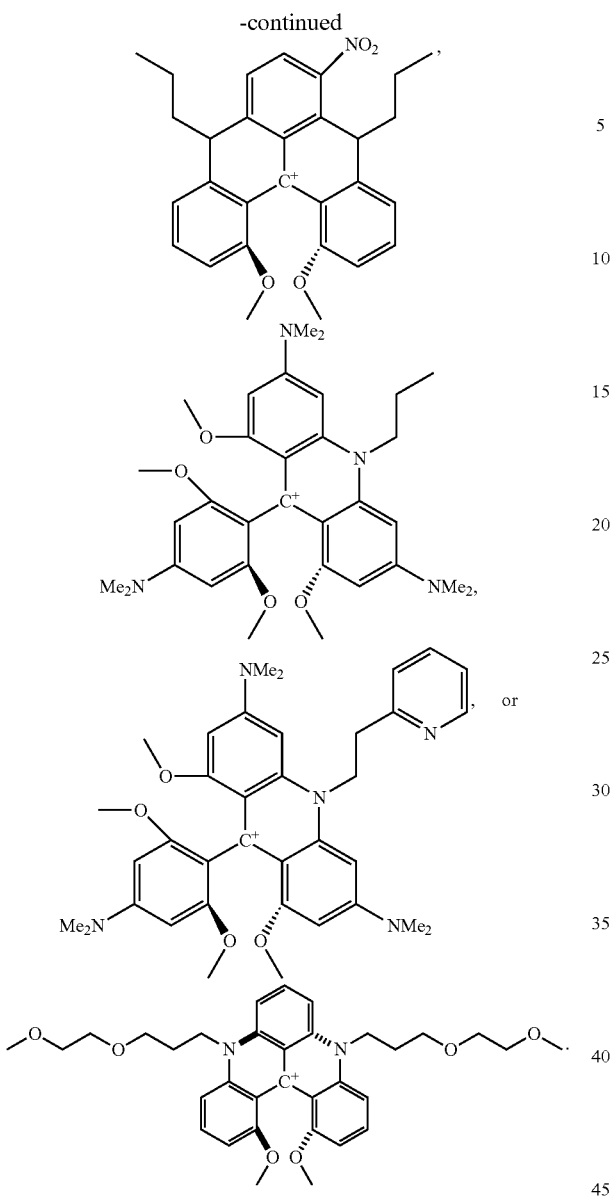

8. The redox flow battery of claim 1, wherein the compound of formula I further comprises an anion selected from tetrafluoroborate, hexafluorophosphate, perchlorate, tetrarylborate, trifluoromethanesulfonate, oxalatoborate, oxalate, phosphate, bis-trifluoromethanesulfonimide, halide, anion of an ionic liquid, hydroxide, carbonate, bicarbonate, sulfate, hydrogen sulfate, sulfite; or a mixture of any two or more thereof.

9. The redox flow battery of claim 1, further comprising a separator positioned between the anolyte and the catholyte, and the separator is a porous membrane.

10. The redox flow battery of claim 1, further comprising a solvent and an electrolyte salt.

11. The redox flow battery of claim 10, wherein the electrolyte salt is a lithium, sodium, potassium, ammonium, or alkylammonium salt of tetrafluoroborate, hexafluorophosphate, perchlorate, tetrarylborate, trifluoromethanesulfonate, oxalatoborate, oxalate, phosphate, bis-trifluoromethanesulfonimide, halide; or a mixture of any two or more thereof.

12. The redox flow battery of claim 10, wherein the solvent comprises nitrile solvent, an ether solvent, dimethylformamide, water, a halogenated solvent, or an ionic liquid.

13. A method of operating the redox flow battery of claim 1, the method comprising flowing the catholyte through a catholyte compartment and flowing the anolyte through an anolyte compartment, wherein the catholyte and anolyte compartments are separated by a porous separator and electron transfer from the anolyte to the catholyte is supported.

14. The method of claim 13, wherein after electron transfer, the method comprises regenerating the catholyte and/or the anolyte by an external power source.

15. A redox flow battery comprising:
a catholyte comprising a conjugated heterocyclic cationic compound in a first oxidation state; and
an anolyte comprising a conjugated heterocyclic cationic compound in a second oxidation state;
wherein the first oxidation state is a higher oxidation state than the second oxidation state,
wherein the conjugated heterocyclic cationic compound in the catholyte and anolyte are each independently a compound of Formula I, wherein the compound of Formula (I) is represented by the following structure:

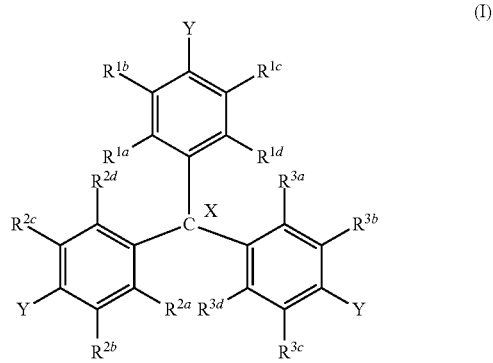

(I)

wherein:
X is from −4 to +4;
each of $R^{1a}$, $R^{1b}$, $R^{1c}$, $R^{1d}$, $R^{2a}$, $R^{2b}$, $R^{2c}$, $R^{2d}$, $R^{3a}$, $R^{3b}$, $R^{3c}$, and $R^{3d}$ is independently H, halide, $CF_3$, $NH_2$, $C_1$-$C_{12}$ alkyl, $C_1$-$C_4$ alkoxy, $C_1$-$C_4$ alkylamino, $C_1$-$C_4$ dialkyl amino, $NO_2$, CN, $CO_2R$, or $Ar^1$;
or $R^{2a}$ and $R^{3d}$ together form —$X^1$—;
or $R^{1a}$ and $R^{2d}$ together form —$X^2$—;
or $R^{1d}$ and $R^{3a}$ together form —$X^3$—;
or $R^{1a}$ and $R^{1b}$ together with atoms to which they are attached to form a phenyl;
or $R^{2c}$ and $R^{2d}$ together with atoms to which they are attached to form a phenyl;
each of $X^1$, $X^2$ and $X^3$ is independently O, $NR^{4a}$, $PR^{4a}$, $CR^{4a}R^{4b}$, or $SiR^{4a}R^{4b}$;
each of $R^{4a}$ and $R^{4b}$ is independently H, halide, $CF_3$, $C_1$-$C_{12}$ alkyl, $C_1$-$C_4$ alkoxy, $C_1$-$C_4$ alkylamino, $C_1$-$C_4$ dialkyl amino, $Ar^3$, -L-$Ar^3$, -L-Z; or -$L^2$-$Z^2$:
each of Y is independently H, halide, $OR^{5a}$, $NR^{5a}R^{5b}$, $PR^{5a}R^{5b}$, $NO_2$, CN, $CF_3$, $CO_2R$, $N_3$, or $Ar^2$;
each of $R^{5a}$, and $R^{5b}$ is independently H, $CF_3$, $C_1$-$C_{12}$ alkyl, $C_1$-$C_4$ alkoxy, $C_1$-$C_4$ alkylamino, $C_1$-$C_4$ dialkyl amino, $Ar^4$, -$L^1$-$Ar^4$, or -$L^1$-$Z^1$;

each of L and $L^1$ is independently $C_1$-$C_{12}$ alkylene, $C_1$-$C_{12}$ heteroalkylene, or arylene:
each of $L^2$ is independently $C_1$-$C_{12}$ alkylene;
Z and $Z^1$ are each independently a moiety comprising conjugated heterocyclic carbenium;
$Z^2$ is each independently —$(OCH_2CH_2O)_nCH_3$:
n is each independently 1 to 20;
each of R is independently $C_1$-$C_{12}$ alkyl or aryl;
$Ar^1$, $Ar^2$, $Ar^3$, and $Ar^4$ are each independently unsubstituted or substituted phenyl or unsubstituted or substituted heteroaryl: each of $Ar^1$, $Ar^2$, $Ar^3$, and $Ar^4$ is independently substituted with 0 to 5 substituents; the substituents are each independently selected from the group consisting of halide, $CF_3$, $NH_2$, $C_1$-$C_4$ alkyl, $C_1$-$C_4$ alkoxy, $C_1$-$C_4$ alkylamino, $C_1$-$C_4$ dialkyl amino, $NO_2$, CN, or aryl.

16. The redox flow battery of claim 1, wherein the redox flow battery has an open circuit potential of greater than about 1V, 1.5 V, or 2 V.

* * * * *